(12) United States Patent
Yamai et al.

(10) Patent No.: US 6,208,109 B1
(45) Date of Patent: Mar. 27, 2001

(54) SYNCHRONOUS MOTOR DRIVING METHOD, COMPRESSOR DRIVING METHOD, DEVICE FOR THE METHODS, AND BRUSHLESS DC MOTOR DRIVING DEVICE

(76) Inventors: Hiroyuki Yamai; Nobuki Kitano; Yoshihito Sanga; Manabu Kosaka, all of c/o Daikin Industries, Ltd., Shige-seisakusho, 1000-2, Aza Ootani, Okamoto-cho, Kusatsu-shi, Shiga 525-0044 (JP)

( * ) Notice: Subject to any disclaimer, the term of this patent is extended or adjusted under 35 U.S.C. 154(b) by 0 days.

(21) Appl. No.: 09/252,666

(22) Filed: Feb. 19, 1999

Related U.S. Application Data

(63) Continuation of application No. PCT/JP97/02875, filed on Aug. 19, 1997.

(30) Foreign Application Priority Data

Aug. 19, 1996 (JP) .................................................. 8-217573

(51) Int. Cl.$^7$ ...................................................... H02P 1/46
(52) U.S. Cl. .......................... 318/716; 318/700; 318/717; 318/432; 318/430; 318/433; 318/434
(58) Field of Search ................................... 318/716, 700, 318/717, 432, 430, 433, 434

(56) References Cited

U.S. PATENT DOCUMENTS

| | | | |
|---|---|---|---|
| 4,240,020 | * 12/1980 | Okuyama et al. | 318/721 |
| 5,272,429 | * 12/1993 | Lipo et al. | |
| 5,422,570 | * 6/1995 | Moreira | |
| 5,682,089 | * 10/1997 | Bolte et al. | 318/439 |
| 5,739,650 | * 4/1998 | Kimura et al. | 318/254 |
| 5,798,631 | * 8/1998 | Spee et al. | 318/767 |

FOREIGN PATENT DOCUMENTS

| | | | |
|---|---|---|---|
| 0 661 800 A1 | * 7/1995 | (EP) . | |
| WO 93/09595 | * 5/1993 | (WO) . | |

OTHER PUBLICATIONS copy of International Search Report.*

Jahns, et al., *IEEE Transactions on Industrial Electronics*, 43:2 321–330, Apr. 1996.*

* cited by examiner

*Primary Examiner*—Karen Masih
(74) *Attorney, Agent, or Firm*—Smith, Gambrell & Russell, LLP

(57) ABSTRACT

When torque control is performed for suppressing speed change within one rotation using a synchronous motor (6) controlled by an inverter (5) for a load having cyclic torque changing, an arrangement is employed which includes inverter control means (8) (10) for controlling the inverter (5) so as to superpose a changing amount upon an amplitude and phase of a current waveform or voltage waveform, so that torque control is realized for reducing low speed vibration of a cyclic intermittent load with maximum efficiency condition and with practical arrangement.

24 Claims, 50 Drawing Sheets

SYNCHRONOUS MOTOR DRIVING METHOD, COMPRESSOR DRIVING METHOD, DEVICE FOR THE METHODS, AND BRUSHLESS DC MOTOR DRIVING DEVICE

This is a continuation application of International Application PCT/JP97/02875 having an international filing date of Aug. 19, 1997.

TECHNICAL FIELD

The present invention relates to a synchronous motor driving method, compressor driving method, device for the methods, and brushless DC motor driving device. More particularly, the present invention relates to a synchronous motor driving method for driving a synchronous motor such as a brushless DC motor or the like using an inverter and a device for the method, and a compressor driving method for driving a compressor using the synchronous motor which is driven by such method or device and a device for the method, and a brushless DC motor driving device for driving a brushless DC motor using an inverter.

BACKGROUND ART

In the past, a torque controlling technique (refer to the Patent Publication Gazett Tokukaihei 6-42789) is known which controls an input voltage or an input current of an inverter motor so that vibration following the change in rotation speed within one rotation of a compressor having one cylinder is decreased.

Further, a brushless DC motor is devotedly employed as a driving source which is easier in torque controlling than an AC motor due to a position detection mechanism which is previously provided to the brushless DC motor.

Among brushless DC motors, when a surface magnet arrangement brushless DC motor, in which a rotor has permanent magnets which are provided at a surface of the rotor, is employed and torque is controlled, a method for controlling a d-axis current to be 0 which gives no influence to motor torque generation, that is the method for controlling a phase of current to be the same phase as a phase of a generation voltage due to a motor speed (the phase of current equals to 0), is known as a driving method which is free from lowering in efficiency, and is widely employed because of simplification in control.

On the other hand, an embedded magnet arrangement brushless DC motor, in which a rotor has permanent magnets which are embedded in an interior of the rotor, can simultaneously output two generation torques, that is a magnetic torque and a reluctance torque. Therefore, the embedded magnet arrangement brushless DC motor has a characteristic effect such that driving with higher efficiency than the surface magnet arrangement brushless DC motor is realized by determining distribution of the two torques to be adequate in response to a load torque so that the current is determined to have a minimum value and the total torque is determined to have a maximum value (hereinafter, referred to as "maximum torque control"). The embedded magnet arrangement brushless DC motor has developed in application to an air-conditioner or the like in recent years which is required energy saving especially.

Further, a maximum torque control method for controlling an embedded magnet arrangement brushless DC motor is recited in "a controlling method which is adequate to an embedded magnetic arrangement PM motor (Umekomi-jishaku-kouzou-PM-mota ni tekishita seigyphou)", Motimoyo et al., Denki-gakkai Handoutai Denryoku Kenkyuukai Shiryou SPC-92 5. It is known that the maximum torque control is -realized by controlling d-, and q-axis currents based upon a relational equation which is determined based upon electrical constants of a motor.

But, when the maximum torque control and the torque control are combined with one another, the following disadvantages arise.

(1) Modeling errors due to a motor temperature and magnetic saturation-are generated so that a maximum torque condition is not satisfied constantly. And, for solving problems (specifically, changes in winding resistance and the speed electromotive force constant following an increase in temperature, and changes in d-, and q-axis inductance values and the speed electromotive force constant due to magnetic saturations due to modeling errors of a motor, changes in various parameters due to temperature and magnetic saturation should be actually measured and are considered in operations. This is extremely difficult in actual application.

(2) When the maximum torque control is combined with torque control which cancels harmonic components up to higher harmonics which gives little influence in vibration, electric power is consumed beyond the necessary amount so that driving with high efficiency is not realized.

(3) A peak current is increased by the torque control so that the peak current is over the limit value of an inverter current. Therefore, an operation point should be shifted from an operation point of the maximum torque control so that efficiency is decreased accordingly.

DISCLOSURE OF THE INVENTION

The present invention was made in view of the above problems.

It is an object of the present invention to offer a synchronous motor driving method, compressor driving method, and device for the methods, for realizing torque control which drives a cyclic intermittent load in a maximum efficiency condition, has a practical arrangement, and decreases low speed vibration.

It is another object of the present invention to offer a brushless DC motor driving device for enlarging a driving range and for improving efficiency.

A synchronous motor driving method of a first embodiment according to the present invention is a method for superposing a varying amount upon an amplitude and a phase of a current waveform or voltage waveform when torque control is performed for suppressing speed change within one rotation by a synchronous motor controlled with an inverter which motor drives a load having a cyclic torque change.

A synchronous motor driving method of a second embodiment according to the present invention is a method for controlling a varying amount in phase based upon varying amount in amplitude which is controlled based upon an output of a torque control section.

A synchronous motor driving method of a third embodiment according to the present invention is a method for controlling a varying amount in amplitude based upon a varying amount in phase which is controlled based upon an output of a torque control section.

A synchronous motor driving method of a fourth embodiment according to the present invention is a method for controlling a varying amount in amplitude based upon an output of a torque control section, and for controlling a varying amount in phase based upon a detection amount which is related to efficiency.

A synchronous motor driving method of a fifth embodiment according to the present invention is a method for controlling a varying amount in phase based upon an output of a torque control section, and for controlling a varying amount in amplitude based upon a detection amount which is related to efficiency.

A synchronous motor driving method of a sixth embodiment according to the present invention is a method which employs an amount corresponding to a fundamental wave and lower harmonics as the varying amount.

A synchronous motor driving method of a seventh embodiment according to the present invention is a method which employs an amount corresponding to a fundamental wave as the varying amount.

A synchronous motor driving method of an eighth embodiment according to the present invention is a method for superposing a third harmonic upon the varying amount in amplitude.

A synchronous motor driving method of a ninth embodiment according to the present invention further includes a method for detecting a magnetic pole position of a rotor of the synchronous motor by integrating a difference between a first center point voltage and a second center point voltage, the first center point voltage being obtained by resistances, each having one end which is connected to an output terminal of each phase of the inverter and another end which is connected to one another, and the second center point voltage being obtained by connecting one end of a stator winding of each phase of the synchronous motor to one another.

A compressor driving method of a tenth embodiment according to the present invention is a method for driving a one cylinder compressor using a synchronous motor which is driven by the synchronous motor driving method of one of the first to ninth embodiments.

A synchronous motor driving device of an eleventh embodiment according to the present invention includes inverter control means for controlling an inverter so as to superpose a varying amount upon an amplitude and a phase of a current waveform or voltage waveform when torque control is performed for suppressing speed change within one rotation by a synchronous motor controlled with an inverter which motor drives a load having a cyclic torque change.

A synchronous motor driving device of a twelfth embodiment according to the present invention employs means for controlling a varying amount in phase based upon a varying amount in amplitude which is controlled based upon an output of a torque control section, as the inverter control means.

A synchronous motor driving device of a thirteenth embodiment according to the present invention employs means for controlling a varying amount in amplitude based upon a varying amount in phase which is controlled based upon an output of a torque control section, as the inverter control means.

A synchronous motor driving device of a fourteenth embodiment according to the present invention employs means for controlling a varying amount in amplitude based upon an output of a torque control section and for controlling a varying amount in phase based upon a detection amount corresponding to efficiency, as the inverter control means.

A synchronous motor driving device of a fifteenth embodiment according to the present invention employs means for controlling a varying amount in phase based upon an output of a torque control section and for controlling a varying amount in amplitude based upon a detection amount corresponding to efficiency, as the inverter control means.

A synchronous motor driving device of a sixteenth embodiment according to the present invention employs means for employing an amount corresponding to a fundamental wave and lower harmonics as the varying amount, as the inverter control means.

A synchronous motor driving device of a seventeenth embodiment according to the present invention employs means for employing an amount corresponding to a fundamental wave as the varying amount, as the inverter control means.

A synchronous motor driving device of an eighteenth embodiment according to the present invention employs means for superposing a third harmonic upon the varying amount in amplitude, as the inverter control means.

A synchronous motor driving device of a nineteenth embodiment according to the present invention further includes resistances, each having one end which is connected to an output terminal of each phase of the inverter and another end which is connected to one another so that a first center point voltage is obtained, wherein each stator winding of each phase of the synchronous motor is connected at one end to one another so that a second center point voltage is obtained, and further includes integration means for integrating a difference between the first center point voltage and the second center point voltage and for obtaining an integration signal, and further includes magnetic pole position detection means for detecting a magnetic pole position of a rotor of the synchronous motor based upon the integration signal.

A compressor driving device of a twentieth embodiment according to the present invention is a device for driving a one cylinder compressor using a synchronous motor which is driven by the synchronous motor driving device according to one of eleventh to nineteenth embodiments.

A brushless DC motor driving device of a 21-th embodiment according to the present invention includes resistances, each having one end which is connected to an output terminal of each phase of inverter and another end which is connected to one another so that a first center point voltage is obtained, wherein each stator winding of each phase of a brushless DC motor is connected at one end to one another so that a second center point voltage is obtained, and includes integration means for integrating a difference between the first center point voltage and the second center point voltage and for obtaining an integration signal, magnetic pole position detection means for detecting a magnetic pole position of a rotor of the brushless DC motor based upon the integration signal, inverter control means for controlling the inverter so that a changing voltage which is advanced with respect to a phase of a load torque is superposed upon an average value voltage command in synchronism with intermittence of the load torque for applying to the brushless DC motor, and peak value changing suppression means for suppressing changes in the peak value of the integration signal.

A brushless DC motor driving device of a 22-nd embodiment according to the present invention employs the peak value changing suppression means which includes division means for dividing an inverter interval, judgment means for judging whether the integration signal level is great or small for every divided interval, and inverter voltage phase control means for retarding the inverter voltage phase responding to the judgment result representing that the level of the integration signal is great and for advancing the inverter voltage phase responding to the judgment result representing that the level of the integration signal is small.

A brushless DC motor driving device of a 23-rd embodiment according to the present invention includes resistances, each having one end which is connected to an output terminal of each phase of an inverter and another end which is connected to one another so that a first center point voltage is obtained, wherein each stator winding of each phase of a brushless DC motor is connected at one end to one another so that a second center point voltage is obtained, and includes integration means for integrating a difference between the first center point voltage and the second center point voltage and for obtaining an integration signal, magnetic pole position detection means for detecting a magnetic pole position of a rotor of the brushless DC motor based upon the integration signal, inverter control means for controlling the inverter so that a changing phase which is advanced with respect to a phase of a load torque is superposed upon an average value phase command in synchronism with intermittence of the load torque for applying to the brushless DC motor, and peak value changing suppression means for suppressing changes in the peak value of the integration signal.

A brushless DC motor driving device of a 24-th embodiment according to the present invention employs the peak value changing suppression means which includes division means for dividing an inverter interval, judgment means for judging whether the integration signal level is great or small for every divided interval, and inverter voltage amplitude control means for increasing the inverter voltage amplitude responding to the judgment result representing that the level of the integration signal is great and for decreasing the inverter voltage amplitude responding to the judgment result representing that the level of the integration signal is small.

When the synchronous motor driving method of the first embodiment according to the present invention is employed, the varying amount is superposed upon the amplitude and the phase of the current waveform or voltage waveform when the torque control is performed for suppressing speed change within one rotation by the synchronous motor controlled with the inverter which motor drives the load having the cyclic torque change. Therefore, a torque controlling is realized which drives the load having the cyclic intermittence in a maximum efficiency condition (or in a higher efficiency condition) using a practical arrangement so that the vibration st a low speed is decreased The operation is described in more detail.

When the scope of the maximum torque controlling method for the embedded magnet arrangement brushless DC motor is applied to a case in which a cyclic load having intermittent load torque within one rotation is employed, it is understood that a current amplitude and a current phase arc sufficient to be changed within one rotation, as illustrated in FIG. 3. That is, it is understood that complicated operations based upon the model for the maximum torque controlling method can be replaced with a simple wave controlling amount. Therefore, maximum torque control is realized accurately by properly correcting the direct current component and the changing component of the current amplitude and the current phase as illustrated in FIG. 3 at every driving condition. Of course, the voltage amplitude and the voltage phase may be changed within one rotation as illustrated in FIG. 2 or FIG. 4 instead of changing the current amplitude and the current phase within one rotation.

When the synchronous motor driving method of the second embodiment according to the present invention is employed, the varying amount in phase is controlled based upon the varying amount in amplitude which is controlled based upon the output of the torque control section. Therefore, operations similar to those of the first embodiment are performed.

When the synchronous motor driving method of the third embodiment according to the present invention is employed, the varying amount in amplitude is controlled based upon the varying amount in phase which is controlled based upon the output of the torque control section. Therefore, operations similar to those of the first embodiment are performed.

When the synchronous motor driving method of the fourth embodiment according to the present invention is employed, the varying amount in amplitude is controlled based upon the output of the torque control section, and the varying amount in phase is controlled based upon the detection amount which is related to efficiency. Therefore, the control including iron losses is realized, the iron losses not being considered in the maximum torque controlling method. Also, operations similar to those of the first embodiment are performed. With respect to this point, minimizing in motor current is merely minimizing copper losses when the scope of the maximum torque controlling method is employed. Further, a scope of maximum efficiency control is disclosed in "driving method of a brushless DC motor with high efficiency and with saving in energy (burashiresu DC mota no shou-enerugi-koukouritsu untenhou)". Morimoto et al., Dengakuron D, vol. 112–3, pp. 285 (Hei 4-3), but the problem-in modeling errors exists which is similar to the problem (1) of the maximum torque control because the iron losses are determined to be constant. Therefore, the control including iron losses is realized by employing the method of the fourth embodiment.

When the synchronous motor driving method of the fifth embodiment according to the present invention is employed, the varying amount in phase is controlled based upon the output of the torque control section, and the varying amount in amplitude is controlled based upon the detection amount which is related to efficiency. Therefore, the control including iron losses is realized which were not considered in the maximum torque controlling method. Further, operations similar to those of the first embodiment are performed.

When the synchronous motor driving method of the sixth embodiment according to the present invention is employed, the amount corresponding to the fundamental wave and lower harmonics are employed as the varying amount. Therefore, operations similar to those of the first to fifth embodiments are performed. The operation is described in more detail.

Among harmonic wave components of a load torque waveform, a band of changing components of a current amplitude or current phase are easily limited to harmonic wave components which give great influence to vibration {for example, first order harmonic wave and second order harmonic wave for a one cylinder compressor which is an intermittent load: higher torque changing components give little influence to a change in rotation and vibration due to the change in rotation because the flywheel effect (effect of moment of inertia) is improved following a frequency}. Unnecessary electric power consumption is prevented due to the above operation, so that driving with higher efficiency is possible. Of course, a voltage may be employed instead of the current.

When the synchronous motor driving method of the seventh embodiment according to the present invention is employed, the amount corresponding to the fundamental wave is employed as the varying amount. Therefore, operations similar to those of the first to fifth embodiments are performed. Further, unnecessary electric power consumption is prevented due to the above operation, so that driving with higher efficiency is possible.

When the synchronous motor driving method of the eighth embodiment according to the present invention is employed, the third harmonic is superposed upon the varying amount in amplitude. Therefore, the peak current is suppressed with ease, and the limitation of the upper limit of the inverter current is raised, so that driving at an optimum driving point is possible within a wider extent of load torque. Further, operations similar to those of first to fifth embodiments are performed. Furthermore, scarce influence of superposing of the third harmonic upon the vibration exists because of the operation of the moment of inertia.

When the synchronous motor driving method of the ninth embodiment according to the present invention is employed, the magnetic pole position of the rotor of the synchronous motor is detected by integrating the difference between the first center point voltage and the second center point voltage, the first center point voltage being obtained by resistances, each having one end which is connected to an output terminal of each phase of the inverter and another end which is connected to one another, and the second center point voltage being obtained by connecting one end of a stator winding of each phase of the synchronous motor to one another. Therefore, providing of a Hall element, encoder or the like is not required for detecting the magnetic pole position. Further, operations similar to those of the first to eighth embodiments are performed.

When the compressor driving method of the tenth embodiment according to the present invention is employed, the one cylinder compressor is driven using a synchronous motor which is driven by the synchronous motor driving method according to one of the first to ninth embodiments. Therefore, saving of consumption of energy and reducing of cost are realized.

When the synchronous motor driving device of the eleventh embodiment according to the present invention is employed, the inverter is controlled by the inverter control means so as to superpose a varying amount upon an amplitude and a phase of a current waveform or voltage waveform when a torque control is performed for suppressing speed change within one rotation by a synchronous motor controlled with an inverter which motor drives a load having a cyclic torque change. Therefore, a torque control is realized which drives the load having the cyclic intermittence under a maximum efficiency condition (or in a higher efficiency condition) using a practical arrangement so that the vibration in a low speed is decreased.

When the synchronous motor driving device of the twelfth embodiment according to the present invention is employed, means for controlling a varying amount in phase based upon a varying amount in amplitude which is controlled based upon an output of a torque control section are employed as the inverter control means. Therefore, operations similar to those of the eleventh embodiment are performed.

When the synchronous motor driving device of the thirteenth embodiment according to the present invention is employed, means for controlling a varying amount in amplitude based upon a varying amount in phase which is controlled based upon an output of a torque control section are employed as the inverter control means. Therefore, operations similar to those of the eleventh embodiment are performed.

When the synchronous motor driving device of the fourteenth embodiment according to the present invention is employed, means for controlling a varying amount in amplitude based upon an output of a torque control section and for controlling a varying amount in phase based upon a detection amount corresponding to efficiency are employed as the inverter control means. Therefore, control including iron losses is realized, the iron losses not being considered in the maximum torque controlling method. Also, operations similar to those of the eleventh embodiment are performed.

When the synchronous motor driving device of the fifteenth embodiment according to the present invention is employed, means for controlling a varying amount in phase based upon an output of a torque control section and for controlling a varying amount in amplitude based upon a detection amount corresponding to efficiency are employed as the inverter control means. Therefore, control including iron losses is realized, the iron losses not being considered in the maximum torque controlling method. Also, operations similar to those of the eleventh embodiment are performed.

When the synchronous motor driving device of the sixteenth embodiment according to the present invention is employed, means for employing an amount corresponding to a fundamental wave and lower harmonics as the varying amount are employed as the inverter control means. Therefore, operations similar to those of one of the eleventh to fifteenth embodiments are performed. Further, unnecessary electric power consumption is prevented due to the above operation, so that driving with higher efficiency is possible.

When the synchronous motor driving device of the seventeenth embodiment according to the present invention is employed, means for employing an amount corresponding to a fundamental wave as the varying amount are employed as the inverter control means. Therefore, operations similar to those of one of the eleventh to fifteenth embodiments are performed. Further, unnecessary electric power consumption is prevented due to the above operation, so that driving with higher efficiency is possible.

When the synchronous motor driving device of the eighteenth embodiment according to the present invention is employed, means for superposing a third harmonic upon the varying amount in amplitude are employed as the inverter control means. Therefore, the peak current is suppressed with ease, and the limitation of the upper limit of the inverter current is raised so that driving at an optimum driving point is possible within a wider extent of load torque. Further, operations similar to those of one of the eleventh to fifteenth embodiments are performed. Furthermore, scarce influence of superposing of the third, harmonic upon the vibration exists because of the operation of the moment of inertia.

When the synchronous motor driving device of the nineteenth embodiment according to the present invention is employed, the first center point voltage is obtained using the resistances, each having one end which is connected to an output terminal of each phase of the inverter and another end which is connected to one another, the second center point voltage is obtained using the stator winding each of which of each phase of the synchronous motor is connected at one end to one another, and the difference between the first center point voltage and the second center point voltage is integrated by the integration means so that the integration signal is obtained, and the magnetic pole position of a rotor of the synchronous motor is detected by the magnetic pole position detection means based upon the integration signal. Therefore, providing a Hall element, encoder or the like is not required for detecting the magnetic pole position. Further, operations similar to those of one of the eleventh to eighteenth embodiments are performed.

When the compressor driving device of the twentieth embodiment according to the present invention is employed, the one cylinder compressor is driven using the synchronous motor which is driven by the synchronous motor driving device according to one of the eleventh to ninteenth embodiments. Therefore, saving of energy and reduction of cost are realized. Operations are described in more detail.

When three phases/d-, q-coordinates conversion of a synchronous motor is represented as the formula (1), the voltage equation of the synchronous motor is represented as the formula (2), and the generation torque is given as the equation (3) using d-, and q- axis currents. Wherein, the d-axis is an axis which represents a direction of magnetic flux which is generated by permanent magnets, and the, q-axis is an axis which is shifted by 90 degrees electrically from the d-axis.

$$\begin{bmatrix} u \\ v \\ w \end{bmatrix} = \begin{bmatrix} \cos\theta, -\sin\theta \\ \cos\left(\theta - \frac{2\pi}{3}\right), -\sin\left(\theta - \frac{2\pi}{3}\right) \\ \cos\left(\theta + \frac{2\pi}{3}\right), -\sin\left(\theta + \frac{2\pi}{3}\right) \end{bmatrix} \begin{bmatrix} q \\ d \end{bmatrix} \quad (1)$$

$$\begin{bmatrix} v_q \\ v_d \end{bmatrix} = \begin{bmatrix} R+s\cdot L_q, -\omega\cdot L_d \\ \omega\cdot L_q, R+s\cdot L_d \end{bmatrix} \begin{bmatrix} i_q \\ i_d \end{bmatrix} + K_e \begin{bmatrix} \omega \\ 0 \end{bmatrix} \quad (2)$$

$$\tau_m - p\{K_e\cdot i_q + (L_q\cdot L_d)\cdot i_d\cdot i_q\} \quad (3)$$

Wherein, voltages applied to the synchronous motor are represented as the formula (4) which is obtained by transforming the formula (1). The applied voltages of the synchronous motor are calculated using the formula (2) and formula (4).

$$\begin{cases} v_u = \sqrt{\frac{2}{3}(v_q^2 + v_d^2)}\cdot\cos[\theta + \alpha] \\ v_v = \sqrt{\frac{2}{3}(v_q^2 + v_d^2)}\cdot\cos\left[\theta - \frac{2\pi}{3} + \alpha\right] \\ v_w = \sqrt{\frac{2}{3}(v_q^2 + v_d)}\cdot\cos\left[\theta + \frac{2\pi}{3} + \alpha\right] \end{cases} \quad (4)$$

Wherein $\alpha = \tan^{-1}\left(\frac{v_d}{v_q}\right)$

Wherein, p represents a number of pairs of magnetic poles, R represents a winding resistance, Ld, Lq represent self-inductances which are transformed to the d-, q-coordinates system, Ke represents a constant of speed electromotive voltage. Further, Ω represents an electric angle.

When a surface magnet arrangement synchronous motor is employed, Lq=Ld, therefore it is understood from the equation (3) that the d-axis current gives no influence to torque. Consequently, it is sufficient that the d-axis current is controlled to be 0 for minimizing the motor current, that is for performing torque control with higher efficiency. When this condition is applied to the formula (5), it is understood that a desired current phase is 0 (fixed). But, it is understood that the current phase should be changed as illustrated in FIG. 2 even when the current phase at the maximum torque control becomes a fixed value.

$$\begin{cases} i_u = \sqrt{\frac{2}{3}(i_q^2 + i_d^2)}\cdot\cos[\theta + \beta] \\ i_v = \sqrt{\frac{2}{3}(i_q^2 + i_d^2)}\cdot\cos\left[\theta - \frac{2\pi}{3} + \beta\right] \\ i_w = \sqrt{\frac{2}{3}(i_q^2 + i_d)}\cdot\cos\left[\theta + \frac{2\pi}{3} + \beta\right] \end{cases} \quad (5)$$

ここ. $\beta = \tan^{-1}\left(\frac{i_d}{i_q}\right)$

Wherein, FIG. 2 represents a simulation result of changing components in voltage amplitude and voltage phase under the condition that the current phase is determined to be 0 rad for performing torque control efficiently when the surface magnet arrangement brushless DC motor (equipment constants: p=2, Ld=Lq=5 [H], Ke=0.11 [V*s/rad], R=0.5 [Ω], power frequency: ω=2π*30 [rad/s]) is employed. The changing component in phase becomes smaller because the inductance is smaller than the inductance of an embedded magnet arrangement brushless DC motor. Therefore, the efficiency improvement effect of the torque control in which the voltage amplitude and voltage phase are changed, is smaller than that of the embedded magnet arrangement brushless DC motor. But, efficiency improvement effect of the torque control is obtained by employing tho surface magnet arrangement brushless DC motor and by changing the voltage amplitude and voltage phase.

On the other hand, from the above document of "a controlling method which is adequate to an embedded magnetic arrangement PM motor (Umekomi-jishaku-kouzou-PM-mota ni tekishita seigyohou)", the maximum torque (minimizing motor current) condition of the embedded magnet arrangement synchronous motor is given by d-, and q-axis currents in the formula (6). The generation torque under this condition is represented by the formula (7) which is obtained from the formula (3) and formula (6).

$$\begin{cases} i_d = -\frac{K_e - \sqrt{K_e^2 + 4\cdot(1-\rho)^2 L_d^2 i_q^2}}{2\cdot(1-\rho)\cdot L_d} \\ i_q = \sqrt{3\cdot I_1^2 - i_d^2} \end{cases} \quad (6)$$

Wherein, ρ=Lq/Ld である.

$$\tau_m = p\left\{0.5\cdot K_e\cdot i_q + 0.5\cdot i_q\sqrt{K_e^2 + 4\cdot(1-\rho)^2\cdot L_d^2\cdot i_q^2}\right\} \quad (7)$$

That is, it is understood that the distribution of the d-, and q- axis currents should be adjusted suitably responding to the size of the torque when the torque control is performed for minimizing the motor current.

Further, for a reluctance motor (a motor driven by reluctance torque only) which is one species of synchronous motor, it is understood that the-current phase of 45 degrees is the maximum torque control condition by determining the speed electromotive voltage constant to be 0 in the equation (6). In the reluctance motor, a designing is popularly carried out that the inductance L is determined to be great for obtaining a reluctance torque, so that the changing component in voltage phase should be determined to be great. Therefore, efficiency improvement effect which is similar to that of the embedded magnet arrangement brushless DC motor is realized by performing torque control by changing the voltage amplitude and voltage phase.

Wherein, it is considered based upon the formula (6) and formula (7) that a load such as a compressor which changes its load torque within one rotation is driven by the embedded magnet arrangement brushless DC motor (equipment constants: p=2, Ld=8.7 [mH], Lq=22.8 [mH], Ke=0.11 [V*s/rad], R=0. 5 [Ω], power frequency; ω=2π*30 [rad/s]), and it is understood that the d-, and q-axis currents should be changed corresponding to rotation position (magnetic pole position) of the rotor as illustrated in FIG. 1.

Further, when the obtained d-, and q- axis currents in FIG. 1 are transformed into the amplitude and phase of the real current using the formula (5), the amplitude and phase are obtained as illustrated in FIG. 3. It is understood that the current amplitude and current phase should be changed for generating a motor torque which is coincident to the intermittent load under the condition that the motor current is minimized. Based upon this knowledge the torque control with minimized motor current is realized by employing the simple control which adjusts the size and phase of the changing components in the current amplitude and in the current phase. Therefore, complicated operations using many modeling constants are not required, and a man-hour for measuring many modeling constants under each condition for considering the influence of temperature rising and magnetic saturation is not required.

Furthermore, when the required applied voltages are obtained using the formula (2) and formula (4), the applied voltages are obtained as illustrated in FIG. 4. It is understood that the amplitude and phase in the applied voltages should be changed in synchronism with the intermittence in the load torque, as is similar as of the motor currents.

Further, dashed lines in FIG. 3 and FIG. 4 represent an average value of the waveform.

When the brushless DC motor driving device of the 21-st embodiment according to the present invention is employed, the first center point voltage is obtained using resistances, each having one end which is connected to an output terminal of each phase of the inverter and another end which is connected to one another, the second center point voltage is obtained using each stator winding of each phase of the brushless DC motor which is connected at one end to one another, the difference between the first center point voltage and the second center point voltage is integrated by the integration means so that the integration signal is obtained, the magnetic pole position of a rotor of the brushless DC motor is detected by the magnetic pole position detection means based upon the integration signal, inverter control means for controlling an inverter so that the exchanging voltage which is advanced with respect to the phase of the load torque is superposed upon the average value voltage command in synchronism with intermittence of the load torque for applying to the brushless DC motor by the inverter control means using the inverter. And, during this operation, the changes in peak value of the integration signal are suppressed by the peak value changing suppression means.

Therefore, a disadvantage is greatly suppressed in that beat phenomena is generated due to coincidence of the integration signal and the motor cycle. Consequently, magnetic pole position detection signal is stabilized so that the driving range of the brushless DC motor is enlarged. Further, efficiency of the brushless DC motor is improved.

When the brushless DC motor driving device of the 22-nd embodiment according to the present invention is employed, for suppressing changes in the peak value of the integration signal, the inverter interval is divided by the division means, and the level of the integration signal is judged at every divided interval by the judgment means whether the level is great or small. And, the inverter voltage phase is retarded responding to the judgment result representing that the level of the integration signal is great and the inverter voltage phase is advanced responding to the judgment result representing that the level of the integration signal is small by the inverter voltage phase control means.

Therefore, operations similar to those of the 21-st embodiment are performed.

When the brushless DC motor driving device of the 23-rd embodiment according to the present invention is employed, the first center point voltage is obtained using resistances, each having one end which is connected to an output terminal of each phase of the inverter and another end which is connected to one another, the second center point voltage is obtained using each stator winding of each phase of the brushless DC motor which is connected at one end to one another, and the difference between the first center point voltage and the second center point voltage is integrated by the integration means so that the integration signal is obtained, the magnetic pole position of the rotor of the brushless DC motor is detected by the magnetic pole position detection means based upon the integration signal, the changing phase which is advanced with respect to the phase of the load torque is superposed upon the average value phase command in synchronism with intermittence of the load torque for applying to the brushless DC motor by the inverter control means using the inverter. And, during this operation, changes in peak value of the integration signal are suppressed by the peak value changing suppression means.

Therefore, a disadvantage is greatly suppressed in that beat phenomenon is generated due to coincidence of the integration signal and the motor cycle. Consequently, the magnetic pole position detection signal is stabilized so that the driving range of the brushless DC motor is enlarged. Further, efficiency of the brushless DC motor is improved.

When the brushless DC motor driving device of the 24-th embodiment according to the present invention is employed, for suppressing changes of the peak value of the integration signal, the inverter interval is divided by the division means, and the integration signal is judged whether its level is great or small for every divided interval by the judgment means. And, the inverter voltage amplitude is increased responding to the judgment result representing that the level of the integration signal is great and the inverter voltage amplitude is decreased responding to the judgment result representing that the level of the integration signal is small by the inverter voltage amplitude control means.

Therefore, operations similar to those of the 23-rd embodiment are performed.

BEST MODE FOR CARRYING OUT THE INVENTION

Hereinafter, referring to the attached drawings, we explain the embodiments of the present invention in detail.

Figure 1:
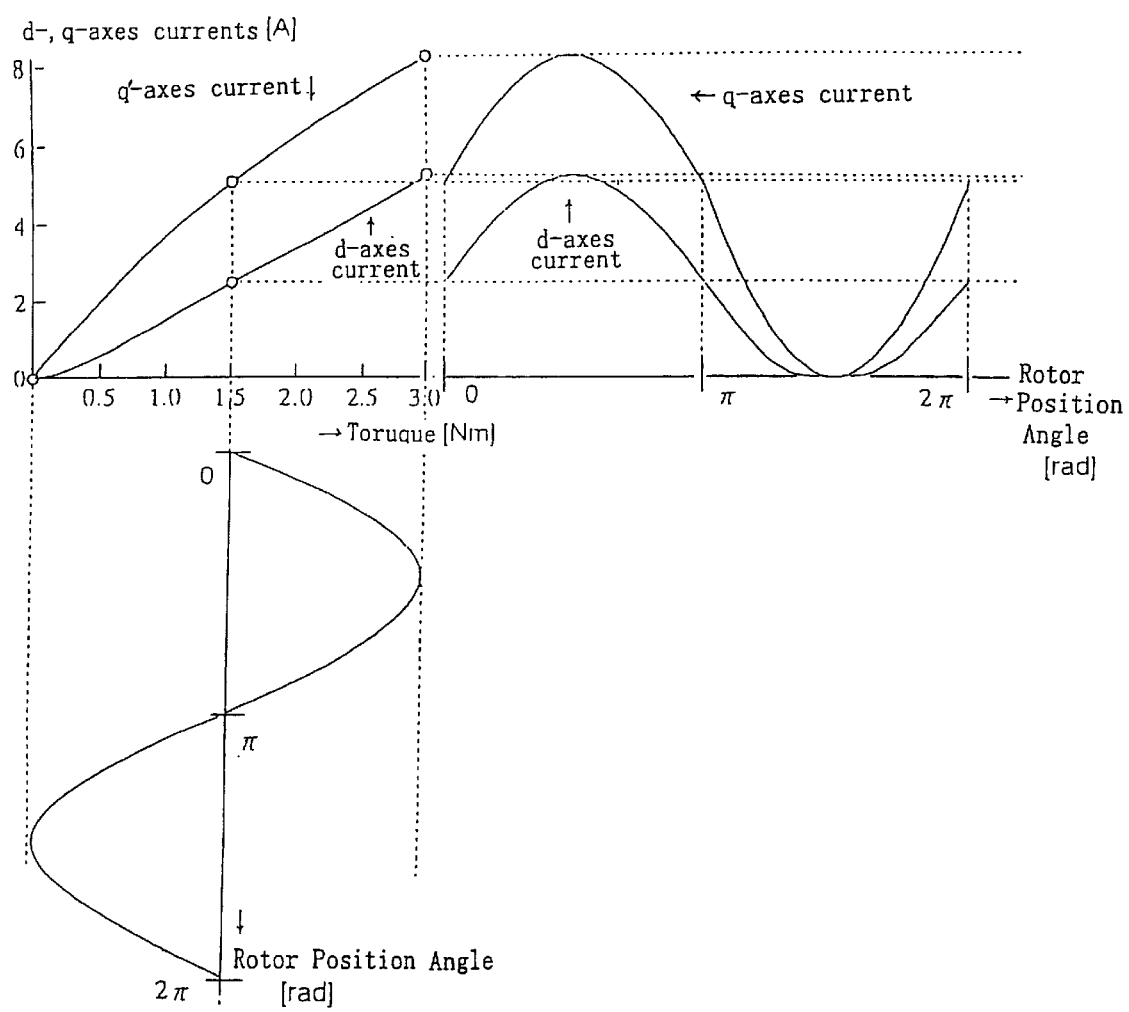
FIG. 1 are charts illustrating relationship between a position angle of a rotor and a torque, relationship between the torque and d-, and q-axis currents, and relationship between the position angle of the rotor and the d-, and q-axis currents, respectively.
Figure 2:
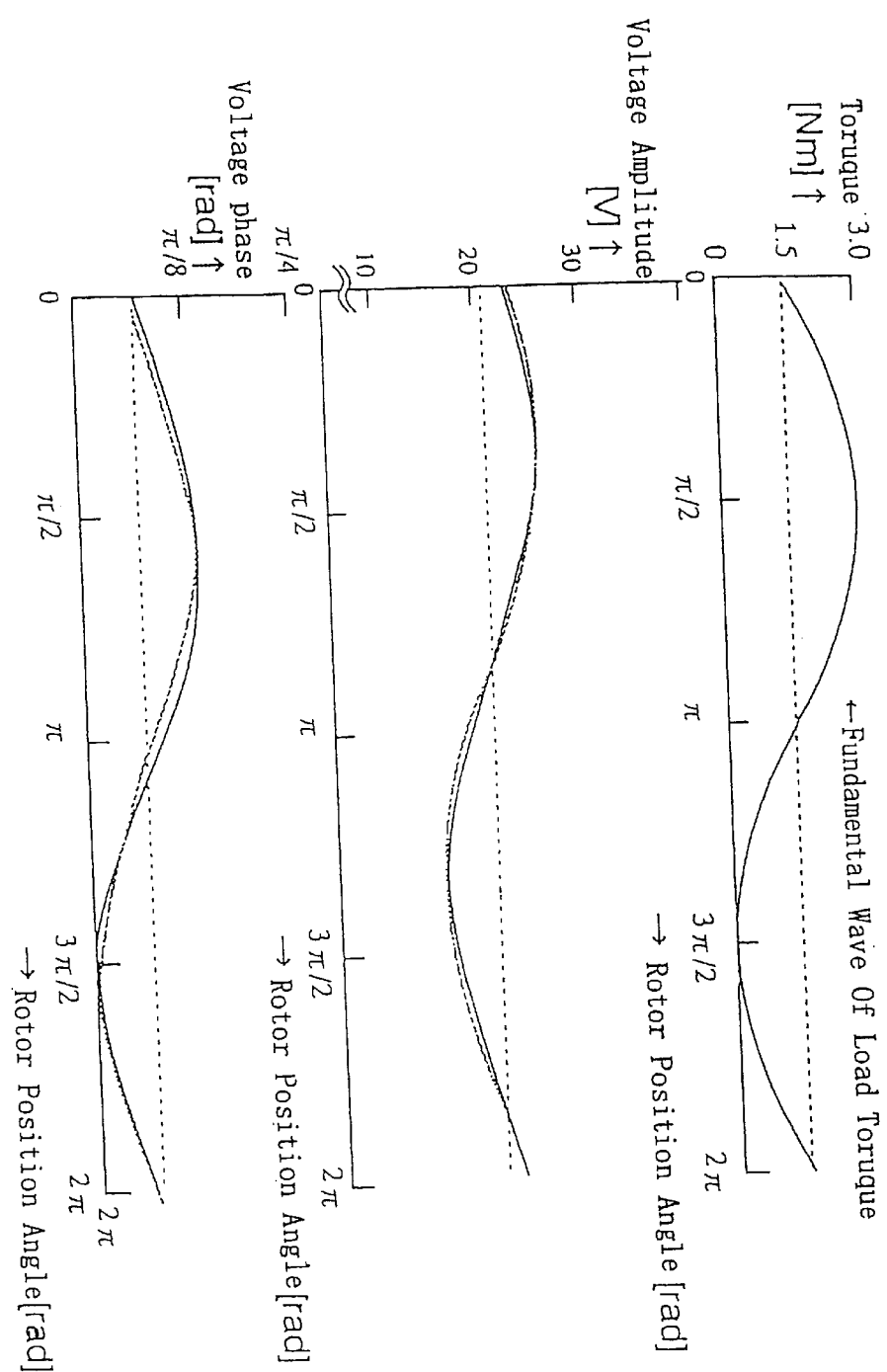
FIG. 2 are charts illustrating simulation results of changing components in voltage amplitude and voltage phase under the condition that a current phase is determined to be 0 rad in a surface magnet arrangement brushless DC motor, and a fundamental wave of a load torque, respectively.
Figure 3:
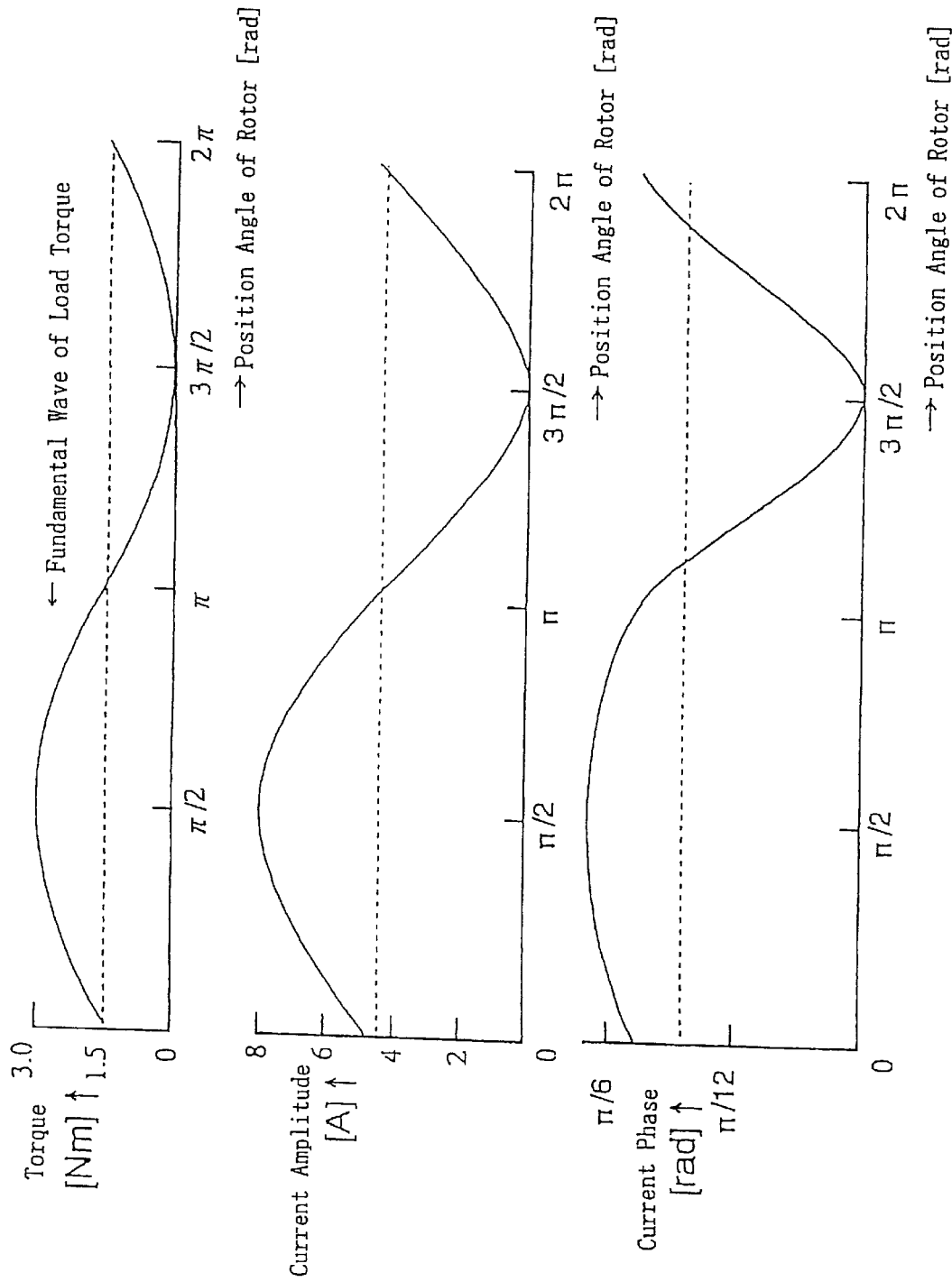
FIG. 3 are charts illustrating phase and amplitude of motor current of each phase for obtaining the d-, and q-axis currents illustrated in FIG. 1, and the fundamental wave of the load torque, respectively.
Figure 4:
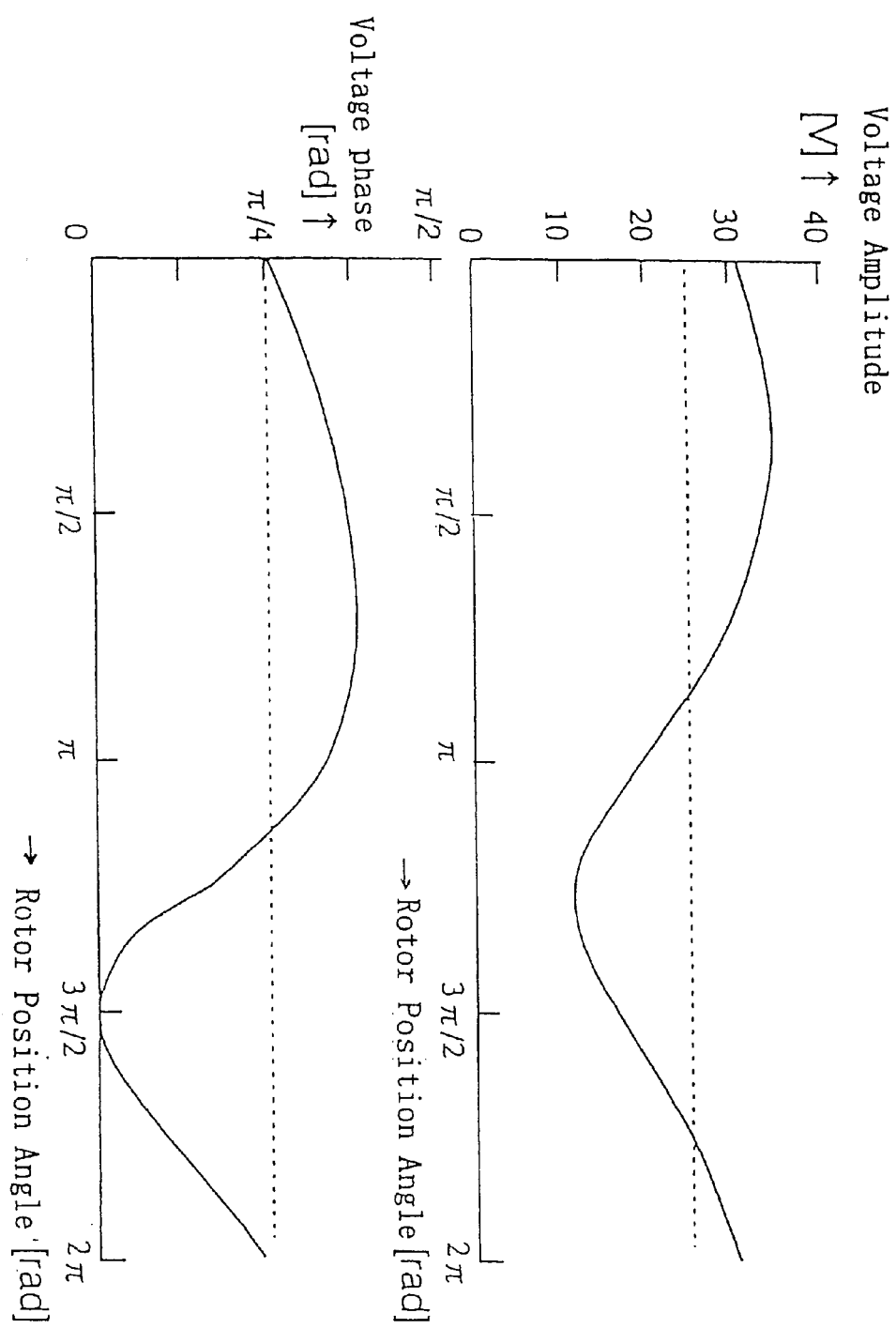
FIG. 4 are charts illustrating the phase and amplitude of a motor applied voltage of each phase for obtaining the d-, and q-axis currents illustrated in FIG. 1.
Figure 5:
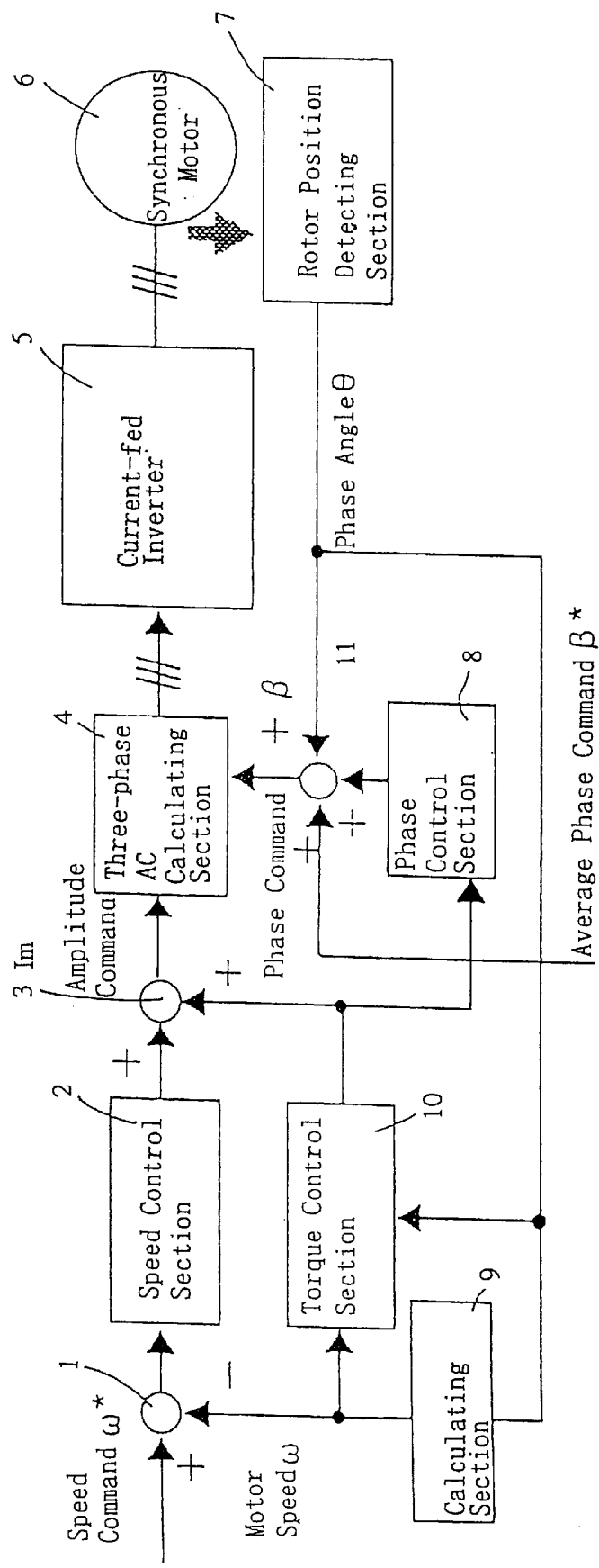
FIG. 5 is a block diagram illustrating an embodiment of a synchronous motor driving device according to the present invention.

FIG. 5 is a block diagram illustrating an embodiment of a synchronous motor driving device according to the present invention.

This synchronous motor driving device includes a speed deviation calculation section 1 for calculating a deviation between a speed command ω* and a motor speed ω, a speed controlling section 2 for outputting an average value command of a current amplitude by inputting the calculated deviation and by carrying out a predetermined operation (for example, PI operation (proportional and integral operation) }, a current amplitude command output section 3 for adding the average value command of the current amplitude and a changing component of the current amplitude at every rotation position output from a torque control section 10 (described later) and for outputting a current amplitude command, a three phase alternate current calculating section 4 for inputting the current amplitude command and a current phase command output from a current phase command output section 11 (described later) and for outputting a three phase alternate current command based upon a formula (8) for example, a current-fed inverter 5 for inputting the three phase alternate current command, a synchronous motor 6 to which is applied the output of the current-fed inverter 5, a rotor position detecting section 7 for detecting a pole position of a rotor of the synchronous motor 6 and for outputting a position angle θ therefrom, a speed calculating section 9 for inputting the position angle θ and for calculating and outputting a motor speed therefrom, the torque control section 10 for inputting the motor speed ω and position angle θ, for carrying out a torque control operation, and for outputting a changing component of the current amplitude at every rotation position, a phase control section 8 for inputting the changing component of the current amplitude at every rotation position, for carrying out a phase control operation (for example, a predetermined coefficient is multiplied and a phase shifting operation is carried out), and for calculating and outputting a changing component command of a current phase, and the current phase command output section 11 for adding an average phase command * which is obtained by a manner which is known in the past and the changing component command and for calculating and outputting the current phase command therefrom.

$$\begin{cases} iu = Im \cdot \cos(\theta + \beta) \\ iv = Im \cdot \cos\left(\theta - \frac{2\pi}{3} + \beta\right) \\ iw = Im \cdot \cos\left(\theta + \frac{2\pi}{3} + \beta\right) \end{cases} \quad (8)$$

Further, the rotor position detecting section 7 is exemplified as a rotation position sensor such as an encoder and a counter circuitry for the output therefrom, a position detecting circuitry for performing filtering to a motor terminal voltage, a circuitry for carrying out position calculation from electrical parameters of a motor and the like.

Furthermore, in this embodiment and following embodiments, the synchronous motor 6 is exemplified as a surface magnet arrangement brushless DC motor, an embedded magnet arrangement brushless DC motor, a reluctance motor and the like.

Figure 6:
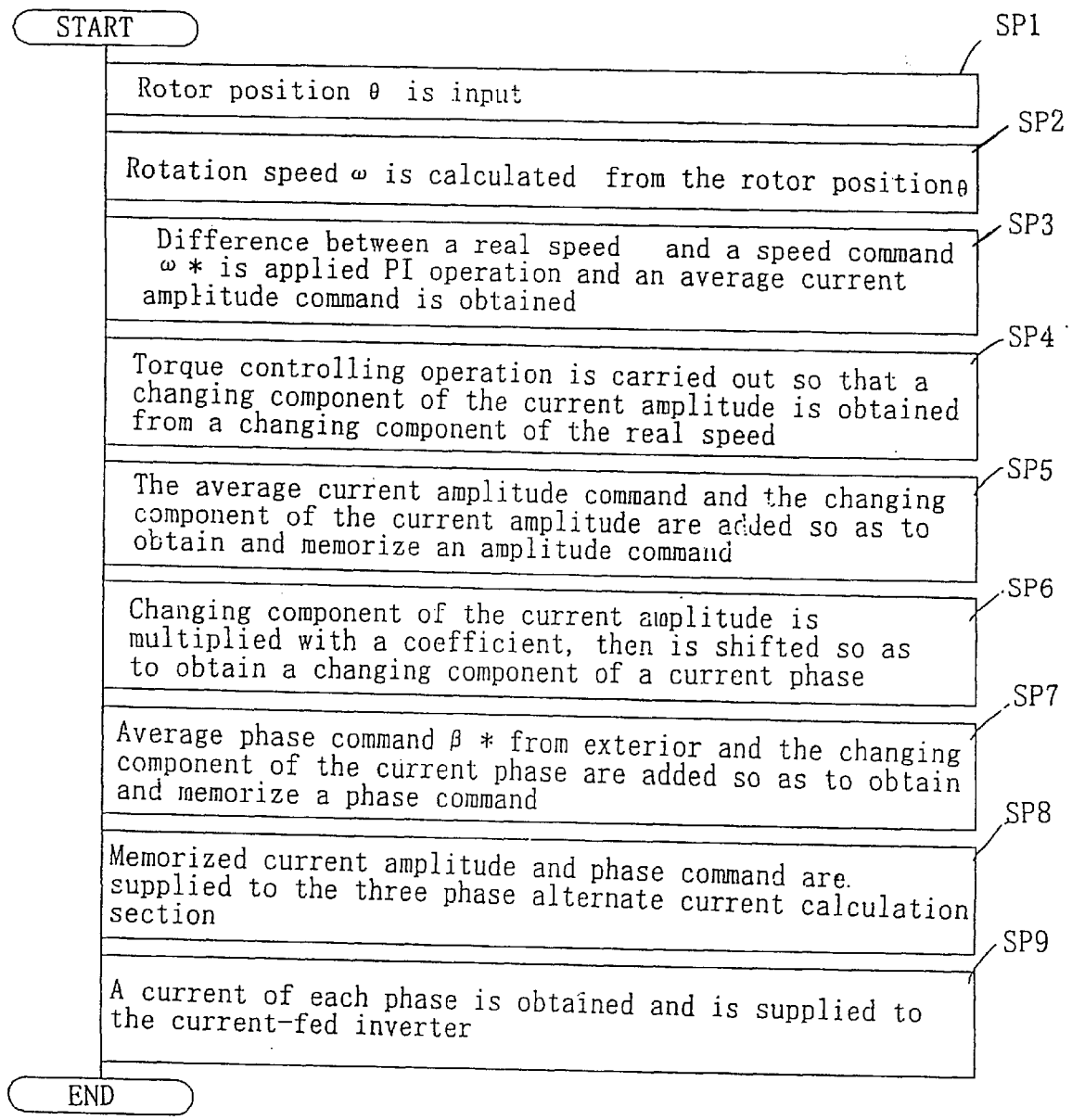
FIG. 6 is a flowchart useful in understanding the operation of the synchronous motor driving device illustrated in FIG. 5.

FIG. 6 is a flowchart useful in understanding an operation of the synchronous motor driving device illustrated in FIG. 5.

In step SP1, a rotor position (position angle) θ is input, in step SP2, a rotation speed (motor speed) ω is calculated from the rotor position, in stop SP3, a difference between a real speed θ and a speed command ω* is applied a PI operation (proportional, integral operation) and an average current amplitude command is obtained, in step SP4, the torque control operation is carried out by inputting the real speed ω and the rotor position θ so that a changing component of the current amplitude is obtained from a changing component of the real speed, in step SP5, the average current amplitude command and the changing component of the current amplitude are added so as to obtain and memorize an amplitude command, in step SP6, the changing component of the current amplitude is multiplied with a coefficient, then is shifted so as to obtain a changing component of a current phase (wherein, the coefficient, and a shifting amount are determined experimentally, for example), in step SP7, an average phase command β* from the exterior and the changing component of the current phase are added so as to obtain and memorize a phase command, in step SP8, the memorized current amplitude and phase command are supplied to the three phase alternate current calculating section, in step SP9, a current of each phase is obtained and is supplied to the current-fed inverter, then the operation returns to an original processing.

Therefore, reduction in vibration is realized by adding the average current amplitude command and the changing component of the current amplitude so as to obtain the amplitude command. Also, improvement in efficiency is realized by adding the average phase command β* from the exterior and the changing component of the current phase so as to obtain the phase command. As a result, a cyclic intermittent load is applied torque control under a maximum efficiency condition so that vibration is reduced.

Figure 7:
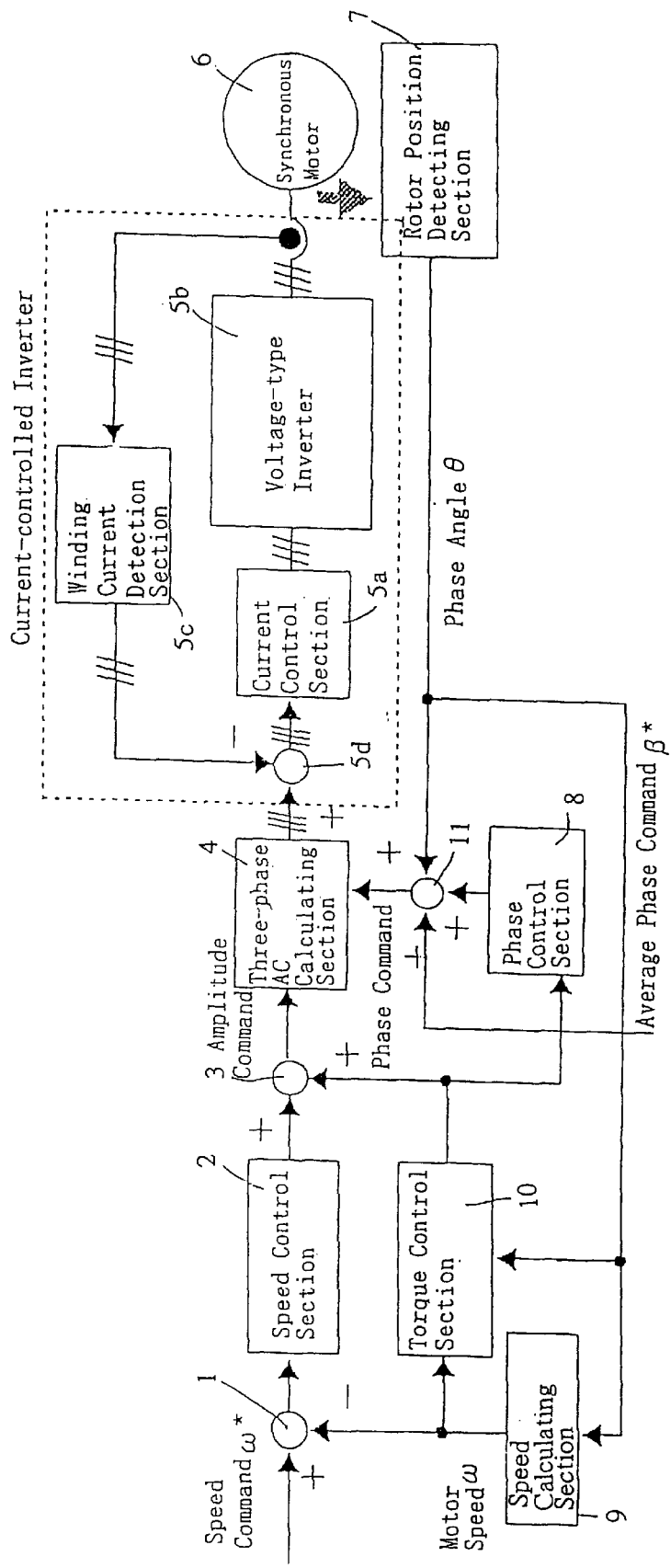
FIG. 7 is a block diagram illustrating another embodiment of a synchronous motor driving device according to the present invention.

FIG. 7 is a block diagram illustrating another embodiment of the synchronous motor driving device according to the present invention.

This synchronous motor driving device is different from the synchronous motor driving device illustrated in FIG. 5 in that a current deviation calculating section 5d for calculating a deviation between the three phase alternate current command and a winding current detection value which is output from a winding current detecting section 5c (describes later), a current control section 5a for inputting the calculated deviation and for carrying out current control so as to transform a current command into a voltage command, a voltage-fed inverter 5b for inputting the transformed voltage command, and the winding current detecting section 5c for detecting a winding current of a synchronous motor 6 (described later) are employed instead of the current-fed inverter 5. The other arrangement sections are similar to those of the synchronous motor driving device illustrated in FIG. 5. Further, in FIG. 7, the current control section 5a, voltage-fed inverter 5b, winding current detecting section 5c and current deviation calculating section 5d constitute a current-fed inverter.

Figure 8:
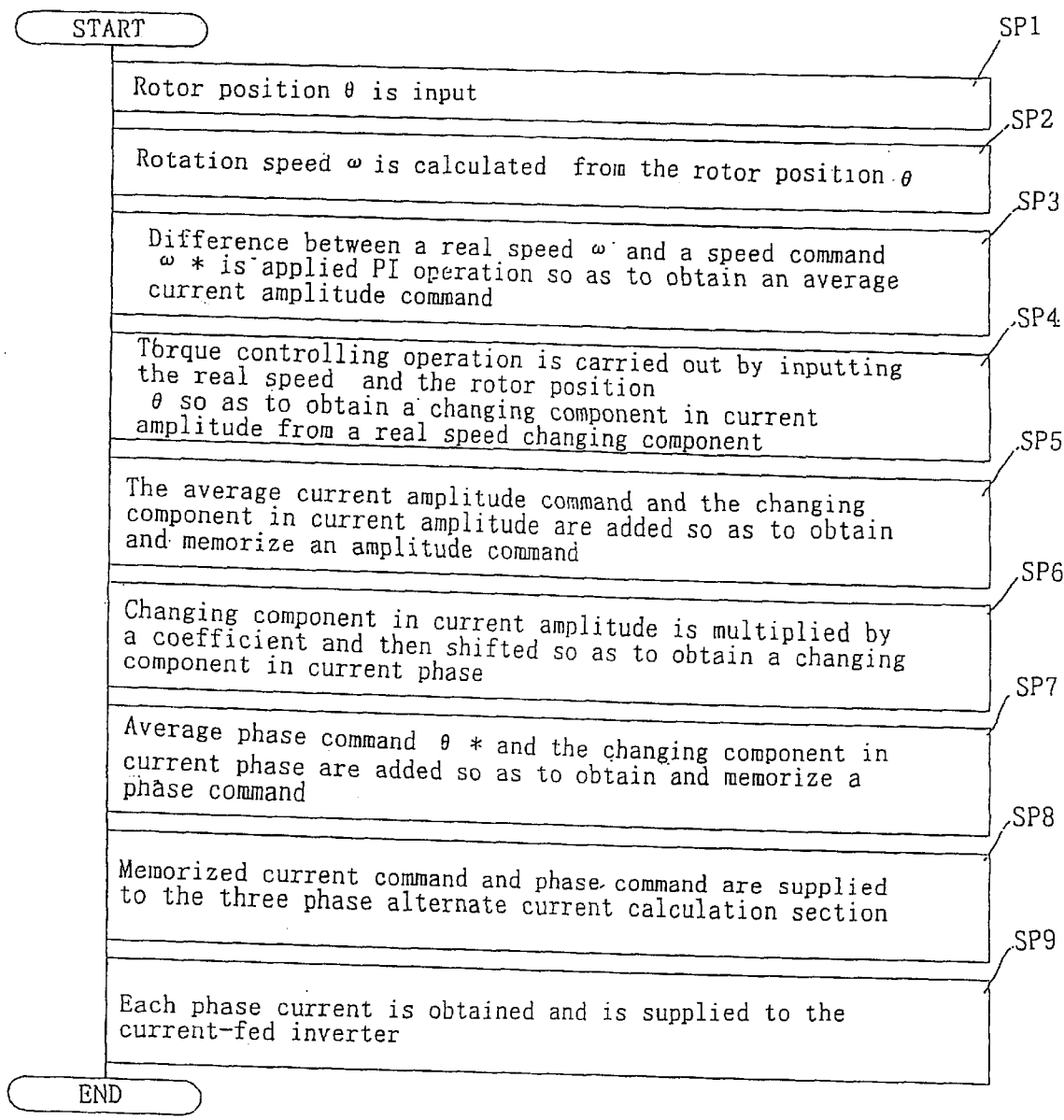
FIG. 8 is a flowchart useful in understanding the operation of the synchronous motor driving device illustrated in FIG. 7.

FIG. 8 is a flowchart useful in understanding an operation of the synchronous motor driving device illustrated in FIG. 7.

In step SP1, a rotor position (position angle) θ is input, in step SP2, a rotation speed (motor speed) ω is calculated from the rotor position, in step SP3, a difference between a real speed and a speed command ω* is applied a PI operation (proportional, integral operation) so as to obtain an average current amplitude command, in step SP4, the torque control operation is carried out by inputting the real speed ω and the rotor position so as to obtain a changing component in current amplitude from a real speed changing component, in stop SP5, the average current amplitude command and the changing component in current amplitude are added so as to obtain and memorize an amplitude command, in step SP6, the changing component in current amplitude is multiplied by a coefficient and then shifted so as to obtain a changing component in current phase (wherein, the coefficient, shifting amount are determined experimentally, for example), in step SP7, an average phase command ω* and the changing component in current phase are added so as to obtain and memorize a phase command, in step SP8, the memorized current command and phase command are supplied to the three phase alternate current calculation section, in step SP9, each phase current is obtained and is supplied to the current-fed inverter, then the operation returns to an original processing.

Therefore, reduction in vibration is realized by adding the average current amplitude command and the changing component in the current amplitude so as to obtain the amplitude command. Also, improvement in efficiency is realized by adding the average phase command β* from the exterior and the changing component in the current phase so as to obtain the phase command. As a result, a cyclic intermittent load is applied torque control under a maximum efficiency condition so that vibration is reduced.

Further, the synchronous motor driving device illustrated in FIG. 7 can be simplified in its arrangement in its entirety, because the device employs a voltage-fed inverter which has a main circuitry arrangement which is more simple than that of a current-fed inverter.

Figure 9:
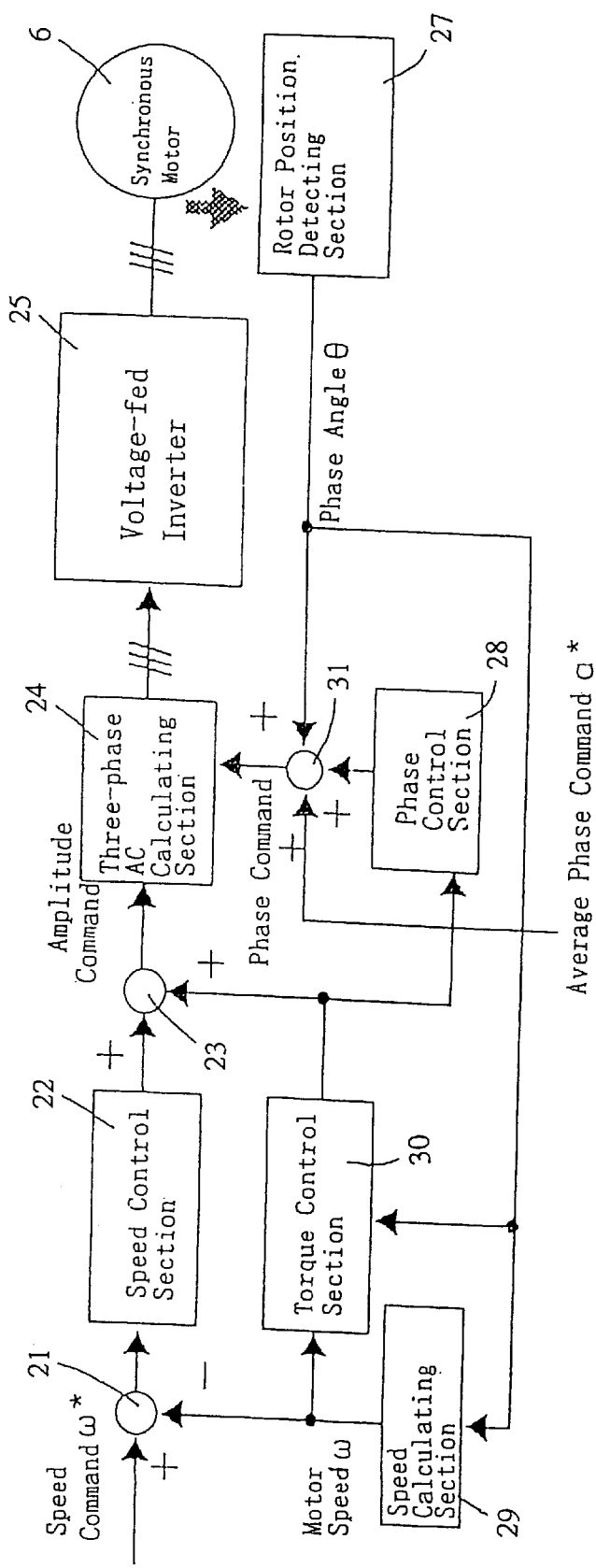
FIG. 9 is a block diagram illustrating a further embodiment of a synchronous motor driving device according to the present invention.

FIG. 9 is a block diagram illustrating a synchronous motor driving device of a further embodiment according to the present invention.

This synchronous motor driving device includes a speed deviation calculating section 21 for calculating a deviation between a speed command ω* and a motor speed ω, a speed control section 22 for outputting an average value command of a voltage amplitude by inputting the calculated deviation and by carrying out a predetermined operation (for example, a PI operation), a voltage amplitude command output section 23 for adding the average value command of the voltage amplitude and a changing component of the voltage amplitude at every rotation position output from a torque controlling section 30 (described later) and for outputting a voltage amplitude command, a three phase alternate current calculating section 24 for inputting the voltage amplitude command and a voltage phase command output from a voltage phase command output section 31 (described later) and for outputting three phase alternate current command based upon a formula (9) for example, a voltage-fed inverter 25 for inputting the three phase alternate current command, a synchronous motor 6 to which is applied the output of the voltage-fed inverter 25, a rotor position detecting section 27 for detecting a pole position of a rotor of the synchronous motor 6 and for outputting a position angle θ therefrom, a speed calculating section 29 for inputting the position angle θ and for calculating and outputting a motor speed ω therefrom, the torque control section 30 for inputting the motor speed ω and position angle θ, for carrying out torque control operation, and for outputting a changing component of the voltage amplitude at every rotation position, a phase control section 28 for inputting the changing component of the voltage amplitude at every rotation position, for carrying out a phase control operation (For example, a predetermined coefficient is multiplied and a phase shifting operation is carried out), and for calculating and outputting a changing component command of a voltage phase, and the voltage phase command output section 31 for adding an average phase command β* which is obtained by a manner which is known in the past and the changing component command and for calculating and outputting the voltage phase command therefrom.

$$\begin{cases} vu = Vm \cdot \cos(\theta + \alpha) \\ vv = Vm \cdot \cos\left(\theta - \frac{2\pi}{3} + \alpha\right) \\ vw = Vm \cdot \cos\left(\theta + \frac{2\pi}{3} + \alpha\right) \end{cases} \quad (9)$$

Wherein, Vm is a voltage amplitude, α is a voltage phase herein, Vm is a

Further, the rotor position detection section 27 is exemplified as a rotation position sensor such as an encoder and a counter circuitry for the output therefrom, a position detecting circuitry for performing filtering to a motor terminal voltage, a circuitry for carrying out position calculation from electrical parameters of a motor and the like.

Figure 10:
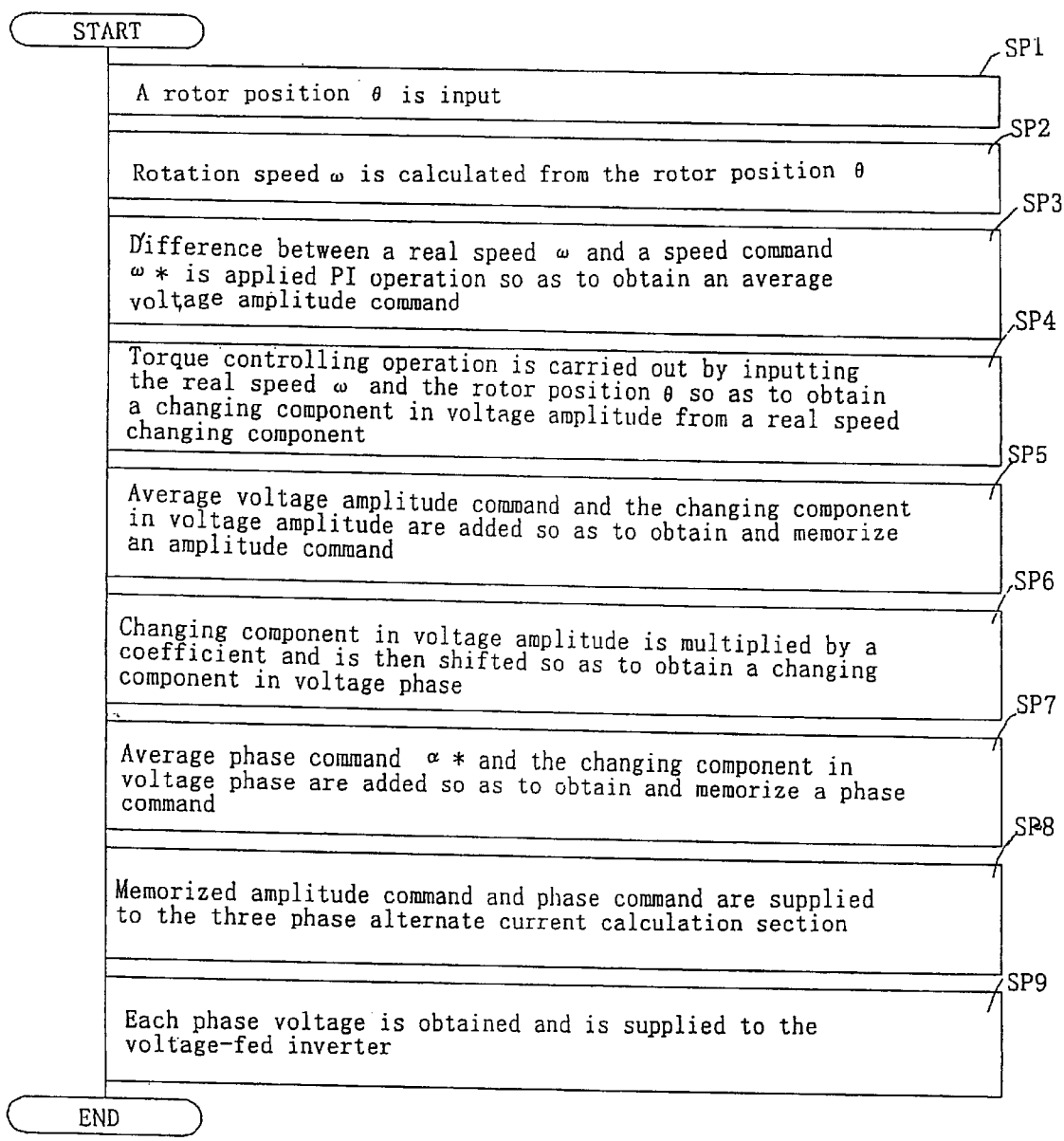
FIG. 10 is a flowchart useful in understanding the operation of the synchronous motor driving device illustrated in FIG. 9.

FIG. 10 is a flowchart useful in understanding an operation of the synchronous motor driving device illustrated in FIG. 9.

In step SP1, a rotor position (position angle) is input, in step SP2, a rotation speed (motor speed) ω is calculated from the rotor position θ, in step SP3, a difference between a real speed and a speed command ω* is applied a PI operation (proportional, integral operation) so as to obtain an average voltage amplitude command, in step, SP4, torque control operation is carried out by inputting the real speed ω and the rotor position so as to obtain a changing component in voltage amplitude from a real speed changing component, in step SP5, the average voltage amplitude command and the changing component in voltage amplitude are added so as to obtain and memorize an amplitude command, in step SP6, the changing component in voltage amplitude is multiplied by a coefficient and then shifted so as to obtain a changing component in voltage phase (wherein, the coefficient, shifting amount are determined experimentally, for example), in step SP7, an average phase command α* and the changing component in voltage phase are added so as to obtain and memorize a phase command, in step SP8, the memorized amplitude command and phase command are supplied to the three phase alternate current calculating section, in step SP9, each phase voltage is obtained and is supplied to the voltage-fed inverter, then the operation returns to an original processing.

Therefore, reduction in vibration is realized by adding the average voltage amplitude command and the changing component in the voltage amplitude so as to obtain the amplitude command. Also, improvement in efficiency is realized by adding the average phase command α* from the exterior and the changing component in the voltage phase so as to obtain the phase command. As, a result, a cyclic intermittent load is applied the torque control under a maximum efficiency condition so that vibration is reduced.

Figure 11:
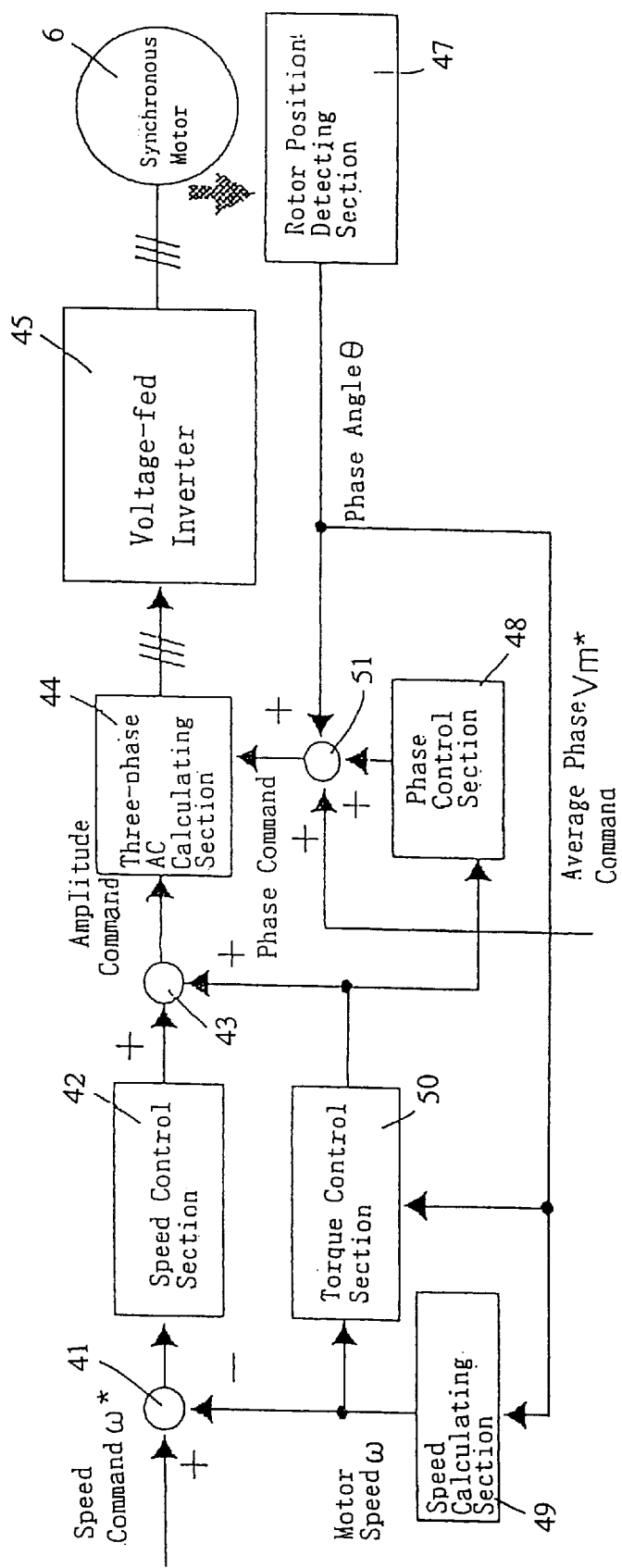
FIG. 11 is a block diagram illustrating yet another embodiment of a synchronous motor driving device according to the present invention.

FIG. 11 is a block diagram illustrating a synchronous motor driving device of yet another embodiment according to the present invention.

This synchronous motor driving device includes a speed deviation calculating section 41 for calculating a deviation between a speed command ω* and a motor speed ω, a speed control section 42 for outputting an average value command of a voltage phase by inputting the calculated deviation and by carrying out a predetermined operation (for example, a PI operation), a voltage phase command output section 43 for adding the average value command of the voltage phase and a changing component of the voltage phase at every rotation position output from a torque control section 50 (described later) and for outputting a voltage phase command, a three phase alternate current calculating section 44 for inputting the voltage phase command and a voltage amplitude command output from a voltage amplitude command output section 51 (described later) and for outputting a three phase alternate current command based upon a formula (9) for example, a voltage-fed inverter 45 for inputting the three phase alternate current command, a synchronous motor 6 to which is applied the output of the voltage-fed inverter 45, a rotor position detecting section 47 for detecting a pole position of a rotor of the synchronous motor 6 and for outputting a position angle θ therefrom, a speed calculating section 49 for inputting the position angle θ and for calculating and outputting a motor speed therefrom, the torque control section 50 for inputting the motor speed ω and position angle, for carrying out torque control operation, and for outputting a changing component of the voltage phase at every rotation position, an amplitude control section 48 for inputting the changing component of the voltage phase at every rotation position, for carrying out an amplitude control operation (for example, a predetermined coefficient is multiplied and a phase shifting operation is carried out), and for calculating and outputting a changing component command of a voltage amplitude, and the voltage amplitude command output section 51 for adding an average amplitude command Vm* which is obtained by a manner which is known in the past and the changing component command and for calculating and outputting the voltage amplitude command therefrom.

Further, the rotor position detecting section 47 is exemplified as a rotational position sensor such as an encoder and a counter circuitry for the output therefrom, a position detecting circuitry for performing filtering to a motor terminal voltage, a circuitry for carrying out position calculation from electrical parameters of a motor and the like.

Figure 12:
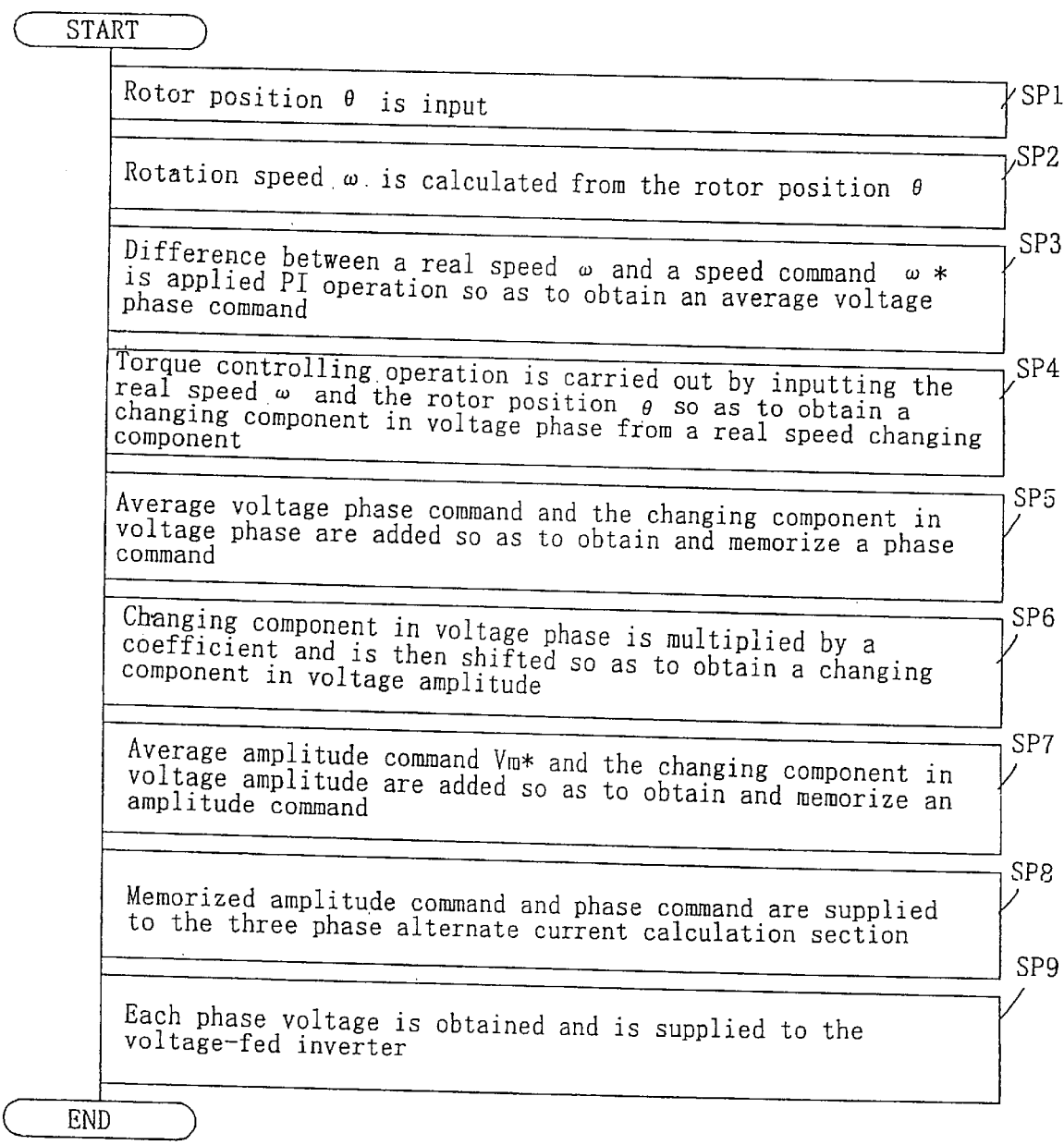
FIG. 12 is a flowchart useful in understanding the operation of the synchronous-motor driving device illustrated in FIG. 11.

FIG. 12 is a flowchart useful in understanding an operation of the synchronous motor driving device illustrated in FIG. 11.

In step SP1, a rotor position (position angle) θ is input, in step SP2, a rotation speed (motor speed) ω is calculated from the rotor position θ, in step SP3, a difference between a real speed and a speed command ω* is applied a PI operation (proportional, integral operation) so as to obtain an average voltage phase command, in step SP4, torque control operation is carried out by inputting the real speed ω and the rotor position θ so as to obtain a changing component in voltage phase from a real speed changing component, in step SP5, the average voltage phase command and the changing component in voltage phase are added so as to obtain and memorize a phase command, in step SP6, the changing component in voltage phase is multiplied by a coefficient and is then shifted so as to obtain a changing component in voltage amplitude (wherein, the coefficient, shifting amount are determined experimentally, for example), in step SP7, an average amplitude command Vm* and the changing component in voltage amplitude are added so as to obtain and memorize an amplitude command, in step SP8, the memorized amplitude command and phase command are supplied to the three phase alternate current calculating section, in step SP9, each phase voltage is obtained and is supplied to the voltage-fed inverter, then the operation returns to an original processing.

Therefore, reduction in vibration is realized by adding the average voltage phase command and the changing component in the voltage phase so as to obtain the phase command. Also, improvement in efficiency is realized by adding the average amplitude command Vm* from the exterior and the changing component in the voltage amplitude so as to obtain the amplitude command. As a result, a cyclic intermittent load is applied the torque control under a maximum efficiency condition so that vibration is reduced.

Figure 13:
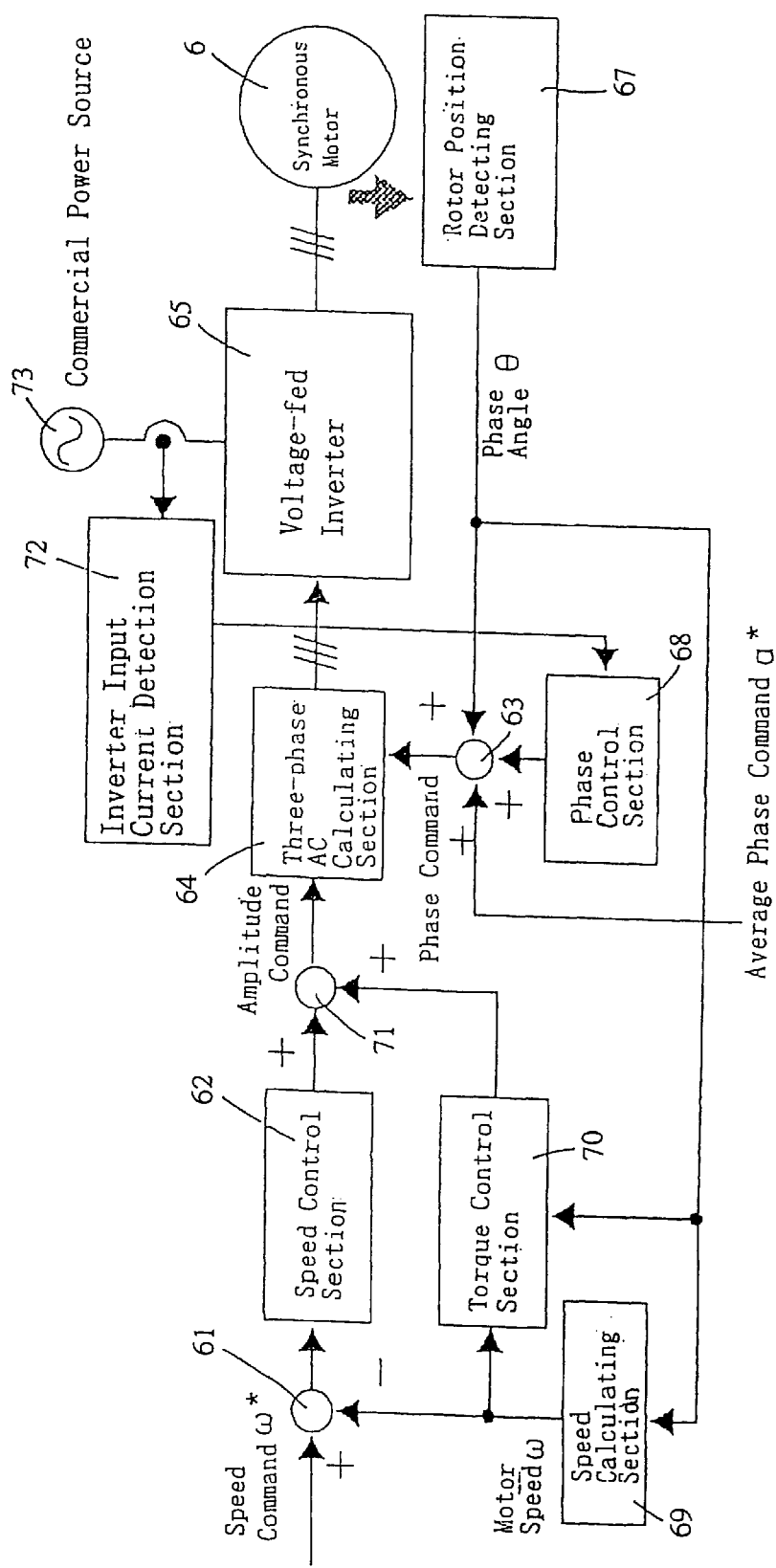
FIG. 13 is a block diagram illustrating yet further embodiment of a synchronous motor driving device according to the present invention.

FIG. 13 is a block diagram illustrating a synchronous motor driving device of a yet further embodiment according to the present invention.

This synchronous motor driving device includes a speed deviation calculating section 61 for calculating a deviation between a speed command ω* and a motor speed ω, a speed control section 62 for outputting an average value command of a voltage amplitude by inputting the calculated deviation and by carrying out a predetermined operation (for example, a PI operation), a voltage amplitude command output section 63 for adding the average value command of the voltage amplitude and a changing component of the voltage amplitude at every rotation position output from a torque control section 70 (described later) and for outputting a voltage amplitude command, a three phase alternate current calculating section 64 for inputting the voltage amplitude command and a voltage phase command output from a voltage phase command output section 71 (described later) and for outputting a three phase alternate current command based upon a formula (9) for example, a voltage-fed inverter 65 for inputting the three phase alternate current command, a synchronous motor 6 to which is applied the output of the voltage-fed inverter 65, a rotor position detecting section 67 for detecting a pole position of a rotor of the synchronous motor 6 and for outputting a position angle therefrom, a speed calculating section 69 for inputting the position angle θ and for calculating and outputting a motor speed ω therefrom, the torque control section 70 for inputting the motor speed and position angle θ, for carrying out torque control operation, and for outputting a changing component of the voltage amplitude at every rotation position, a phase control section 68 for inputting an inverter input current detected by an inverter-input current detecting section 72 (described later), for carrying out a phase control operation, and for calculating and outputting a changing component command of a voltage phase, the voltage phase command output section 71 for adding an average phase command α* which is obtained by a manner which is known in the past and the changing component command and for calculating and outputting the voltage phase command therefrom, and the inverter input current detecting section 72 for detecting the inverter input current (one species of detection quantities which are related to efficiency) which is supplied to the voltage-fed inverter 65 from a commercial power source 73.

Further, the rotor position detecting section 67 is exemplified as a rotation position sensor such as an encoder and a counter circuitry for the output therefrom, a position detecting circuitry for performing filtering to a motor-terminal voltage, a circuitry for carrying out position calculation from electrical parameters of a motor and the like.

Furthermore, it is possible that the current control is carried out by adding a winding current detecting section and a current controlling section. Also, it is possible that a current-fed inverter is employed instead of the voltage-fed inverter.

Figure 14:
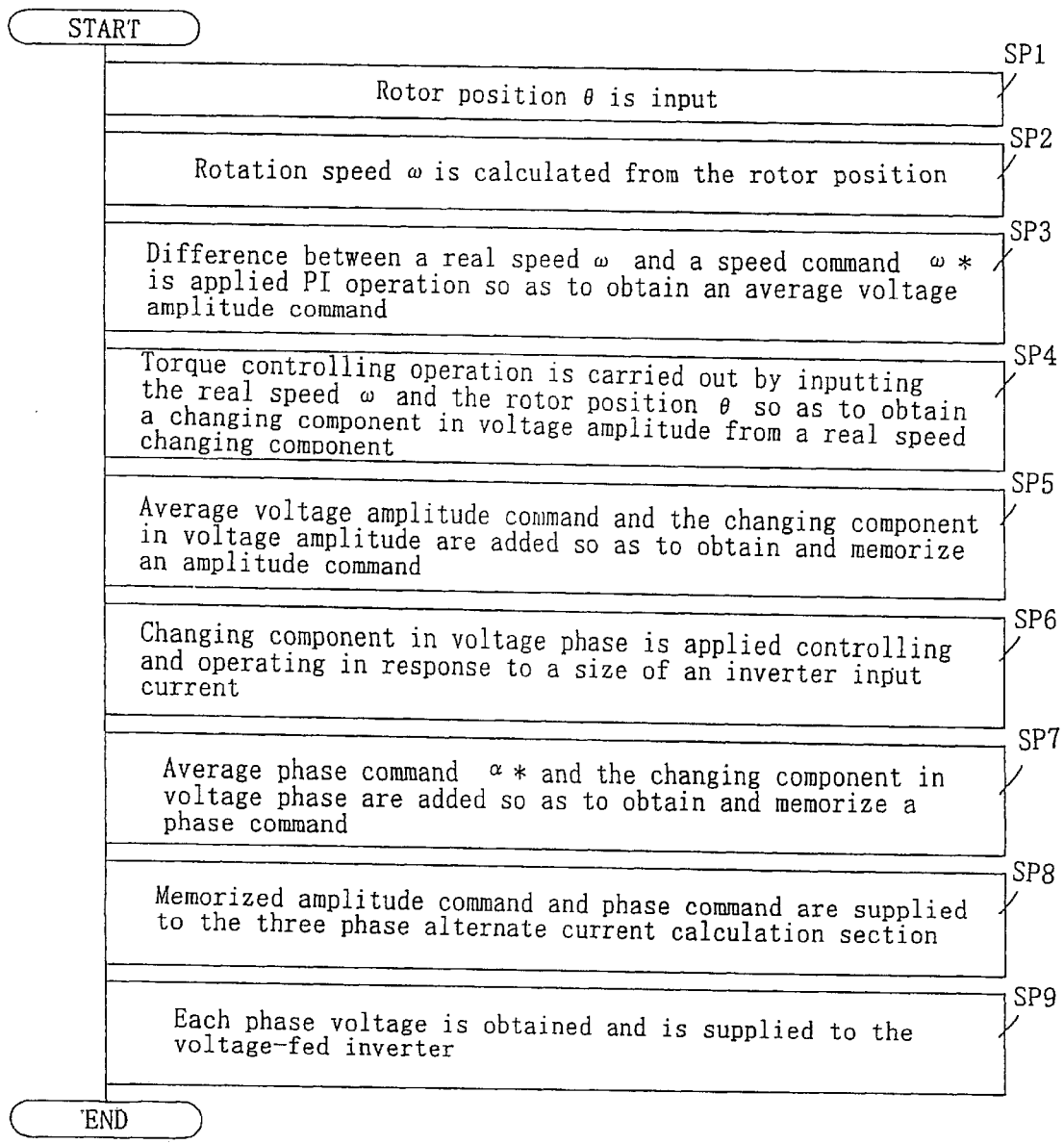
FIG. 14 is a flowchart useful in understanding the operation of the synchronous motor driving device illustrated in FIG. 13.

FIG. 14 is a flowchart useful in understanding an operation of the synchronous motor driving device illustrated in FIG. 13.

In step SP1, a rotor position (position angle) θ is input, in step SP2, a rotation speed (motor speed) ω is calculated from the rotor position θ, in step SP3, a difference between a real speed ω and a speed command ω* is applied a PI operation (proportional, integral operation) so, as to obtain an average voltage amplitude command, in step SP4, the torque control operation is carried out by inputting the real speed ω and the rotor position θ so as to obtain a changing component in voltage amplitude from a real speed changing component, in step SP5, the average voltage amplitude command and the changing component in voltage amplitude are added so as to obtain and memorize an amplitude command, in step SP6, the changing component in voltage phase is applied for controlling and operating in response to a size of an inverter input current (for minimizing the inverter input current), in step SP7, an average phase command α* and the changing component in voltage phase are added so as to obtain and memorize a phase command, in step SP8, the memorized amplitude command and phase command are supplied to the three phase alternate current calculation section, in step SP9, each phase voltage is obtained and is supplied to the voltage-fed inverter, then the operation returns to an original processing.

Therefore, reduction in vibration is realized by adding the average voltage amplitude command and the changing component in the voltage amplitude so as to obtain the amplitude command. Also, improvement in efficiency by performing control which takes iron losses into consideration is realized by calculating the changing component in voltage phase in response to the size of the inverter input current (for minimizing the inverter input current) and by adding, the changing component in voltage phase and the average amplitude command Vm* from the exterior so as to obtain the phase command. As a result, a cyclic intermittent load is applied the torque control under a maximum efficiency condition so that vibration is reduced.

Furthermore, control for minimizing an inverter input power may be carried out by adding voltage detection and by calculating an inverter input power, instead of controlling and operating of the changing component in voltage phase in response to the size of the inverter input current.

Figure 15:
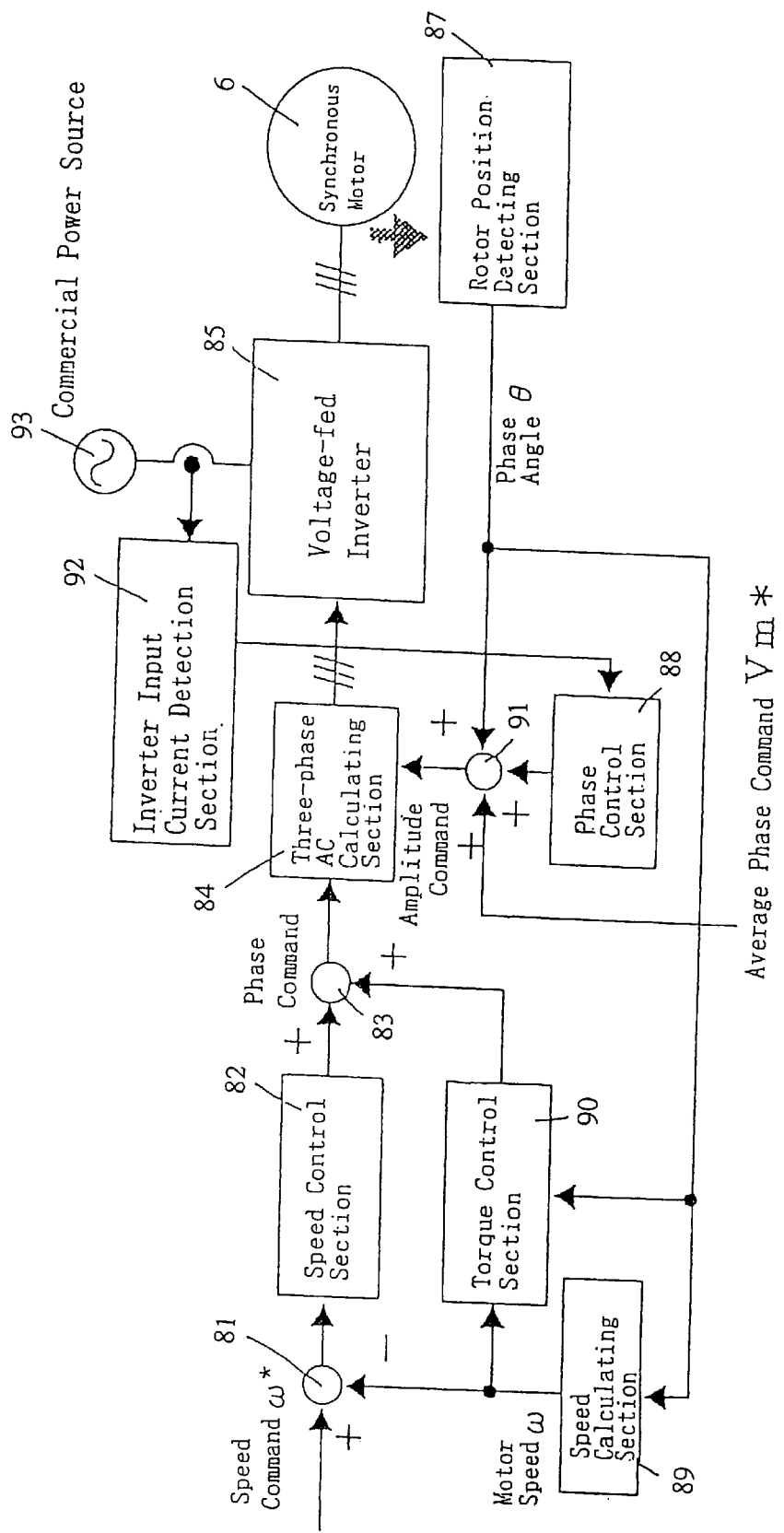
FIG. 15 is a block diagram illustrating a further embodiment of a synchronous motor driving device according to the present invention.

FIG. 15 is a block diagram illustrating a synchronous motor driving device of a further embodiment according to the present invention.

This synchronous motor driving device includes a speed deviation calculating section 81 for calculating a deviation between a speed command ω* and a motor speed ω, a speed-control section 82 for outputting an average value command of a voltage phase by inputting the calculated deviation and by carrying out a predetermined operation (for example, a PI operation), a voltage phase command output section 83 for adding the average value command of the voltage phase and a changing component of the voltage phase at every rotation position output from a torque control section 90 (described later) and for outputting a voltage phase command, a three phase alternate current calculation section 84 for inputting the voltage phase command and a voltage amplitude command output from a voltage amplitude command output section 91 (described later) and for outputting a three phase alternate current command based upon a formula (9) for example, a voltage-fed inverter 85 for inputting the three phase alternate current command, a synchronous motor 6 to which is applied the output of the voltage-fed inverter 85, a rotor position detecting section 87 for detecting a pole position of a rotor of the synchronous motor 6 and for outputting a position angle θ therefrom, a speed calculating section 89 for inputting the position angle θ and for calculating and outputting a motor speed therefrom, the torque control section 90 for inputting the motor speed ω and position angle, for carrying out torque control operation, and for outputting a changing component of the voltage phase at every rotation position, an amplitude control section 88 for inputting an inverter input current detected by an inverter input current detecting section 92 (described later), for carrying out an amplitude control operation, and for calculating and outputting a changing component command of a voltage amplitude, the voltage amplitude command output section 91 for adding an average amplitude command α* which is obtained by a manner which is known in the past and the changing component command and for calculating and outputting the voltage amplitude command therefrom, and the inverter input current detecting section 92 for detecting the inverter input current (one species of detection quantities which are related to efficiency) which is supplied to the voltage-fed inverter 85 from a commercial power source 93.

Further, the rotor position detecting section 87 is exemplified as a rotation position sensor such as an encoder and a counter circuitry for the output therefrom, a position detecting circuitry for performing filtering to a motor terminal voltage, a circuitry for carrying out position calculation from electrical parameters of a motor and the like.

Furthermore, it is possible that current control is carried out by adding a winding current detecting section a current control station. Also, it is possible that a current-fed inverter is employed instead of the voltage-fed inverter. Further, a control for minimizing an inverter input power may be carried out by adding detection of voltage and by calculating an inverter input power, instead of controlling and operating of the changing component in voltage phase in response to the size of the inverter input current.

Figure 16:
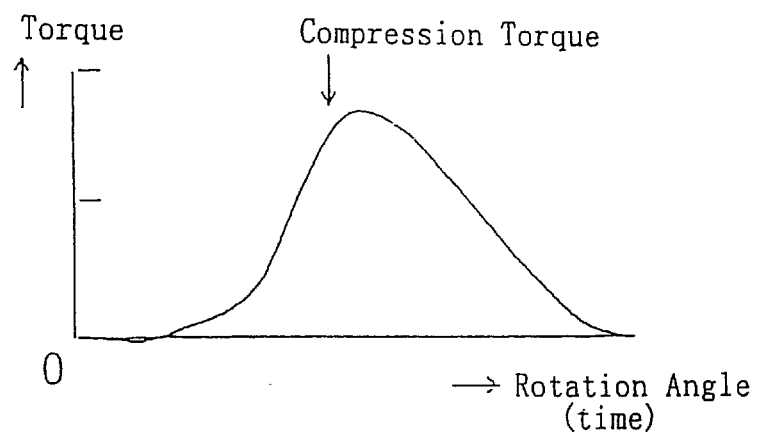
FIG. 16 is a chart illustrating the relationship between the compression torque and the rotational angle of the one cylinder compressor.
Figure 17:
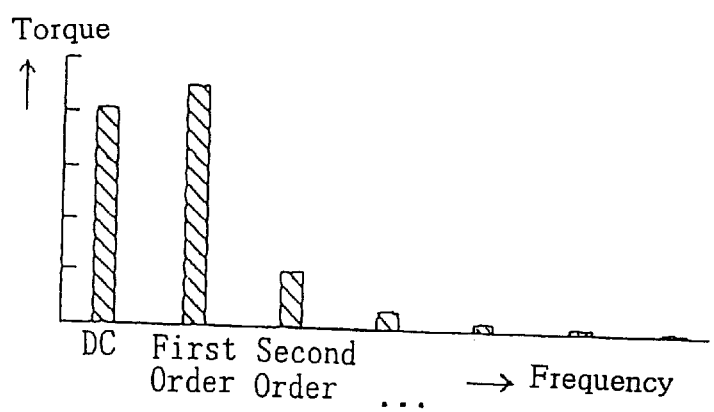
FIG. 17 is a chart illustrating the frequency distribution of the compression torque.

FIG. 16 is a chart illustrating change in load torque corresponding to the rotation angle of one cylinder compressor, while FIG. 17 is a chart illustrating the frequency distribution of the load torque.

As is apparent from these figures, an actual intermittent load includes many frequency components. When a torque control is carried out for completely compensating the frequency components and for suppressing speed change which is a cause of vibration, a disadvantage arises in that an effective value and a peak value of a motor current are increased.

Wherein, as to torque intermittent component of higher harmonics, the speed change becomes small and gives little influence to vibration because of the flywheel effect due to the moment of inertia of a synchronous motor and a load. Therefore, an unnecessary current for dealing with torque intermittence which gives little influence to vibration can be omitted by determining the frequency of intermittent torque for compensating using the torque control to be the fundamental wave and lower harmonics, so that more efficient control of the synchronous motor is realized by combining with the above synchronous motor driving device, synchronous motor driving method. Specifically, it is easily dealt with by applying a filtering function to the torque control section which is included in the above synchronous motor driving device, for example.

Further when a compressor is installed in an air conditioner, a design for absorbing vibration which is transmitted to the housing of an outdoor section is realized by designing a shape of each pipe for connecting a heat exchanger and the compressor, by realizing supporting using a rubber foot member, or the like. Therefore, little problems arise in practice even when the frequency of intermittent torque for compensating using the torque control is limited to only the fundamental wave, so that more efficient control is realized. Of course, an operation similar to the above operation is realized when the synchronous motor driving device is applied to an apparatus other than the air conditioner, such as a refrigerator or the like, for example.

Figure 18:
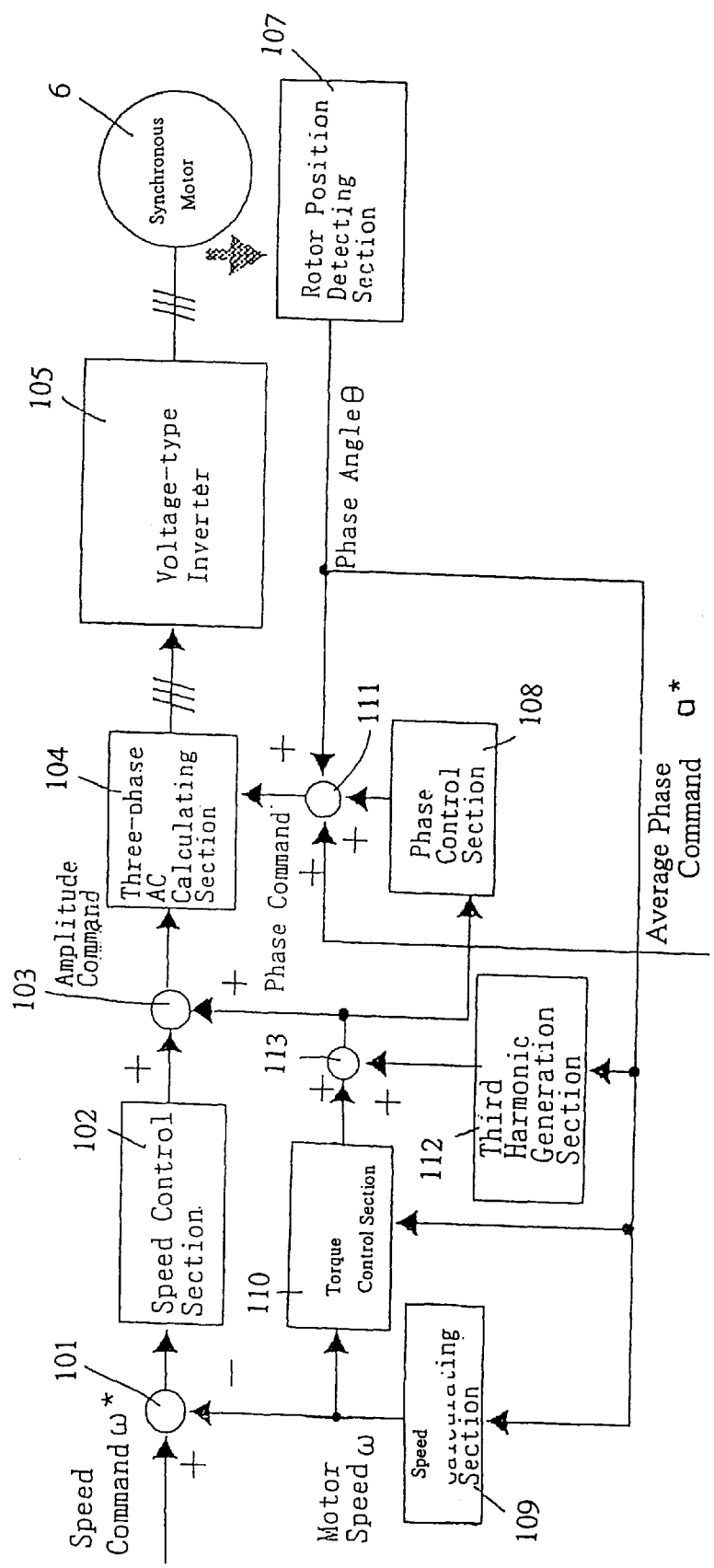
FIG. 18 is a block diagram illustrating a further embodiment of a synchronous motor driving device according to the present invention.

FIG. 18 is a block diagram illustrating a synchronous motor driving device of a yet further embodiment according to the present invention. This synchronous motor driving device includes a speed deviation calculating section 101 for calculating a deviation between a speed command $\omega^*$ and a motor speed $\omega$, a speed control section 102 for outputting an average value command of a voltage amplitude by inputting the calculated deviation and by carrying out a predetermined operation (for example, a PI operation), a voltage amplitude command output section 103 for adding the average value command of the voltage amplitude and a changing component of the voltage amplitude at every rotation position output from a voltage amplitude changing component output section 113 (described later) and for outputting a voltage amplitude command, a three phase alternate current calculating section 104 for inputting the voltage amplitude command and a voltage phase command output from a voltage phase command output section 111 (described later) and for outputting a three phase alternate current command based upon a formula (9) for example, a voltage-fed inverter 105 for inputting the three phase alternate current command, a synchronous motor 6 to which is applied the output of the voltage-fed inverter 105, a rotor position detecting section 107 for detecting a pole position of a rotor of the synchronous motor 6 and for outputting a position angle $\theta$ therefrom, a speed calculating section 109 for inputting the position angle $\theta$ and for calculating and outputting a motor speed therefrom, a torque control section 110 for inputting the motor speed $\omega$ and position angle $\theta$, for carrying out a torque control operation, and for outputting a changing component of the voltage amplitude at every rotation position, a phase control section 108 for inputting a changing component of voltage amplitude at every rotation position output from the voltage amplitude changing component output section 113, for carrying out a phase control operation (for example, multiplied by a predetermined coefficient, and carried out phase shifting operation), and for calculating and outputting a changing component command of a voltage phase, the voltage phase command output section 111 for adding an average phase command $\alpha^*$ which is obtained by a manner which is known in the past and the changing component command and for calculating and outputting the voltage phase command therefrom, a third harmonic generation section 112 for inputting the position angle $\theta$ and for generating a third order harmonic, and the voltage amplitude changing component output section 113 for adding the changing component of voltage amplitude output from the torque controlling section 110 and the third order harmonic and for outputting the changing component of voltage amplitude at every rotation position.

Further, the rotor position detecting section 107 is exemplified as a rotation position sensor such as an encoder and a counter circuitry for the output therefrom, a position detection circuitry for performing a filtering to a motor terminal voltage, a circuitry for carrying out position calculation from electrical parameters of a motor and the like.

Figure 19:
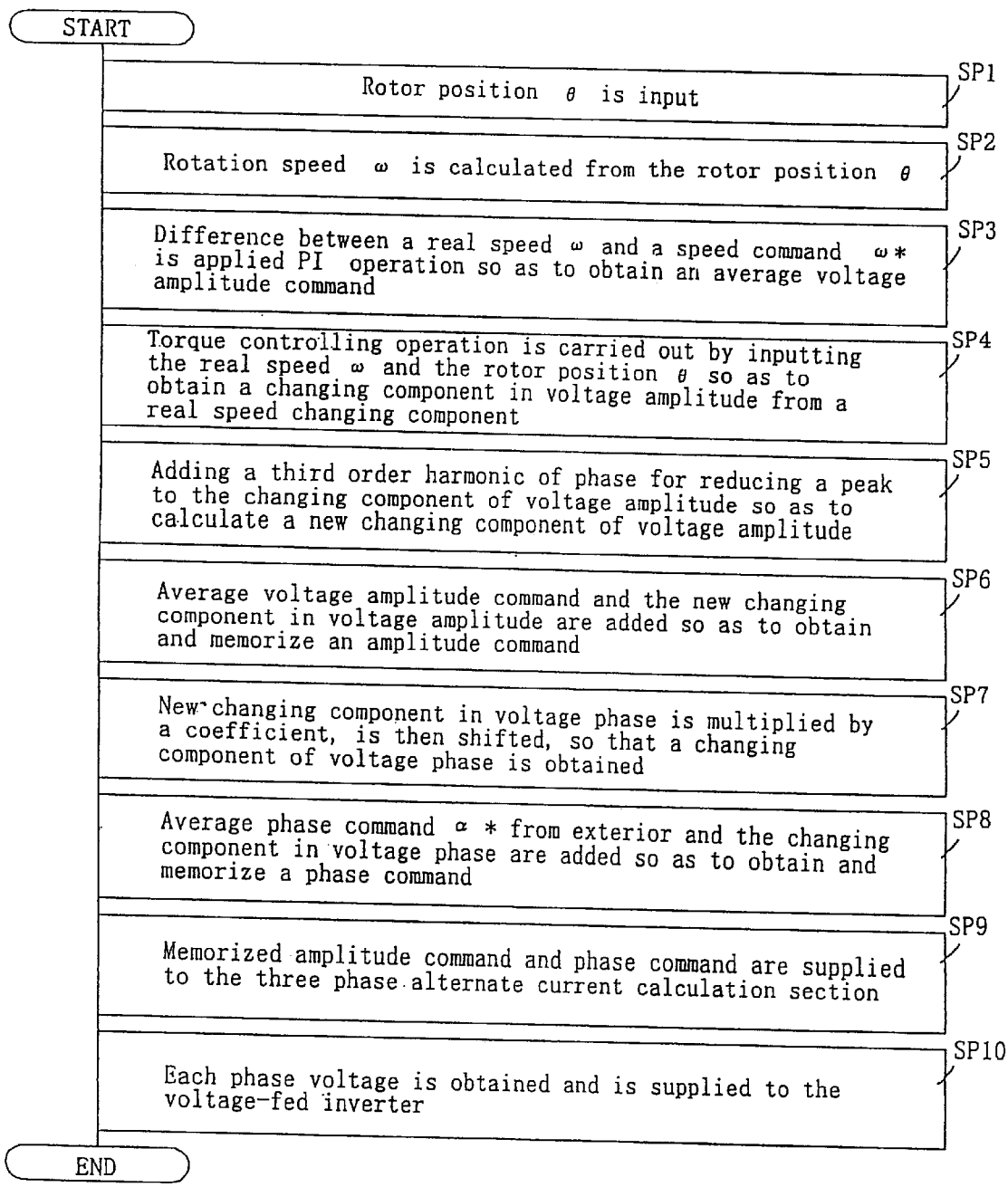
FIG. 19 is a flowchart useful in understanding the operation of the synchronous motor driving device illustrated in FIG. 18.

FIG. 19 is a flowchart useful in understanding an operation of the synchronous motor driving device illustrated in FIG. 18.

In step SP1, a rotor position (position angle) $\theta$ is input, in step SP2, a rotation speed (motor speed) $\omega$ is calculated from the rotor position $\theta$, in step SP3, a difference between a real speed $\omega$ and a speed command $\omega^*$ is applied a PI operation (proportional, integral operation) so as to obtain an average voltage amplitude command, in step SP4, a torque control operation is carried out by inputting the real speed $\omega$ and the rotor position so as to obtain a changing component in voltage amplitude from a real speed changing component, in step SP5, for adding a third order harmonic of phase for reducing a peak to the changing component of voltage amplitude so as to calculate a new changing component of voltage amplitude, in step SP6, the average voltage amplitude command and the new changing component in voltage amplitude are added so as to obtain and memorize an amplitude command, in step SP7, the new changing component in voltage phase is multiplied by a coefficient, the product is then shifted, so that a changing component of voltage phase is obtained (wherein, the coefficient, and shifting amount are determined experimentally, for example), in step SP8, an average phase command $\alpha^*$ from the exterior and the changing component in voltage phase are added so as to obtain and memorize a phase command, in step SP9, the memorized amplitude command and phase command are supplied to the three phase alternate current calculation section, in step SP10, each phase voltage is obtained and is supplied to the voltage-fed inverter, then the operation returns to an original processing.

Therefore, reduction in vibration is realized by adding the average voltage amplitude command and the changing component in the voltage amplitude so as to obtain the amplitude command. Also, improvement in efficiency is realized by adding the average phase command $\beta^*$ from the exterior and the changing component of voltage phase so as to obtain the phase command. As a result, a cyclic intermittent load is applied a torque control under a maximum efficiency condition so that vibration is reduced Furthermore, a current control may be carried out by adding a winding current detecting section and a current control section. Further, in the embodiments illustrated in FIG. 18 and FIG. 19, the third order harmonic is superposed upon the voltage command, but the third order harmonic may be superposed upon the current command. In this case, current-fed inverter or current control type inverter which comprises a voltage-fed inverter, a winding current detecting section in addition, and a current control section in addition, for performing current controlling. And, in each case, a superposing degree of the third order harmonic is determined based upon the specification of the synchronous motor driving system.

Figure 20:
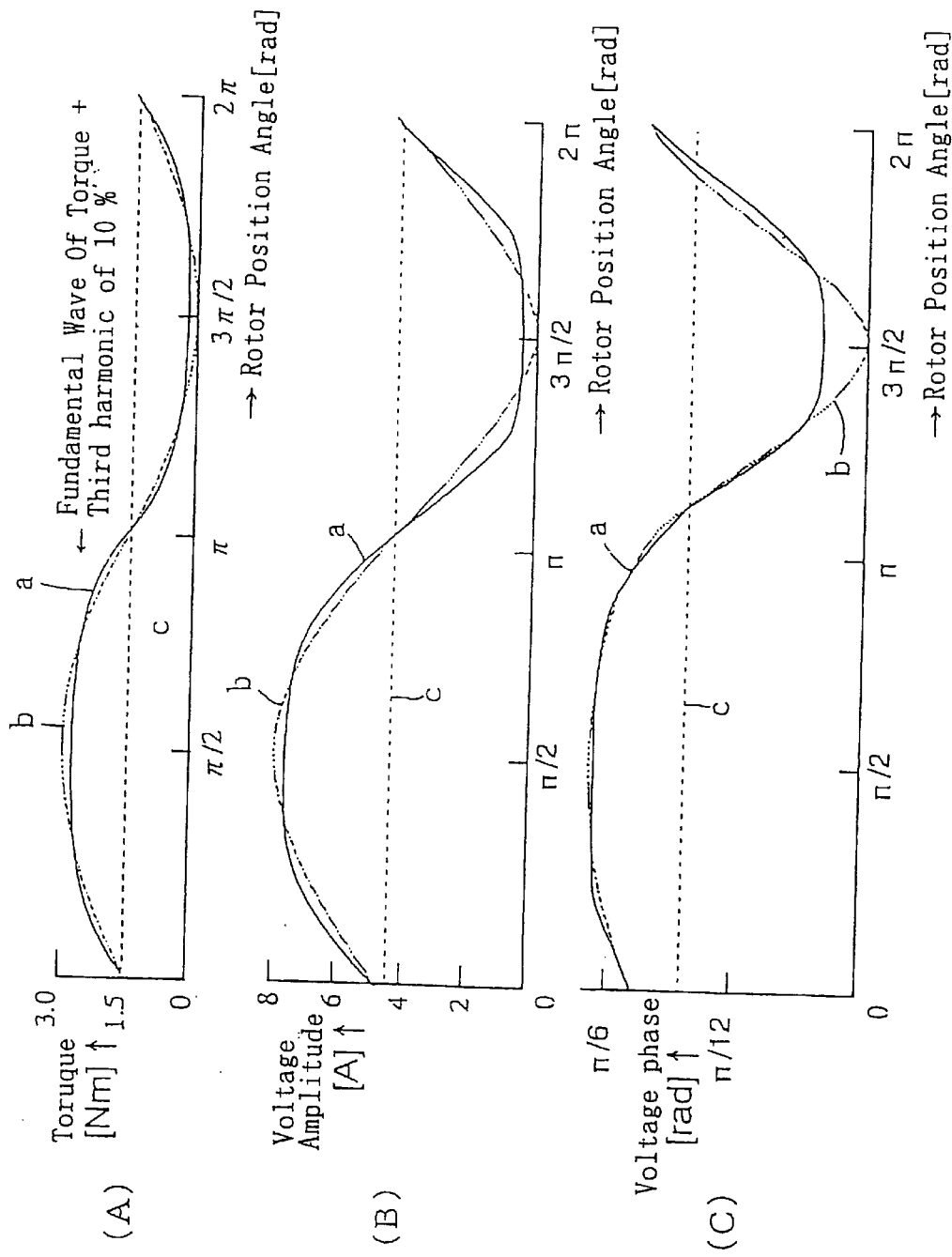
FIG. 20 are charts illustrating changing in torque, current amplitude, current phase when a third order harmonic in a current waveform is adjusted so that the third order harmonic which has a size of about 10% with respect to a size of fundamental wave of the torque is superposed upon the torque waveform.

FIG. 20 are charts illustrating torque waveforms {refer to FIG. 20(A)}, current amplitude waveforms {refer to FIG. 20(B)}, and current phase waveforms {refer to FIG. 20(C)} when the third order harmonic of the current waveform is superposed so that the third order harmonic of about 10% with respect to the fundamental wave of torque is superposed upon the torque waveform. Wherein, in each figure, a represents a waveform which is obtained by superposing the third order harmonic, b represents a waveform which is not superposed the third order harmonic, and c represents an average value.

As is apparent from the figures, a peak of the current amplitude (a peak of the motor current) is suppressed by superposing the third order harmonic. Therefore, driving with a shifted operation point caused by a limitation in the current capacity of an inverter element is not needed, and a control of the synchronous motor driving device, and synchronous motor driving method illustrated in FIG. 5 to FIG. 15 is realized in wider range.

When the control is carried out for superposing the third order harmonic as the above control, the third order harmonic may not be included in tho load torque, or the third order harmonic may increase speed change in the case where the amplitude relationship or the phase relationship is different from the above relationship. But, this does not raise a problem in practice and this has the above advantage so that it is preferable that the superposing of the third order harmonic is applied to a synchronous motor driving device and a synchronous motor driving method, by taking the flywheel effects being great and the vibration preventing design which is applied at the installing time into consideration.

Figure 21:
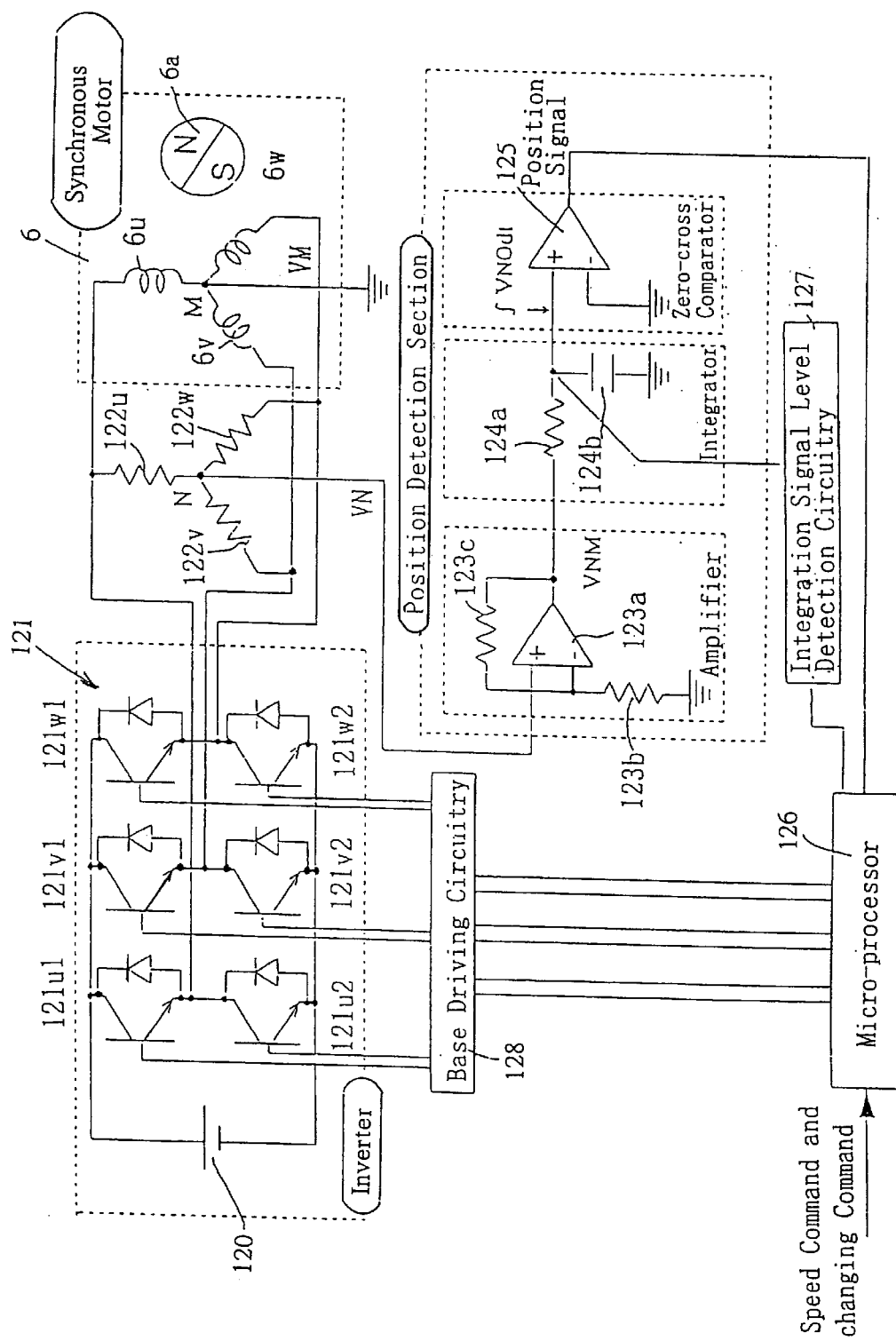
FIG. 21 is an electric circuitry diagram illustrating a yet further embodiment of a synchronous motor driving device according to the present invention.

FIG. 21 is a block diagram illustrating a synchronous motor driving device of a further embodiment according to the present invention.

In this synchronous motor driving device, three serial connection circuits are connected in parallel to one another between terminals of a direct current power source 120 so that a voltage-fed inverter 121 is constructed, each serial connection circuit being constructed by connecting two switching transistors in series. Further, a diode for protection is connected in parallel to each switching transistor. Three resistances 122$u$, 122$v$ and 122$w$ which are connected in a Y-connection arrangement, and stator windings 6$u$, 6$v$ and 6$w$ of a synchronous motor 6 which are connected in a Y-connection arrangement, are connected to a center point of each serial connection circuitry. Further, 6$a$ represents a rotor. A first center point voltage VN obtained at a center point of the resistances 122$u$, 122$v$ and 122$w$ is supplied to a non-reverse input terminal of an operation amplifier 123$a$, and a second center point voltage VM obtained at a center point of the stator windings 6$u$, 6$v$ and 6$w$ is supplied to a reverse input terminal of the operation amplifier 123$a$ through a resistance 123$b$. A resistance 123$c$ is connected between the reverse input terminal and an output terminal of the operation amplifier 123$a$. Therefore, a difference voltage VNM corresponding to a difference between the first center point voltage VN and the second center point voltage VM is obtained at the output terminal of the operation amplifier 123$a$. The difference voltage. VNM is supplied to an integration circuitry in which a resistance 124$a$ and a condenser 124$b$ are connected in series to one another. An integration signal ∫VNOdt obtained at a center point of the resistance 124$a$ and the condenser 124$b$ is supplied to a non-reverse input terminal of an operation amplifier 125, and a reverse input terminal of the operation amplifier 125 is connected to a ground, so that a zero-cross comparator is constituted. An output signal from the zero-cross comparator is supplied to a micro-processor 126 as a position signal (magnetic pole detection signal). The integration signal ∫VNOdt is supplied to an integration signal level detection circuitry 127. A detection signal from the integration signal level detection circuitry 127 is supplied to the micro-processor 126. A speed command and a speed changing command are also supplied to the micro-processor 126. The micro-processor 126 outputs-signals for controlling the inverter 121 through a base driving circuitry 128.

Figure 22:
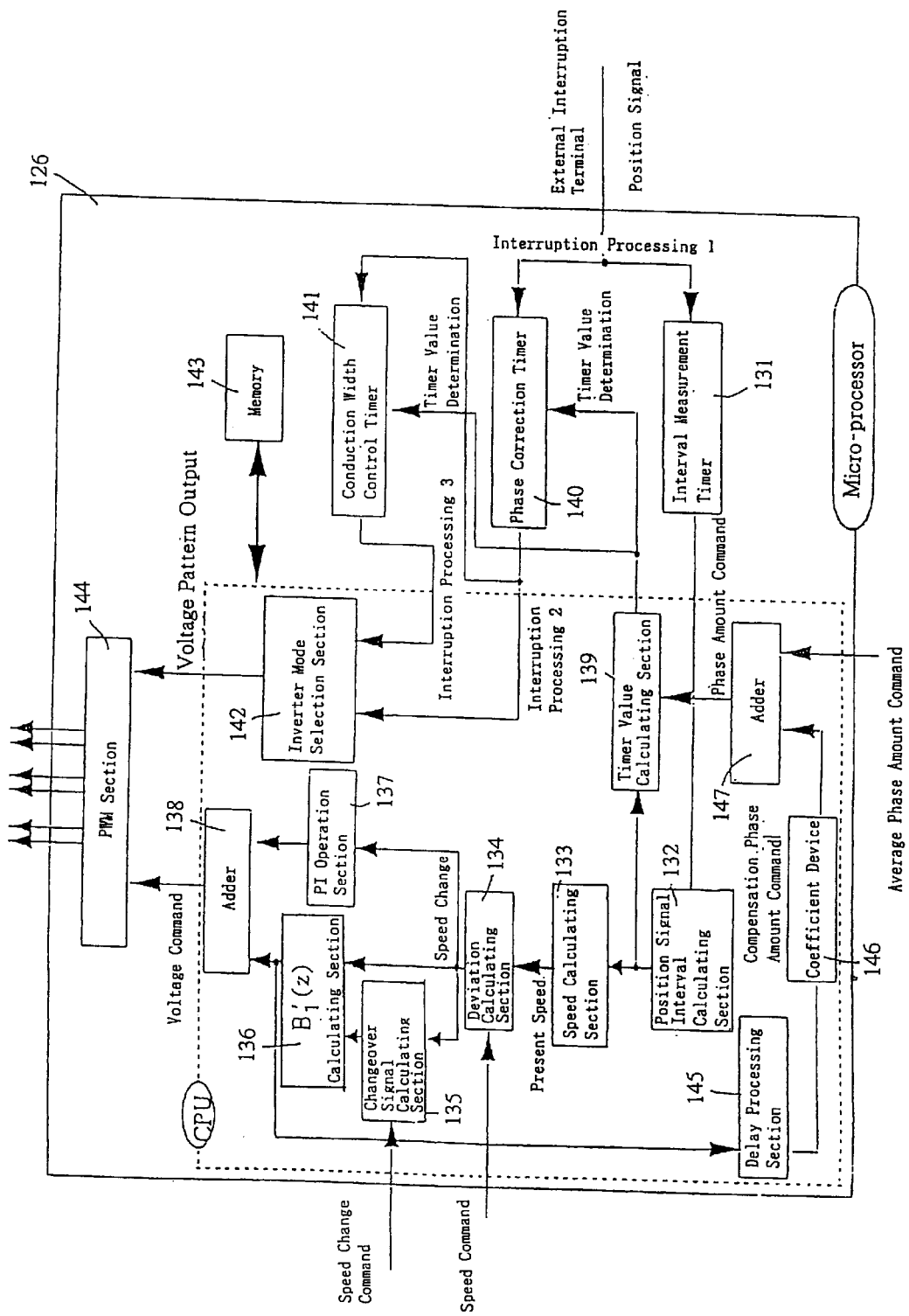
FIG. 22 is a block diagram illustrating an arrangement of the microprocessor illustrated in FIG. 21.

FIG. 22 is a block diagram illustrating an arrangement of the micro-processor 126.

This micro-processor 126 includes an interval measurement timer 131 for carrying out a stop, reset and restart by an interruption processing 1 due to receiving of the position signal, a position signal interval calculating section 132 for calculating an interval of the position signal by inputting a timer value of the interval measurement timer 131 at the stopping timing, a speed calculating section 133 for carrying out speed operation by inputting the interval of the position signal output from the position signal interval calculating section 132 and for calculating and outputting a present speed, a deviation calculating section 134 for calculating a difference between a speed command given from the exterior and the present speed output from the speed calculating section 133 and for outputting this difference as a speed change, a changeover signal calculating section 135 for calculating and outputting a changeover signal by inputting the speed change output from the deviation calculating section 134 and a speed change command given from the exterior, a first order component compensation model calculating section 136 for calculating and outputting a first order component compensation model by inputting the speed change output from the deviation calculating section 134 and the changeover signal output from the changeover signal calculating signal 135, a PI operation section 137 for carrying out a PI operation by inputting the speed change output from the deviation calculating section 134 and for outputting an operation result therefrom, an adder 138 for adding the first order component compensation model output from the first order component compensation model calculating section 136 and the operation result output from the PI operation section 137 and for outputting the sum as a voltage command, a timer value calculating section 139 for calculating and outputting a timer value by inputting the interval of the position signal output from the position signal interval calculating section 132 and a phase amount command given from an adder 147 (described later), a phase correction timer 140 which is set the timer value output from the timer value calculating section 139, is started by the interruption processing 1 due to receiving of the position signal, and outputs a count-over signal therefrom by carrying out counting of the set timer value, a conduction width control timer 141 which is set by the timer value output from the timer value calculation section 139, is started by an interruption processing 2 due to the count-over signal output from the phase correction timer 140, and outputs a count-over signal therefrom by carrying out counting of the set timer value, an inverter mode selection section 142 for reading out from a memory 143 and outputting a voltage pattern by the interruption processing 2 due to the count-over signal output from the phase correction timer 140 or by an interruption processing 3 due to the count-over signal output from the conduction width control timer 141, a PWM section 144 for carrying out pulse width modulation by inputting the voltage command output from the adder 138 and for outputting switching signals therefrom, a delay processing section 145 for shifting the first order component compensation model output from the first order component compensation model calculating section 136, a coefficient device 146 for multiplying a predetermined coefficient to the shifted first order component compensation model output from the delay processing section 145 and for outputting a compensation phase amount command therefrom, and an adder 147 for adding the compensation phase amount command output from the coefficient, device 146 and an average phase amount command given from the exterior and for outputting a phase amount command.

The primary component compensation model calculating section 136 carries out the compensation operation using gains which are 0 for components other than the first order component. Therefore, no problems arise even when a speed change is employed as an input of the first order component compensation model calculating section 136. That is, the speed command becomes constant (direct current) under a steady condition, and the output from the first order component compensation model calculating section 136 is zero even when a direct current (or a signal which has a frequency different from a frequency of an output signal from a signal model) is input to the first order component compensation model calculating section 136. In other words, the output from the first order component compensation model calculating section 136 is determined based upon only the motor speed even when the speed change {=(motor speed)−(speed command)} is employed as an input of the first order component compensation model calculating section 136. Therefore, controlling performance is not influenced at all.

Figure 23:
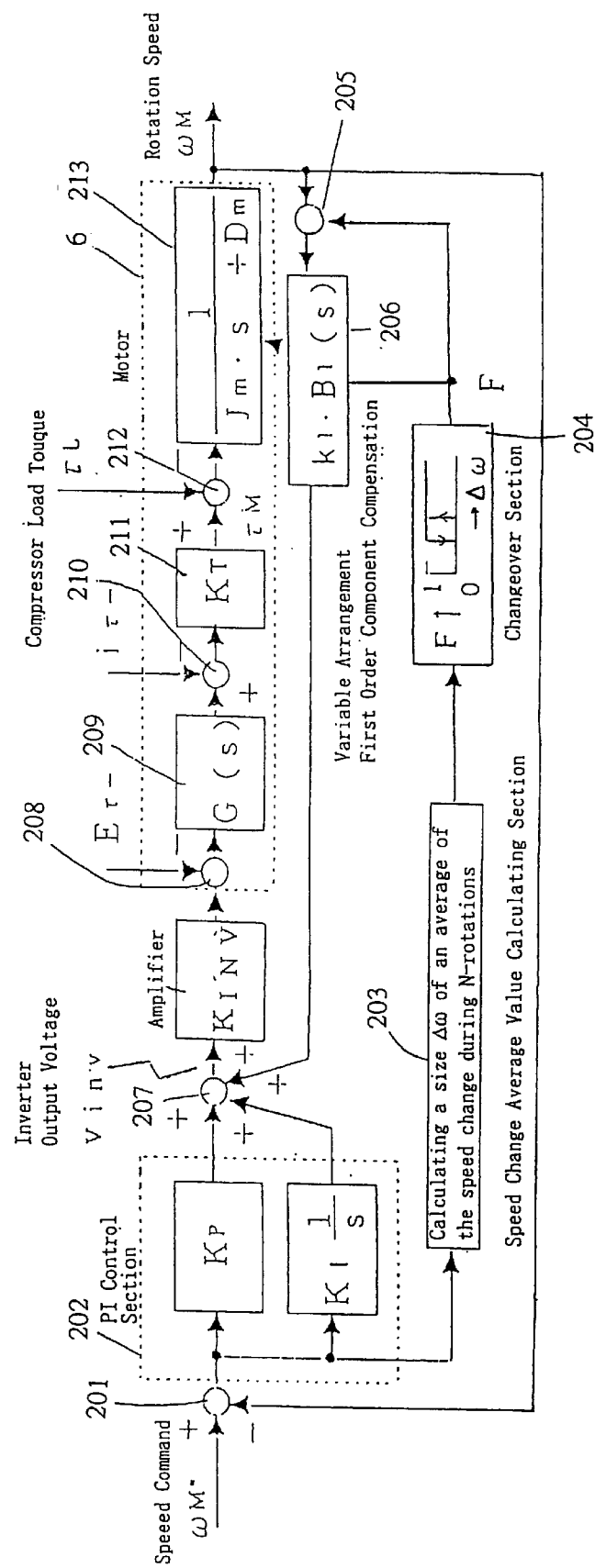
FIG. 23 is a diagram illustrating a control model corresponding to FIG. 21.

FIG. 23 is a schematic diagram illustrating a control model of a system in which a compressor is driven using a synchronous motor which is driven by the synchronous motor driving device illustrated in FIG. 21.

This control model includes a subtraction section 201 for calculating a difference between the speed command and the rotation speed of the synchronous motor 6, a PI control section 202 for carrying out proportional control and integral control (PI control) by inputting the difference output from the subtraction section 201 and for outputting a proportional control result and an integral control result therefrom, a speed change average value calculating section 203, for calculating a size $\Delta\omega$ of an average of the speed change during N-rotations (N is a natural number) by inputting the difference output from the subtraction section 201, a changeover section 204 for outputting 0 or 1 by inputting the size $\Delta\omega$ of an average of the speed change output from the speed change average value calculating section 203, a multiplication section 205 for multiplying the rotation speed of the synchronous motor 6 and the output from the changeover section 204 and for outputting a multiplication result, a variable arrangement first order component compensation section 206 for carrying out first order component compensation by inputting the multiplication result output from the multiplication section 205 and for outputting a compensation value, an addition section 207 for adding the proportional control result, the integral control result and the compensation value and for outputting a voltage command, an amplifier 207' for performing compensation by inputting the voltage command output from the addition section 207, a subtraction section 208 for calculating and outputting a difference between an output voltage output from the amplifier 207' and a partial part $e\tau$− giving influence to generation of current for torque among a motor speed electromotive voltage, voltage-current transfer function (first order delay element determined based upon resistance and inductance of motor windings) 209 of a motor for outputting a current by inputting the difference output from the subtraction section 208, a subtraction section 210 for calculating and outputting a difference between the current output from the voltage-current transfer function 209 of a motor and a current $e\tau$− equivalently representing a torque error component following non-direct control of a current waveform (phase/amplitude) corresponding to the rotor position, current-torque transfer function 211 of a motor for outputting a motor torque by inputting the difference output from the subtraction section 210, a subtraction section 212 for subtracting a compressor load torque from the motor torque output from the current-torque transfer function 211 of a motor and for outputting a compressor axial torque, and torque-speed transfer function 213 of a motor for outputting a speed by inputting the compressor axial torque output from the subtraction section 212. Further, the subtraction section 208, voltage-current transfer function 209, subtraction section 210, current-torque transfer function 211, subtraction section 212 and torque-speed transfer function 213 constitute the synchronous motor 6.

Figure 24:
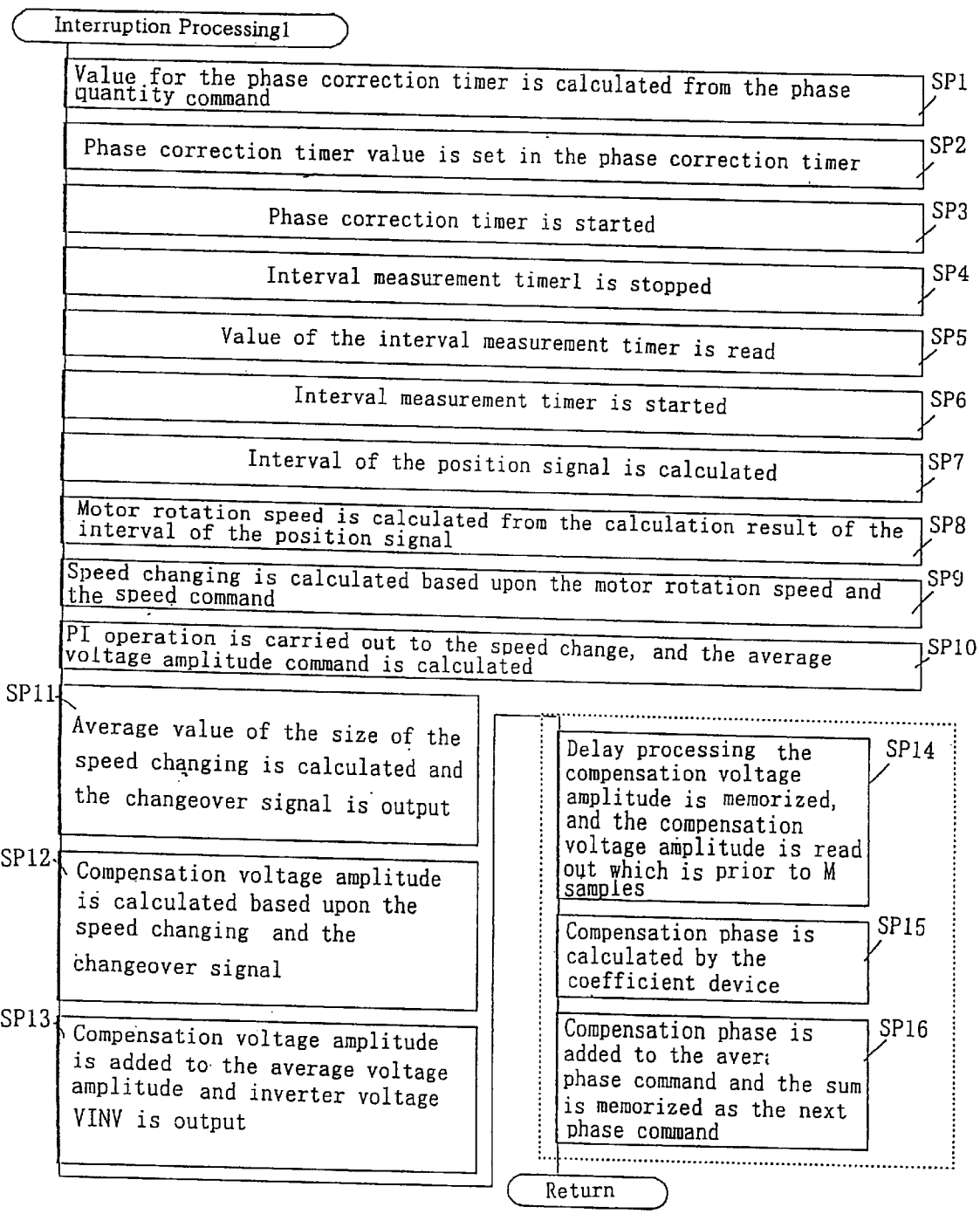
FIG. 24 is a flowchart useful in understanding an interruption operation 1 illustrated in FIG. 22.
Figure 25:
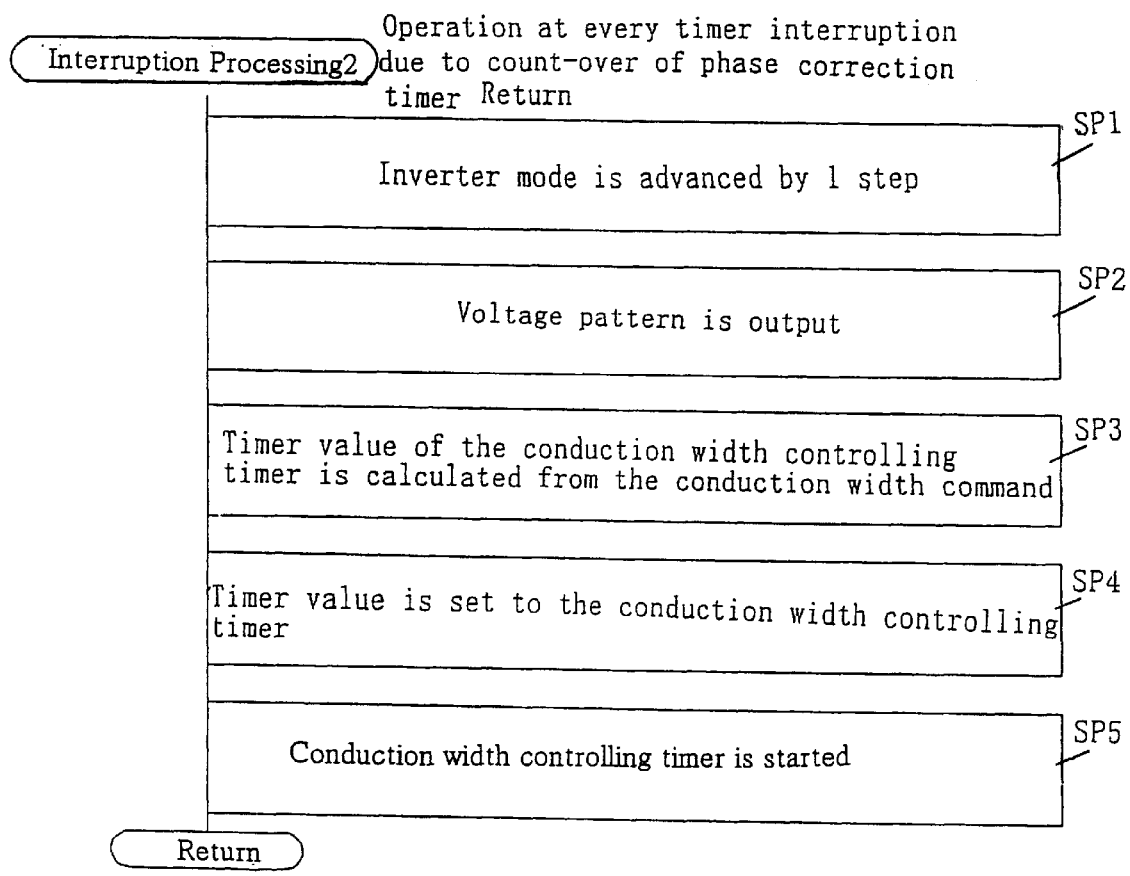
FIG. 25 is a flowchart useful in understanding an interruption operation 2 illustrated in FIG. 22.
Figure 26:
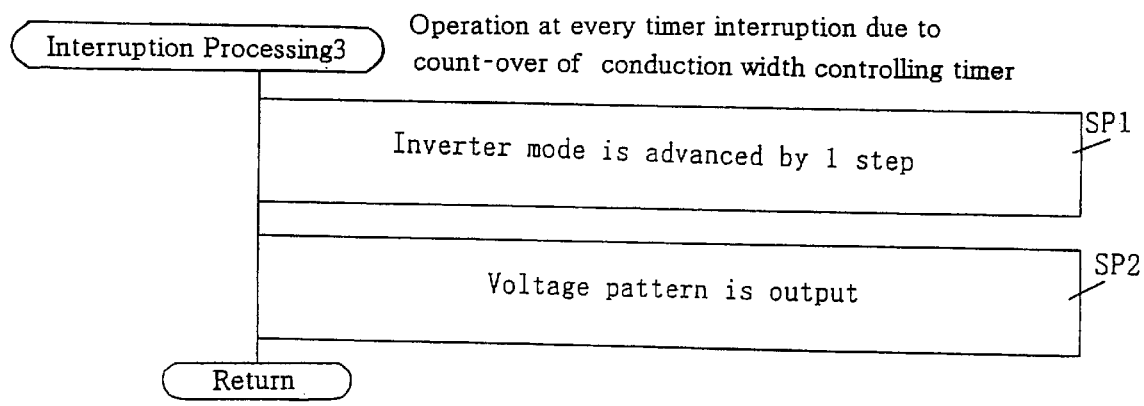
FIG. 26 is a flowchart useful in understanding an interruption operation 3 illustrated in FIG. 22.

FIG. 24 to FIG. 26 are flowcharts useful in understanding the operation of the micro-processor 126. Wherein, FIG. 24 explains the interruption processing 1, FIG. 25 explains the interruption processing 2, and FIG. 26 explains the interruption processing 3.

The operation of the flowchart illustrated in FIG. 24 is carried out at every acceptance of the position signal.

In step SP1, a value for the phase correction timer 140 is calculated from the phase amount command, in step SP2, the phase correction timer value is set in the phase correction timer 140, in Step SP3, the phase correction timer 140 is started, in step SP4, the interval measurement timer 131 is stopped, in step SP5, a value of the interval measurement timer 131 is read, in step SP6, the value of the interval measurement timer 131 is reset, then the interval measurement timer 131 is started for the next interval measurement. In step SP7, an interval of the position signal is calculated, in step SP8, a motor rotation speed is calculated from the calculation result of the interval of the position signal, in step SP9, speed change is calculated based upon the motor rotation speed and the speed command, in step SP10, the PI operation is carried out to the speed change, and the average voltage amplitude command is calculated, in step SP11, the average value of the size of the speed change is calculated and the changeover signal is output based upon the obtained average value, in step SP12, a compensation voltage amplitude is calculated based upon the speed change and the changeover signal, in step SP13, the compensation voltage amplitude is added to the average voltage amplitude, in step SP14, the delay processing is carried out {for example, the compensation voltage amplitude is memorized, and the compensation voltage amplitude, is read out which is prior to M samples (wherein, M is a positive integer)}, in step SP15, a compensation phase is calculated by multiplying a predetermined coefficient by the coefficient device 146, in step SP16, the compensation phase is added to the average phase command and the sum is memorized as the next phase command, then the operation is returned to an original processing.

The processing of the flowchart illustrated in FIG. 25 is carried out at every output of the count-over signal from the phase correction timer 140.

In step SP1, an inverter mode is advanced by 1 step, in step 2, a voltage pattern corresponding to the advanced inverter mode is output, in step SP3, a timer value of the conduction width control timer 141 is calculated from the conduction width command, in step SP4, the timer value {=a timer value for (conduction angle−120) degrees} is set to the conduction width control timer 141, in step SP5, the conduction width control timer 141 is started, then the operation is returned to an original processing.

The processing of the flowchart illustrated in FIG. 26 is carried out at every output of the count-over signal from the conduction width control, timer 141.

In step SP1, an inverter mode is advanced by 1 step, in step SP2, a voltage pattern corresponding to the advanced inverter mode is output, then the operation is returned to an original processing.

Figure 27:
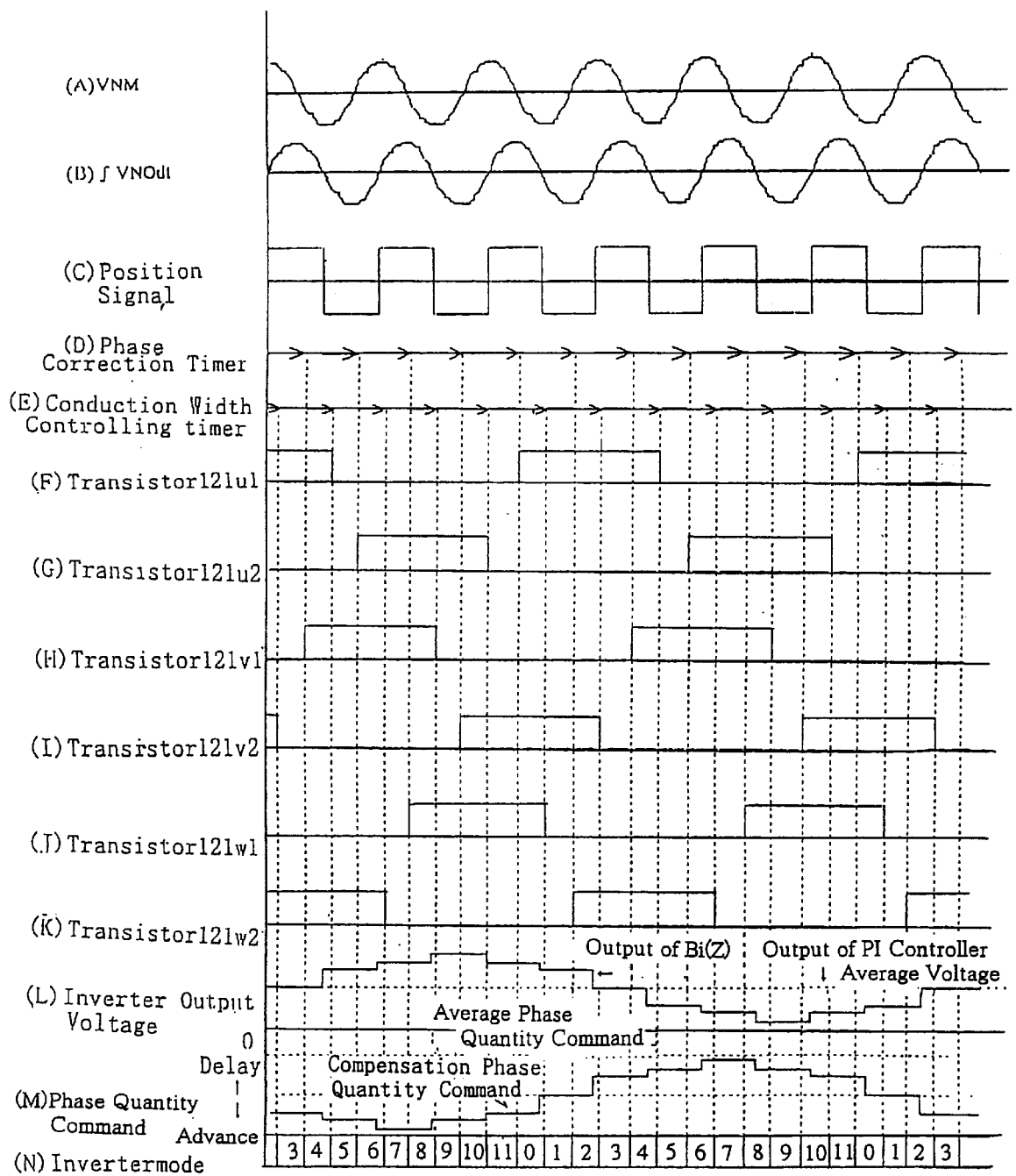
FIG. 27 are charts illustrating signal waveforms of each section of the synchronous motor driving device illustrated in FIG. 21 and FIG. 22.

FIG. 27 are charts illustrating signal waveforms of each section of the synchronous motor driving device which is illustrated in FIG. 21 and FIG. 22.

When the compressor is driven by tho synchronous motor 6, the difference voltage VNM is obtained as illustrated in FIG. 27(A), the integration signal VNOdt is obtained as illustrated in FIG. 27(B), and the position signal is obtained as illustrated in FIG. 27(C).

The phase correction timer 140 starts as illustrated in FIG. 27(D) {refer to starting points of arrows illustrated in FIG. 27(D)} by the interruption processing 1 based upon the position signal. And, the conduction width control timer 141 starts as illustrated in FIG. 27(E) {refer to starting points of arrows illustrated in FIG. 27(E)} at every output of the count-over signal {refer to ending points of arrows illustrated in FIG. 27(D)} from the phase correction timer 140 which is controlled the timer value which is set based upon the phase amount command as illustrated in FIG. 27(M).

The inverter mode is advanced by every step as illustrated in FIG. 27(N), and ON-OFF conditions of the switching transistors 121u1, 121u2, 121v1, 121v2, 121w1, 121w2 of the inverter circuitry 121 are changed corresponding to the inverter mode as illustrated in FIG. 27(F) to FIG. 27(K), at every output of the count-over signal from the phase correction timer 140 {refer to ending points of arrows illustrated in FIG. 27(D)} and at every output of the count-over signal from the conduction width control timer 141 {refer to ending points of arrows illustrated in FIG. 27(E)}. Further, each switching transistor is applied chopper control by the PWM section 144 based upon the inverter output voltage illustrated in FIG. 27(L). The dashed line illustrated in FIG. 27(L) represents the output (average voltage) from the PI operation section 137, and the solid line illustrated in FIG. 27(L) represents the output (compensation voltage) from the first order component compensation model calculating section 136.

Further, the phase control becomes a control system with 1 sample delay in connection to the timer processing.

Figure 28:
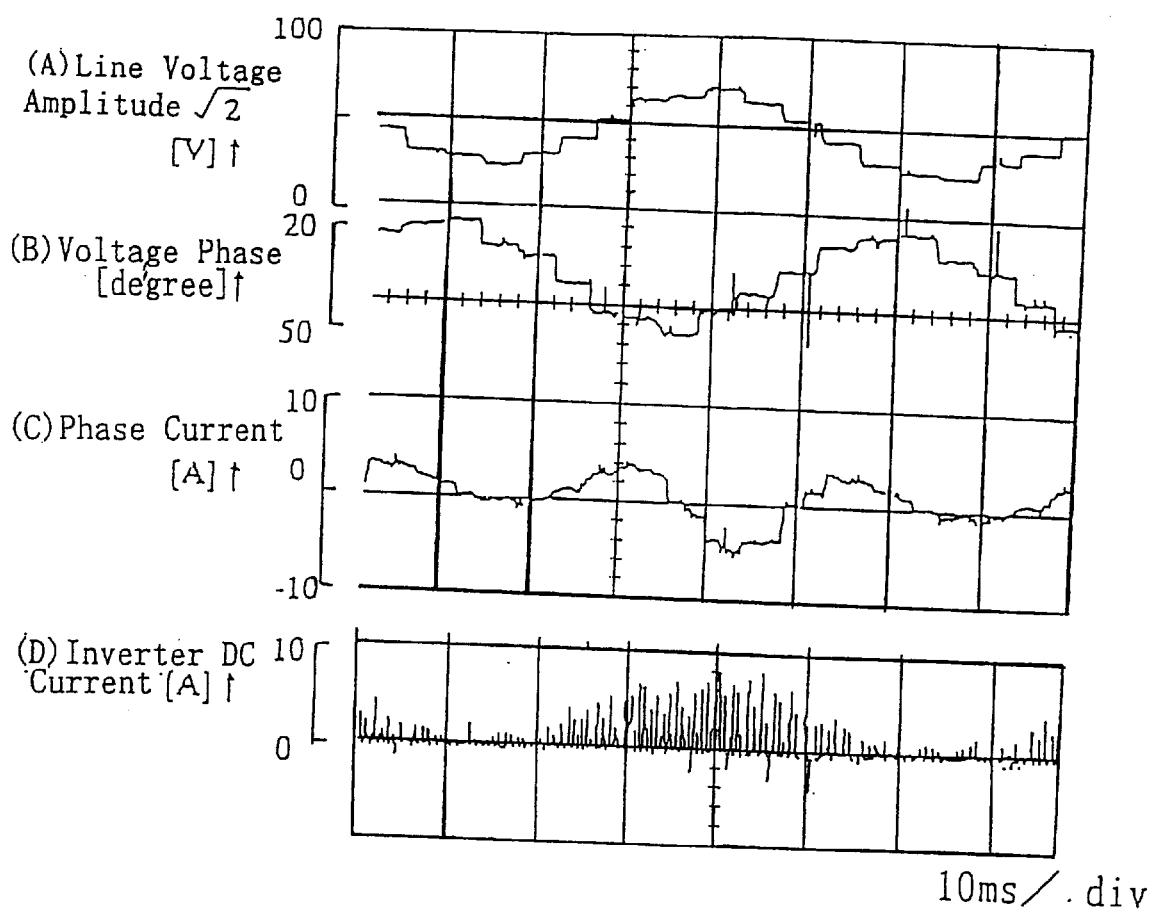
FIG. 28 are charts illustrating changes in line voltage amplitude, voltage phase, phase current, and inverter DC current when an actual device is driven by controlling the voltage phase and voltage amplitude, each being controlled in connection to the other, based upon the scope of the maximum torque control.
Figure 29:
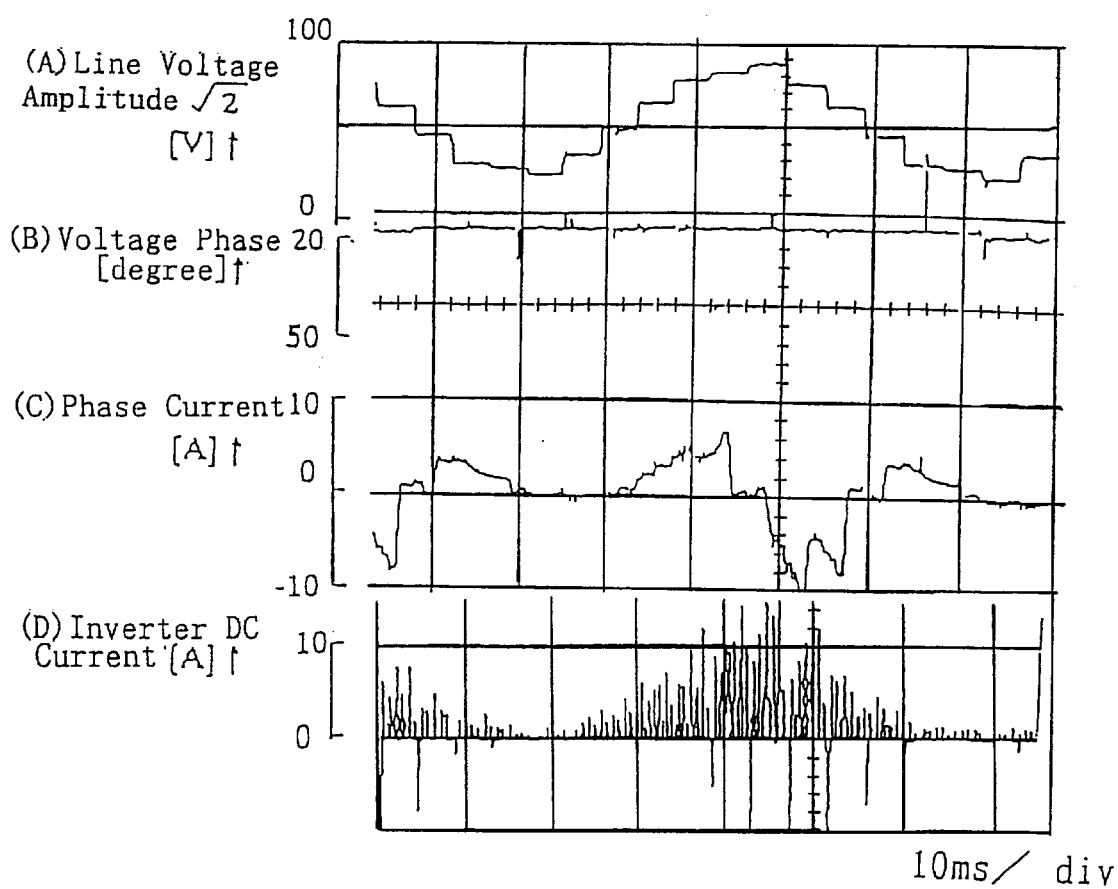
FIG. 29 are charts illustrating changes in line voltage amplitude, voltage phase, phase current, and inverter DC current when an actual device is driven by controlling the voltage phase and voltage amplitude, each being controlled not in connection to the other, based upon the scope of the maximum torque control.

FIG. 28 are charts illustrating a line voltage amplitude waveform {refer to FIG. 28(A)}, a voltage phase waveform {refer to FIG. 28(B)}, a phase current waveform {refer to FIG. 28(C)}, and an inverter DC current waveform {refer to FIG. 28(D)} when a compressor is driven by controlling the voltage phase and the voltage amplitude, each being relative to one another, based upon the scope of the maximum torque control. FIG. 29 are charts illustrating a line voltage amplitude waveform {refer to FIG. 29(A)}, a voltage phase waveform {refer to FIG. 29(B)}, a phase current waveform {refer to FIG. 29(C)}, and an inverter DC current waveform {refer to FIG. 29(D)} when a compressor is driven by controlling the voltage phase and the voltage amplitude, each being not relative to one another, based upon the scope of the maximum torque control. Further, the driving condition is as follows; low pressure: 5 kg/cm$^2$, high pressure 13 kg/cm, rotation number: 20 r. p. s..

When FIG. 28 and FIG. 29 are compared to one another, it is understood that the peak value of the motor winding current is smaller and the DC current flowing into the voltage-fed inverter is also smaller in FIG. 28. In other words, it is understood that more efficient driving is realized in FIG. 28.

Figure 30:
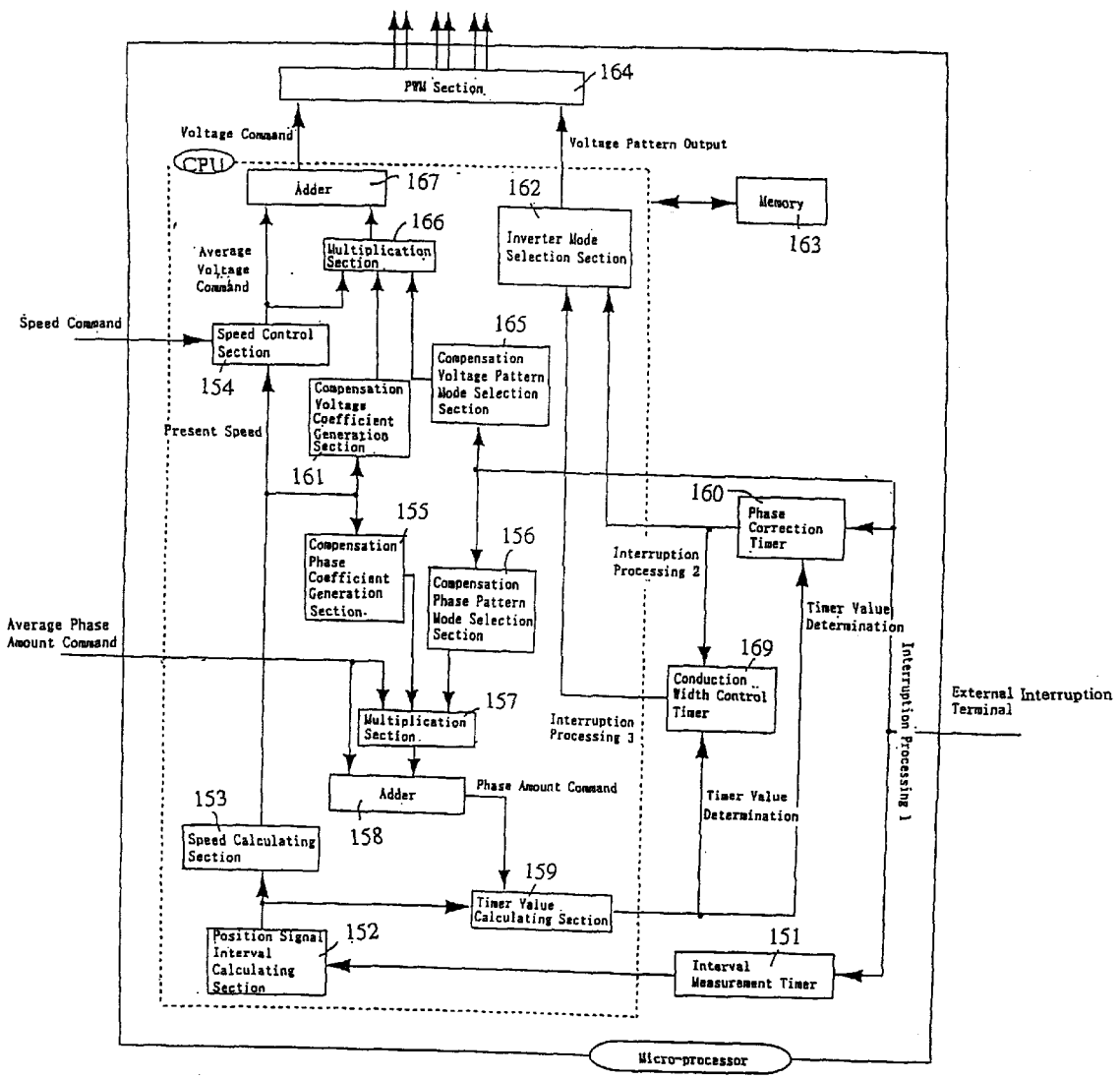
FIG. 30 is a block diagram illustrating an arrangement of a microprocessor which is a main section or a further embodiment of a synchronous motor driving device according to the present invention.

FIG. 30 is a block diagram illustrating an arrangement of a micro-processor which is a main section of a synchronous motor driving device of a further embodiment according to the present invention. Further, arrangement other than the micro-processor is the same as the arrangement of the synchronous motor driving device illustrated in FIG. 21, therefore, description thereof is omitted.

This micro-processor includes an interval measurement timer 151 for carrying out a stop, reset and restart by an interruption processing 1 due to receiving of the position signal, a position signal interval calculating section 152 for calculating an interval of the position signal by inputting a timer value of the interval measurement timer 151 at the stopping timing, a speed calculating section 153 for carrying out a speed operation by inputting the interval of the position signal output from the position signal interval calculating section 152 and for calculating and outputting a present speed, a speed calculating section 154 for carrying out a speed control by inputting a speed command given from the exterior and the present speed output from the speed calculating section 153 and for outputting an average voltage command, a compensation phase coefficient generation section 155 for generating a compensation phase coefficient by inputting the present speed output from the speed calculating section 153, a compensation voltage coefficient generation section 161 for generating a compensation voltage coefficient by inputting the present speed output from the speed calculating section 153, a compensation phase pattern mode selection section 156 and a compensation voltage pattern mode selection section 165 which operate by the interruption processing 1 due to the receiving of the position signal, a multiplication section 157 for multiplying the average phase amount command given from the exterior, the compensation phase coefficient output from the compensation phase coefficient generation section 155 and a compensation phase pattern which is selected by the compensation phase pattern mode selection section 156 and for outputting a compensation phase amount command therefrom, an adder 158 for adding the average phase amount command given from the exterior and the compensation phase amount command output from the multiplication section 157 and for outputting a phase amount command therefrom, a timer value calculating section 159 for calculating and outputting a timer value by inputting the interval of the position signal output from the position signal interval calculating section 152 and the phase amount command output from the adder 158, a phase correction timer 160 which is set the timer value output from the timer value calculating section 159, is started by the interruption processing 1 due to acceptance of the position signal, and outputs a count-over signal when a counting operation for the set timer value has been performed, a conduction width control timer 168 which is set the timer value output from the timer value calculating section 159, is started by the interruption processing 2 due to the count over signal output from the phase correction timer 160, and outputs a count-over signal when a counting operation for the set timer value has been performed, an inverter mode selection section 162 for reading out and outputting a voltage pattern from a memory 163 by the interruption processing 2 due to the count-over signal output from the phase correction timer 160 and by the interruption processing 3 due to the count-over signal output from the conduction width control timer 168, a multiplication section 166 for multiplying the average voltage command output from the speed control section 154, the compensation voltage coefficient output from the compensation voltage coefficient generation section 161, and a compensation voltage pattern selected by the compensation voltage pattern mode selection section 166 and for outputting a compensation voltage command, an adder 167 for adding the average voltage command output from the speed controlling section 154 and the compensation voltage command output from the multiplication section 166, and a PWM section 164 for carrying out pulse width modulation by inputting the voltage command output from the adder 167 and the voltage pattern output from the inverter mode selection section 162 and for outputting switching signals therefrom.

Figure 31:
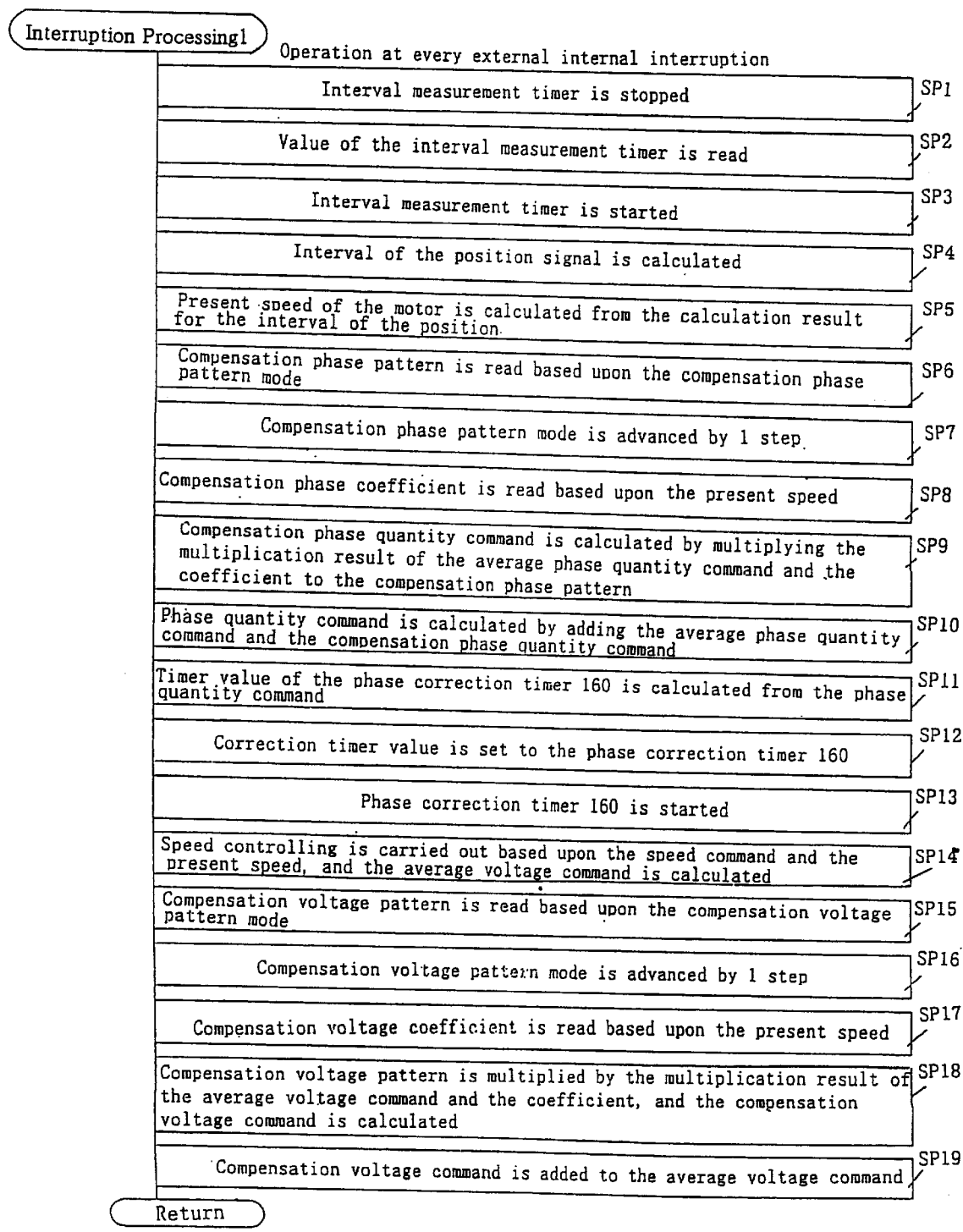
FIG. 31 is a flowchart useful in understanding the operation of an interruption operation 1 illustrated in FIG. 30.

FIG. 31 is a flowchart useful in understanding an operation of the micro-processor illustrated in FIG. 30. FIG. 31 illustrates the interruption processing 1 only. Further, the interruption processing 2 and interruption processing 3 are similar to flowcharts illustrated in FIG. 25 and FIG. 26, therefore illustrations thereof are omitted.

Operation of the flowchart illustrated in FIG. 31 is carried out at every acceptance of the position signal.

In step SP1, the interval measurement timer 151 is stopped, in step SP2, the value of the interval measurement timer 151 is read, in step SP3, the value of the interval measurement timer 151 is preset, and the interval measurement timer 151 is started for the next interval measurement. In step SP4, the interval of the position signal is calculated, in step SP5, the present speed of the motor is calculated from the calculation result for the interval of the position-signal, in step SP6, the compensation phase pattern is read based upon the compensation phase pattern mode, in step SP7, the compensation phase pattern mode is advanced by 1 step, in step SP8, the compensation phase coefficient is read based upon the present speed, in step SP9, the compensation phase amount command is calculated by multiplying the multiplication result of the average phase amount command and the coefficient to the compensation phase pattern, in step SP10, the phase amount command is calculated by adding the average phase amount command and the compensation phase amount command, in step SP11, the timer value of the phase correction timer 160 is calculated from the phase amount command, in step SP12, the correction timer value is set to the phase correction timer 160, in step SP13, the phase correction timer 160 is started, in step SP14, the speed control is carried out based upon the speed command and the present speed, and the average voltage command is calculated, in step SP15, the compensation voltage pattern is read based upon the compensation voltage pattern mode, in step SP16, the compensation voltage pattern mode is advanced by 1 step, in step SP17, the compensation voltage coefficient is read based upon the present speed, in step SP18, the compensation voltage pattern is multiplied by the multiplication result of the average voltage command and the coefficient, and the compensation voltage command is calculated, in stop SP19, the compensation voltage command is added to the average voltage command, then the operation returns to the original processing.

In this synchronous motor driving device, the voltage amplitude changing component is determined so as to reduce vibration, and the phase changing component is determined so as to improve efficiency, and the voltage amplitude changing component and the phase changing component are determined to be in patterns, respectively, and the voltage amplitude changing component and the phase changing component in patterns are read out. Therefore, the control operation can preferably be simplified when an intermittent load is driven in which load torque scarcely changes.

Figure 32:
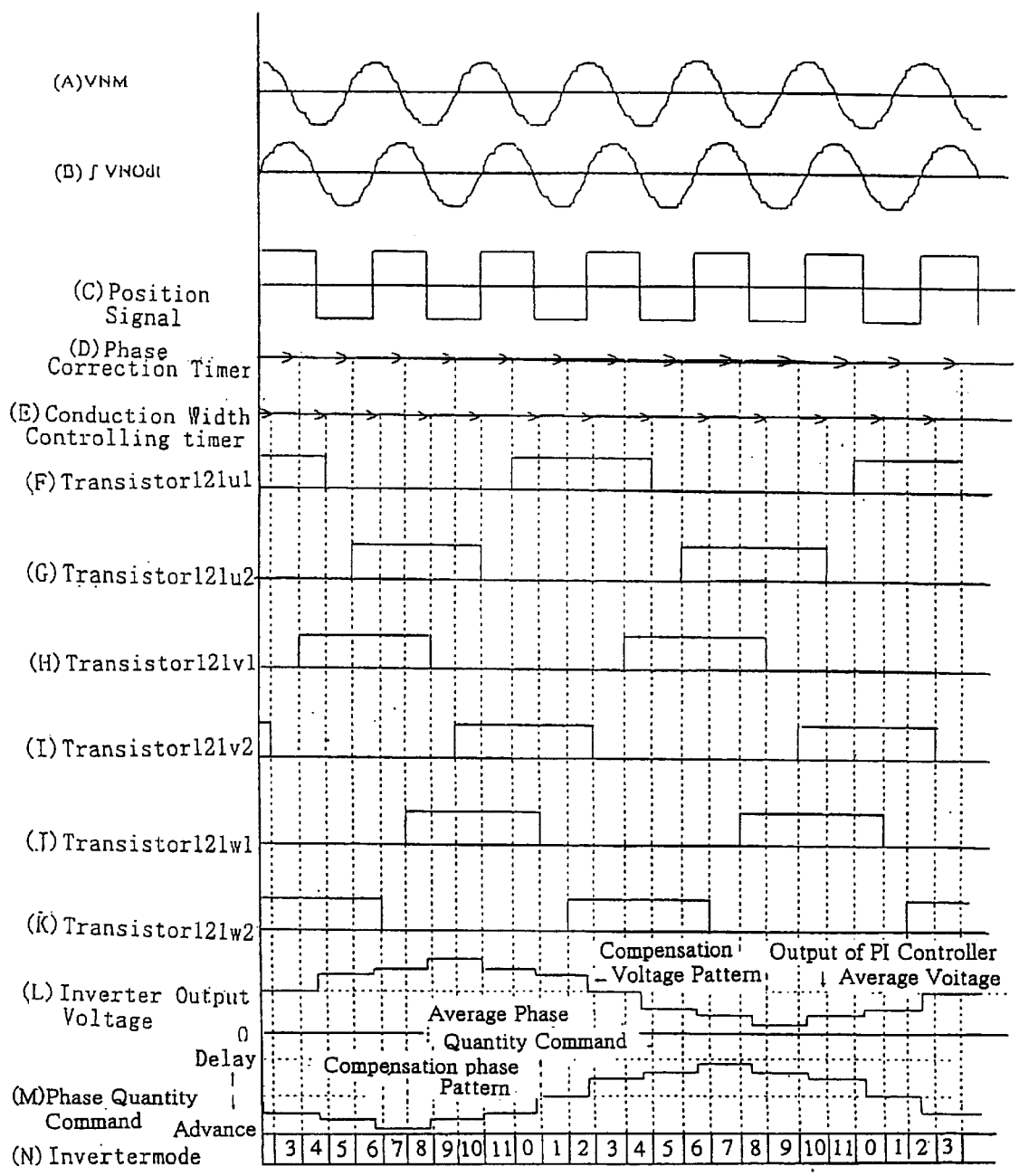
FIG. 32 are charts illustrating signal waveforms of each section of the synchronous motor driving device illustrated in FIG. 21 and FIG. 30.

FIG. 32 are charts illustrating signal waveforms of each section of the synchronous motor driving device which is illustrated in FIG. 21 and FIG. 30.

When the compressor is driven by the synchronous motor 6, the difference voltage VNM is obtained as illustrated in FIG. 32(A), the integration signal ∫VNOdt is obtained as illustrated in FIG. 32(B), and the position signal is obtained as illustrated in FIG. 32(C).

The phase correction timer 160 starts as illustrated in FIG. 32(D) {refer to starting points of arrows illustrated in FIG. 32(D)} by the interruption processing 1 based upon the position signal. And, the conduction width control timer 169 starts as illustrated in FIG. 32(E) {refer to starting points of arrows illustrated in FIG. 32(E)} at every output of the count-over signal {refer to ending points of arrows illustrated in FIG. 32(D)} from the phase correction timer 160 for which is controlled the timer value which is set based upon the phase amount command as illustrated in FIG. 32 (M).

The inverter mode is advanced by every 1 step as illustrated in FIG. 32(N), and ON-OFF conditions of the switching transistors 121$u$1, 121$u$2, 121$v$1, 121$v$2, 121$w$1, 121$w$2 of the inverter circuitry 121 are changed corresponding to the inverter mode as illustrated in FIG. 32(F) to FIG. 32(K), at every output of the count-over signal from the phase correction timer 160 {refer to ending points of arrows illustrated in FIG. 32(D)} and at every output of the count-over signal from the conduction width control timer 169 {refer to ending points of arrows illustrated in FIG. 32(E)}. Further, each switching transistor is applied chopper control by the PWM section 164 based upon the inverter output voltage illustrated in FIG. 32(L). The dashed line illustrated in FIG. 32(L) represents the output (average voltage) from the speed control section 154, and the solid line illustrated in FIG. 32(L) represents the output (compensation voltage) from the multiplication section 166.

Further, the phase control becomes a control system with 1 sample delay in connection to the timer processing.

Figure 33:
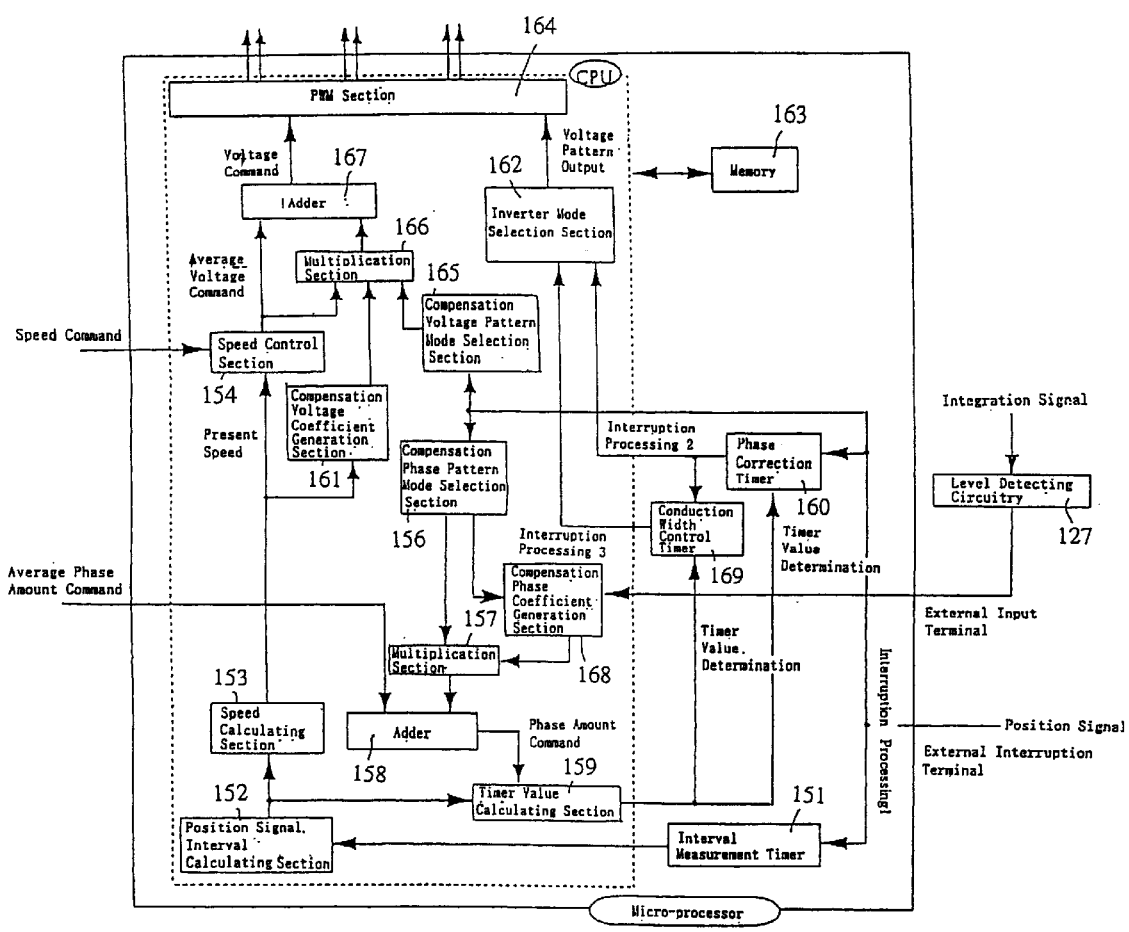
FIG. 33 is a block diagram illustrating an arrangement of a microprocessor which is a main section of a yet further embodiment of a synchronous motor driving device according to the present invention.

FIG. 33 is a block diagram illustrating an arrangement of a micro-processor which is a main section of a synchronous motor driving device of a further embodiment according to the present invention.

This synchronous motor driving device is different from the synchronous motor driving device illustrated in FIG. 30 in that a compensation phase coefficient generation section 168 for obtaining and outputting a compensation phase coefficient by inputting the integration signal level detection signal output from the integration signal level detecting circuitry 127 (refer to FIG. 21) and the compensation phase pattern output from the compensation phase pattern mode selection section 156 is employed instead of the compensation phase coefficient generation section 155, and wherein the compensation phase coefficient output from the compensation phase pattern mode selection section 156 and the compensation phase coefficient output from the compensation phase coefficient generation section 168 are multiplied so as to obtain and output the compensation phase amount command.

Figure 34:
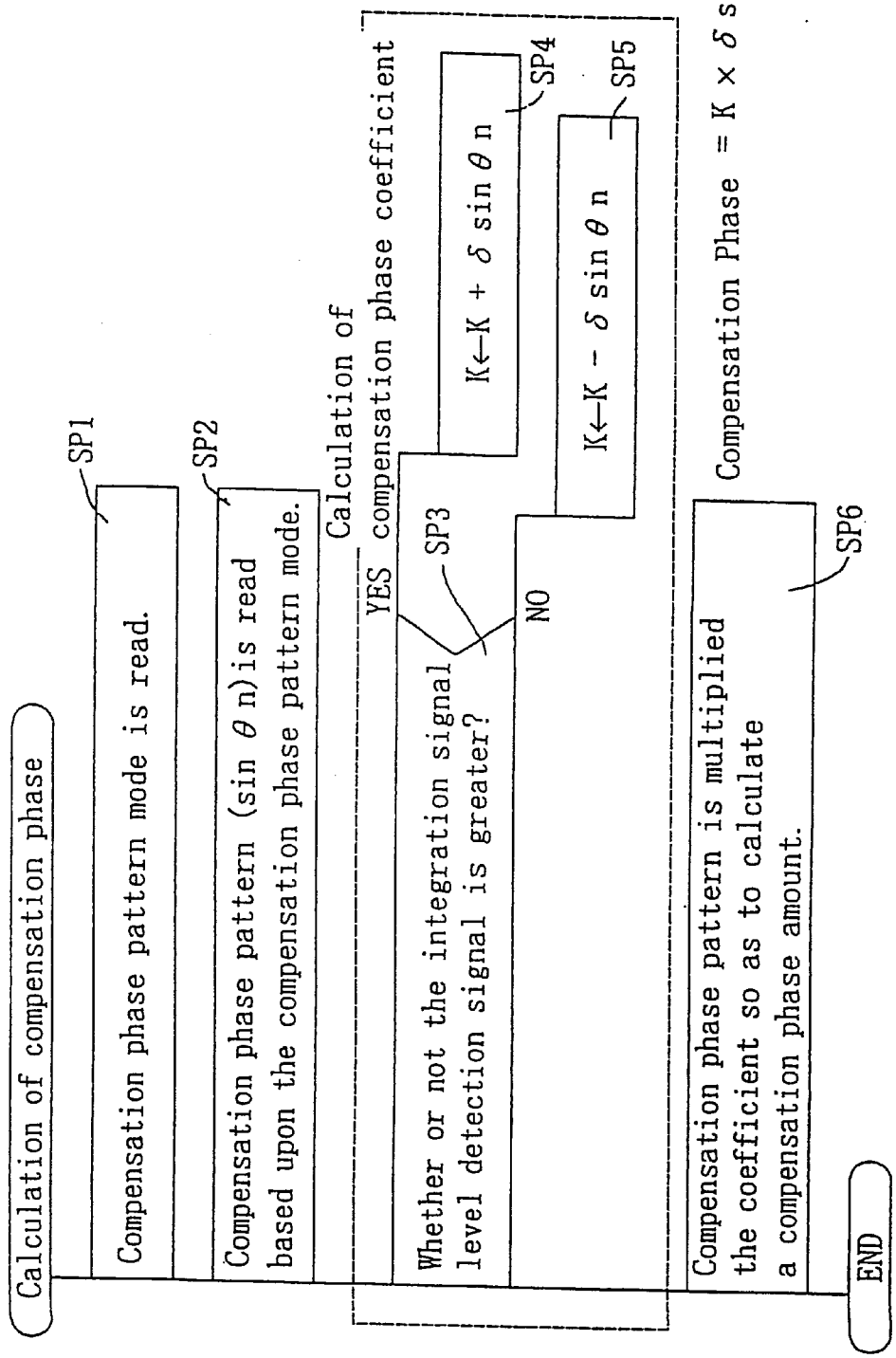
FIG. 34 is a flowchart useful in understanding an operation for obtaining a compensation phase amount of command.

FIG. 34 is a flowchart useful in understanding the operation for obtaining a compensation phase amount command.

In step SP1, a compensation phase pattern mode is read, in step SP2, a compensation phase pattern (for example, sin θn) is read based upon the compensation phase pattern mode, in step SP3, an integration signal level detection signal is compared with a predetermined value so that it is judged whether or not the integration signal level detection signal is greater.

When it is judged that the integration signal level detection signal is greater, in step SP4, a compensation phase coefficient K is increased by δsin θn. On the contrary, when it is judged that the integration signal level detection signal is smaller, in stop SP5, the compensation phase coefficient K is decreased by δsin θn. Wherein, δ is a constant which is experimentally determined.

After the processing in step SP4 or step SP5 has performed, in step SP6, the compensation phase pattern is multiplied by the coefficient so as to calculate a compensation phase amount command (=K×sin θn), then the operation is finished.

Therefore, the pattern of the phase changing component is successively, corrected so as to determine the integration signal level detection signal to be a predetermined value, as a result, control with efficiency is securely carried out.

Operation is described in more detail.

Figure 35:
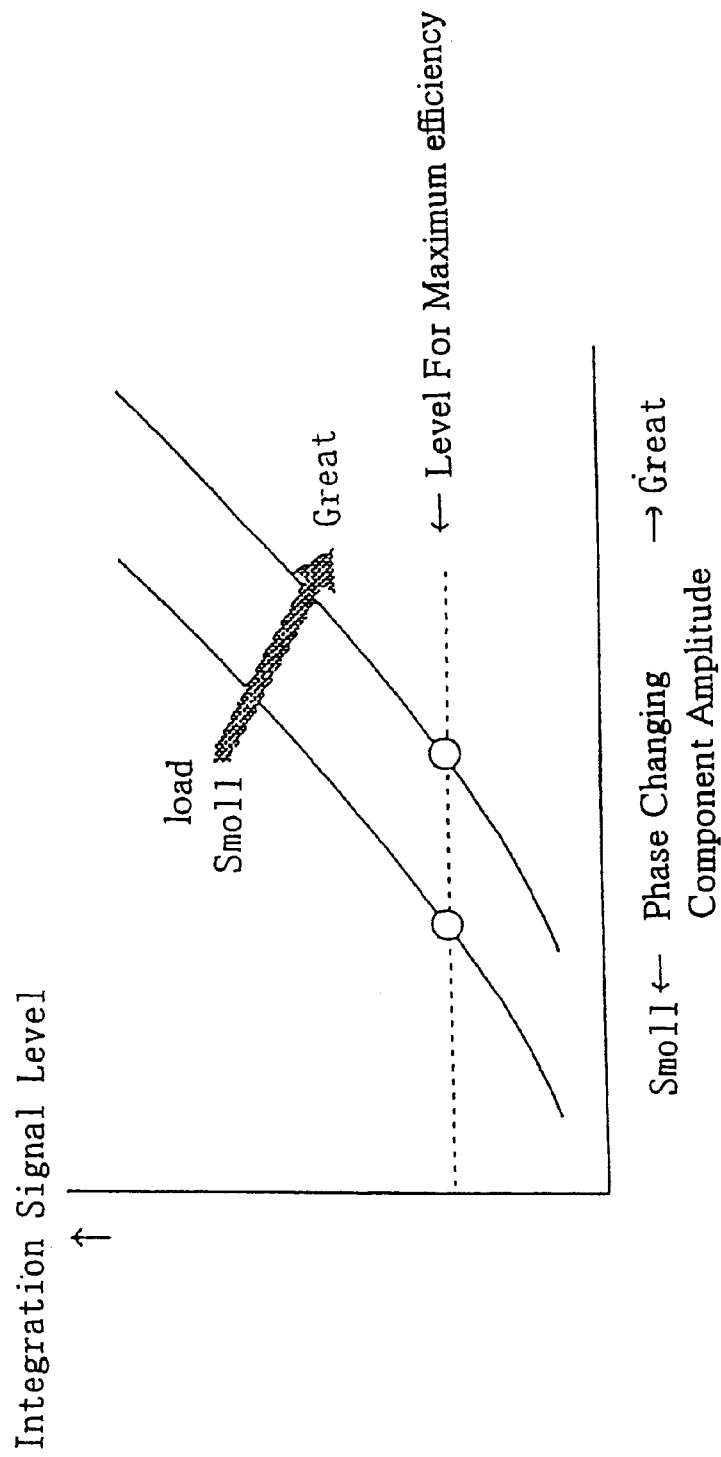
FIG. 35 is a chart illustrating the relationship between the integration signal level and the phase changing component amplitude.

FIG. 35 is a chart illustrating a relationship between an integration signal level and a phase changing component. Wherein, a dashed line illustrated in FIG. 35 is an integration signal level which makes an efficiency to be a maximum efficiency.

Therefore, when a polarity of the compensation phase pattern sin θn is negative (the phase changing component corresponds to advancing compensation period), (1) when the integration signal level detection signal is greater than the predetermined value, the coefficient K is determined to be smaller and the compensation phase amount is determined to be smaller (it is equivalent to determining the phase advancing amount to be smaller, because the phase change component corresponds to advancing compensation period). Consequently, the integration signal level is determined to be smaller.

(2) when the integration signal level detection signal is smaller than the predetermined value, the coefficient K is determined to be greater and the compensation phase amount is determined to be greater (it is equivalent to determining the phase advancing amount to be, greater, because the phase change component corresponds to advancing compensation period). Consequently, the integration signal level is determined to be greater.

On the contrary, when a polarity of the compensation phase pattern sin θn is positive (the phase change component corresponds to delaying compensation period), (1) when the integration signal level detection signal is greater than the predetermined value, the coefficient K is determined to be greater and the compensation phase amount is determined to be greater (it is equivalent to determining the phase advancing amount to be smaller, because the phase change component corresponds to delaying compensation period). Consequently, the integration signal level is determined to be smaller.

(2) when the integration signal level detection signal is smaller than the predetermined value, the coefficient K is determined to be smaller and the compensation phase amount is determined to be smaller (it is equivalent to determining the phase advancing amount to be greater, because the phase change component corresponds to delaying compensation period). Consequently, the integration signal level is determined to be greater.

As a result, controlling with efficiency is securely carried out.

Figure 36:
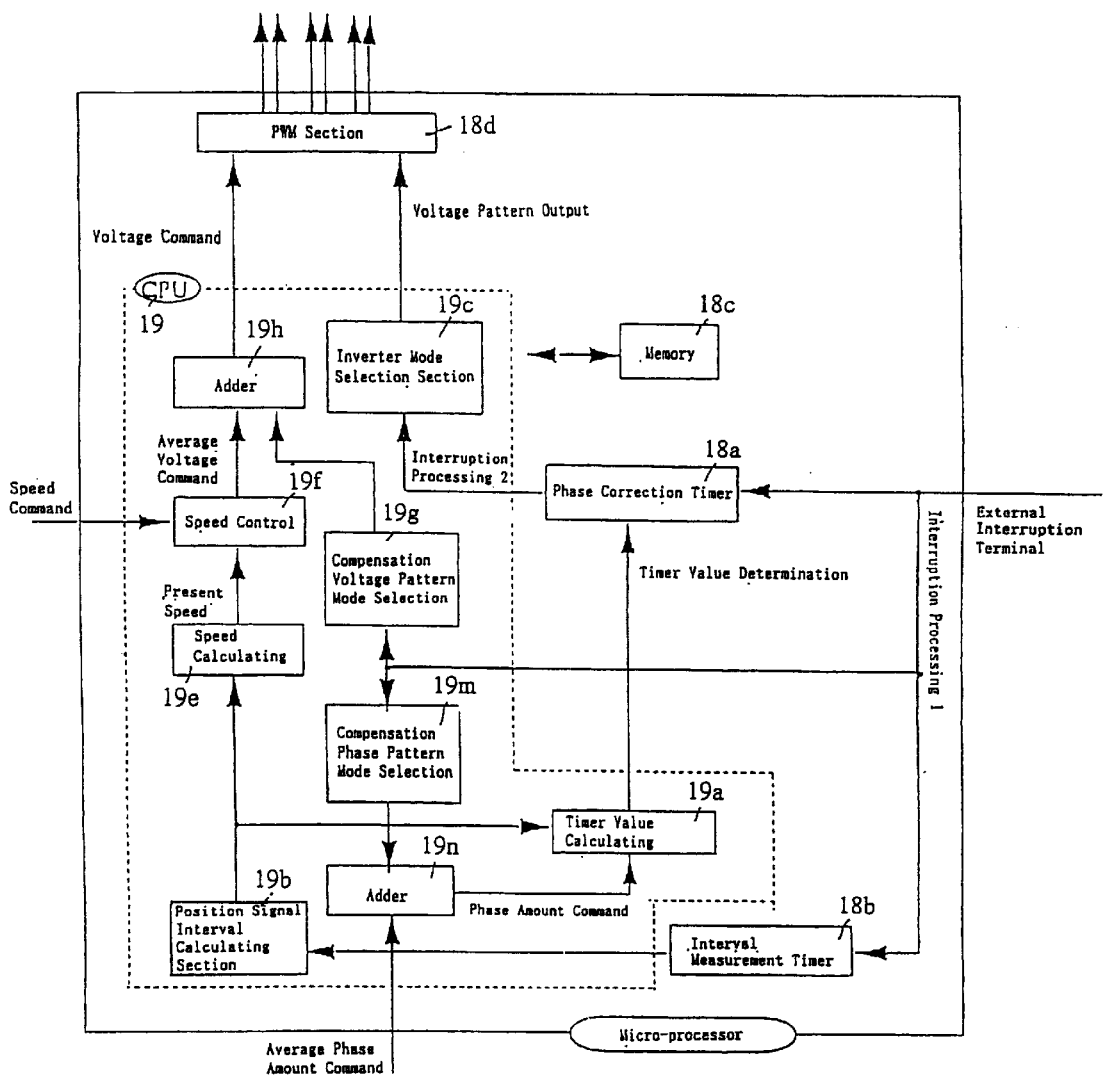
FIG. 36 is a block diagram illustrating an arrangement of a microprocessor which is a main section of an embodiment of a brushless DC motor driving device according to the present invention.

FIG. 36 is a block diagram illustrating an arrangement of a micro-processor which is a main section of a brushless DC motor driving device of an embodiment of the present invention. Arrangement of a section other than the micro-processor is similar as that of the arrangement illustrated in FIG. 21, therefore detailed description is omitted. Further, a brushless DC motor is employed as the synchronous motor. Furthermore, this brushless DC motor driving device carries out a speed control using a voltage amplitude.

A magnetic pole position detection signal output from a position detector is supplied to an exterior interruption terminal of the micro-processor. In the micro-processor, an interruption processing for a phase correction timer 18a, interval measurement timer 18b, and compensation voltage pattern mode selection section 19g", and an interruption processing for a compensation phase pattern mode selection section 19m (refer to interruption processing 1 in FIG. 36) are carried out by the magnetic pole position detection signal supplied to the exterior interruption terminal. Wherein, the phase correction timer 18a is set a timer value by a timer value calculating section 19a (described later). The interval measurement timer 18b obtains a timer value by measuring an interval of the magnetic pole position detection signal and supplies the timer value to a position signal interval calculating section 19b which is included in a CPU 19. The position signal interval calculating section 19b receives the timer value from the interval measurement timer 18b, calculates intervals of voltage patterns of stator windings 13u, 13v and 13w, and outputs a position signal interval signal which represents an interval. The phase correction timer 18a supplies a count-over signal to an inverter mode selection section 19c which is included in the CPU 19 and carries out an interruption processing (refer to the interruption processing 2 in FIG. 36). The inverter mode selection section 19c reads out a corresponding voltage pattern from a memory 18c and outputs the voltage pattern therefrom. The compensation voltage pattern mode selection section 19g" reads out a corresponding compensation voltage pattern from the memory 18c and outputs the compensation voltage pattern therefrom. The compensation phase pattern mode selection section 19m reads out a corresponding compensation phase pattern from the memory 18c and outputs the compensation phase pattern therefrom. In the CPU 19, an calculation is carried out based upon the timer value by the position signal interval calculating section 19b so as to output a position signal interval signal. The position signal interval signal is supplied to the timer value calculating section 19a and a speed calculating section 19e. The speed calculating section 19e calculates a present speed based upon the position signal interval signal from the position signal interval calculating section 19b and supplies the present speed to a speed control section 19f. A speed command is also supplied to the speed control section 19f. The speed control section 19f outputs an average voltage command based upon the speed command and the present speed from the speed calculating section 19e. The compensation phase pattern output from the compensation phase pattern mode selection section 19m and an average phase amount command are supplied to an adder 19n, and a sum of the both is supplied as a phase amount command to the timer value calculating section 19a. The timer value calculating section 19a calculates the timer value which is to be set in the phase correction timer 18a based upon the phase amount command and the position signal interval signal from the position signal interval calculating section 19b. The average voltage command and the compensation voltage pattern output from the compensation voltage pattern mode selection section 19g" are supplied to an adder 19h, and a sum of the both is output as a voltage command. And, the voltage pattern output from the inverter mode selection section 19c and the voltage command output from the adder 19h are supplied to a PWM (pulse width modulation) section 18d. The PWM section 18d outputs voltage commands for three phases. These voltage commands are supplied to a base driving circuitry 20. The base driving circuitry 20 outputs control signals each of which is to be supplied to each base terminal of switching transistors 121u1, 121u2, 121v1, 121v2, 121w1 and 121w2 of the inverter. Further, in the above description, each component section included within the CPU 19 is merely represented its functional section for performing corresponding function as the component section. Those component sections do not exist in the CPU 19 under a condition that each component section is clearly distinguished.

Figure 39:
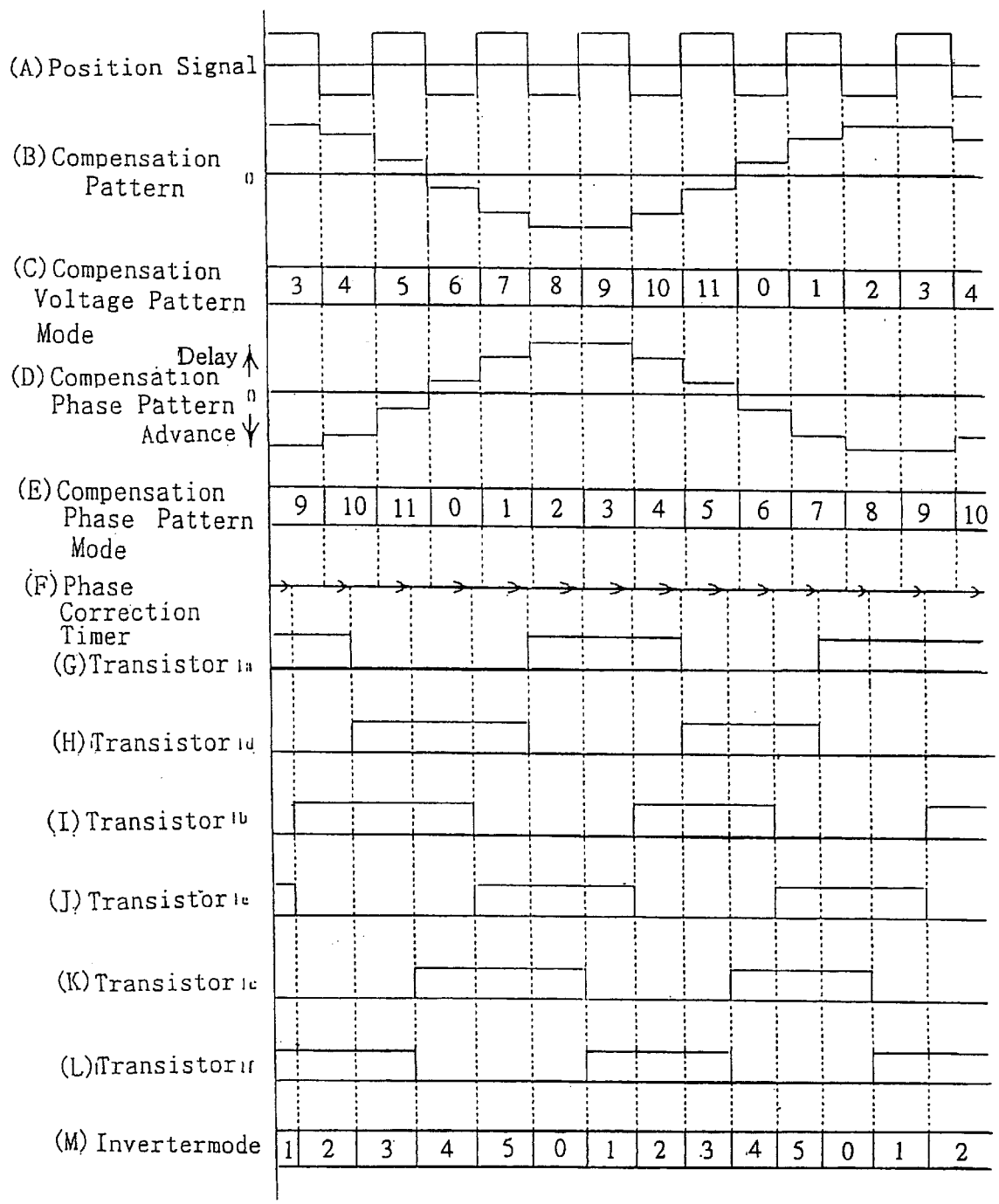
FIG. 39 are charts illustrating signal waveforms of each section of the brushless DC motor driving device illustrated in FIG. 36.

Then, an operation of the brushless DC motor driving device illustrated in FIG. 36 is described by referring to waveform diagrams illustrated in FIG. 39.

The position signal which is reversed its level periodically is output, as is illustrated in FIG. 39(A). The interruption processing 1 is carried out at timings corresponding to standing and felling of the position signal. The compensation voltage pattern mode is changed, as is illustrated in FIG. 39(C), so that the compensation voltage pattern which is illustrated in FIG. 39(B) is output. The compensation phase pattern mode is changed, as is illustrated in FIG. 39(E), so that the compensation phase pattern which is illustrated in FIG. 39(D) is output. The compensation phase pattern is determined so that changing of peak value of the integration signal is reduced which is illustrated in FIG. 42.

The sum of the compensation phase pattern and the average phase amount command is supplied to the timer value calculating section 19a as the phase amount command, and the timer value of the phase correction timer 18a is determined based upon the output from the timer value calculating section 19a, so that the timer value is increased or decreased, as is illustrated in FIG. 39(F). Though, the phase correction timer 18a has its timer value determined by the timer value calculating section 19a, the phase correction timer 18a is count-over when the phase correction timer performs a counting operation for the determined timer value {refer to the ending points of the arrows in FIG. 39(F)}. The interruption processing 2 is carried out at every occurrence of the count-over of the phase correction timer 18a, so that the inverter mode selection section 19c advances the inverter mode by 1 step. That is, the inverter mode is selected in the order of "2""3""4" . . . "0""1""2" . . . . The ON-OFF condition of the switching transistors 121u1, 121u2, 121v1, 121v2, 121w1 and 121w2 is controlled, as illustrated in FIGS. 39(G) to 39(L), corresponding to each inverter mode, by advancing the inverter mode by 1 step by the interruption processing 2.

Figure 40:
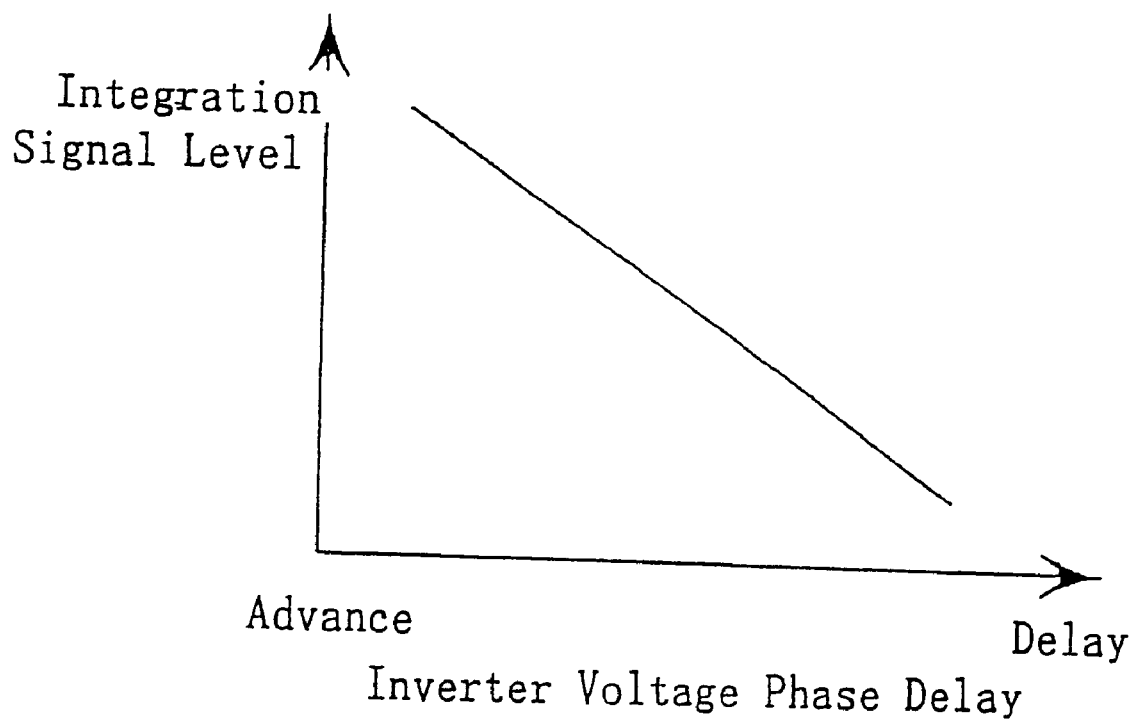
FIG. 40 is a chart illustrating the relationship between the integration signal level and the phase changing component amplitude.
Figure 41:
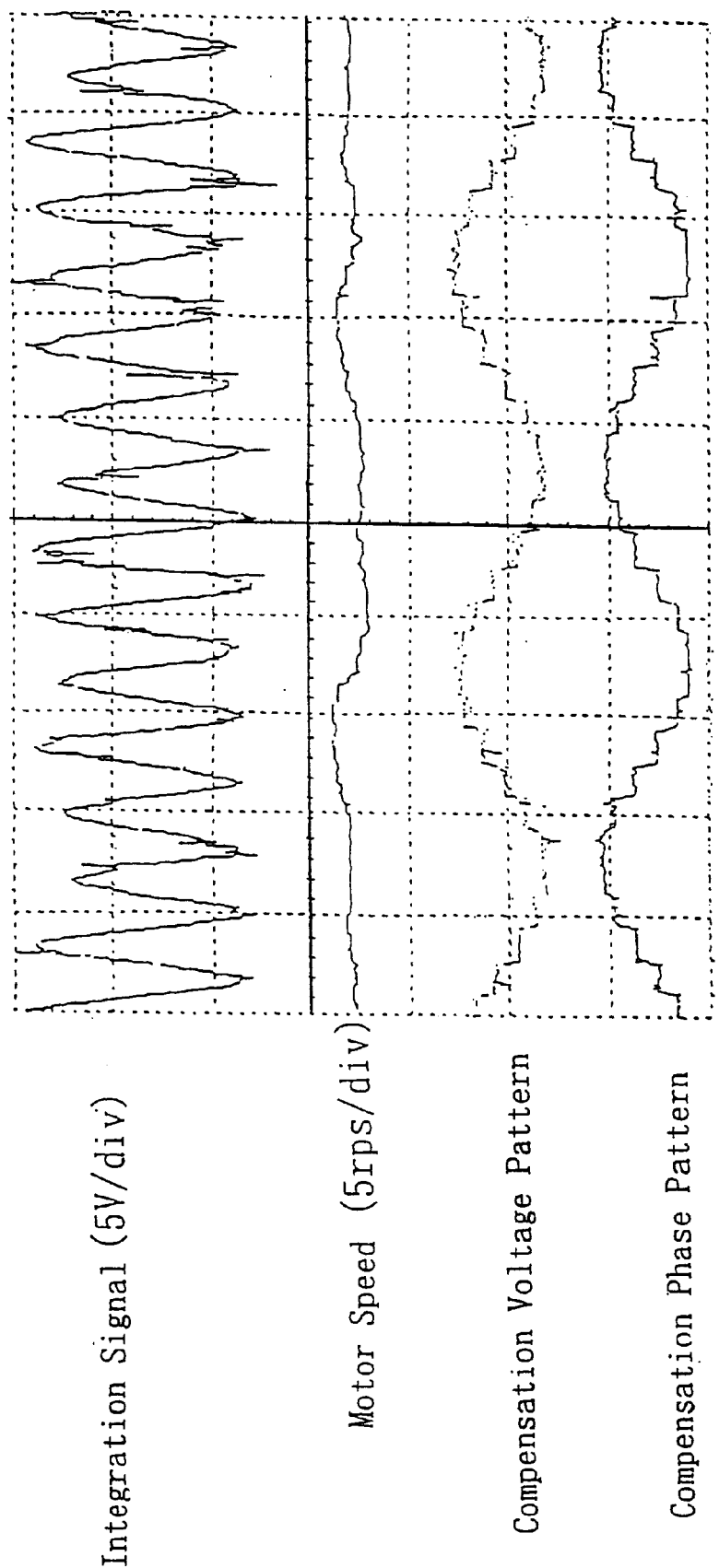
FIG. 41 are charts illustrating an integration signal, motor speed, compensation voltage pattern, and compensation phase pattern when the brushless DC motor driving device illustrated in FIG. 36 is applied.

Further, the integration signal level and the inverter voltage phase have a relationship such that the level of the integration signal is increased by advancing the inverter voltage phase and that the level of the integration signal is decreased by delaying the inverter voltage phase, as is illustrated in FIG. 40. Therefore, the beat phenomenon in the integration signal is greatly reduced, as is illustrated in FIG. 41, by carrying out the processing based upon the device illustrated in FIG. 36, so that the position signal (integration signal) is stabilized and the driving range of the brushless DC motor is enlarged when the torque control is performed. FIG. 42 are charts illustrating the integration signal, motor speed and compensation voltage pattern when the determination of the timer value based upon the compensation phase pattern is not carried out. The beat phenomenon to some degree is generated in the integration signal. Further, FIG. 41 illustrate the integration signal, motor speed, compensation voltage pattern and compensation phase pattern.

Figure 42:
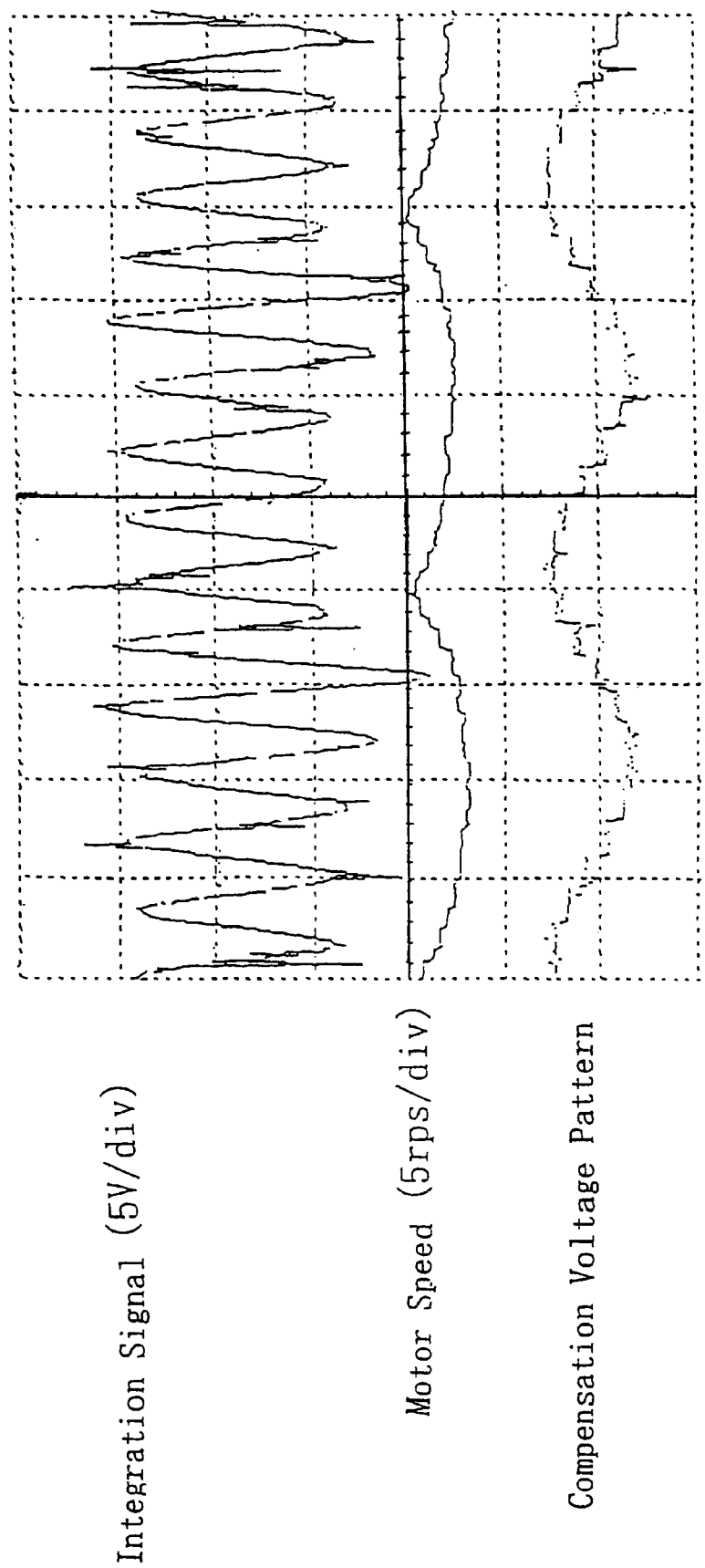
FIG. 42 are charts illustrating an integration signal, motor speed, and compensation voltage pattern when the inverter voltage phase is not changed.

Therefore, it is understood that the beat phenomenon is greatly reduced by comparing FIG. 41 and FIG. 42. Furthermore, higher motor efficiency is realized in FIG. 41 than in FIG. 42.

When the beat phenomenon of the integration signal is great, disadvantages arise in that detection of zero-cross becomes impossible because the level of the integration signal is too small so that detection of the position signal cannot be performed, and in that a normal integration operation becomes impossible due to saturation of a device so that detection of the position signal cannot be performed, for example. And, the brushless DC motor may stall due to those. But, such disadvantages are prevented from occurrence by employing the brushless DC motor driving device illustrated in FIG. 36. As a result, a vibration suppression affect can be improved and motor efficiency, is improved because the torque control amount can be determined to be greater.

Figure 37:
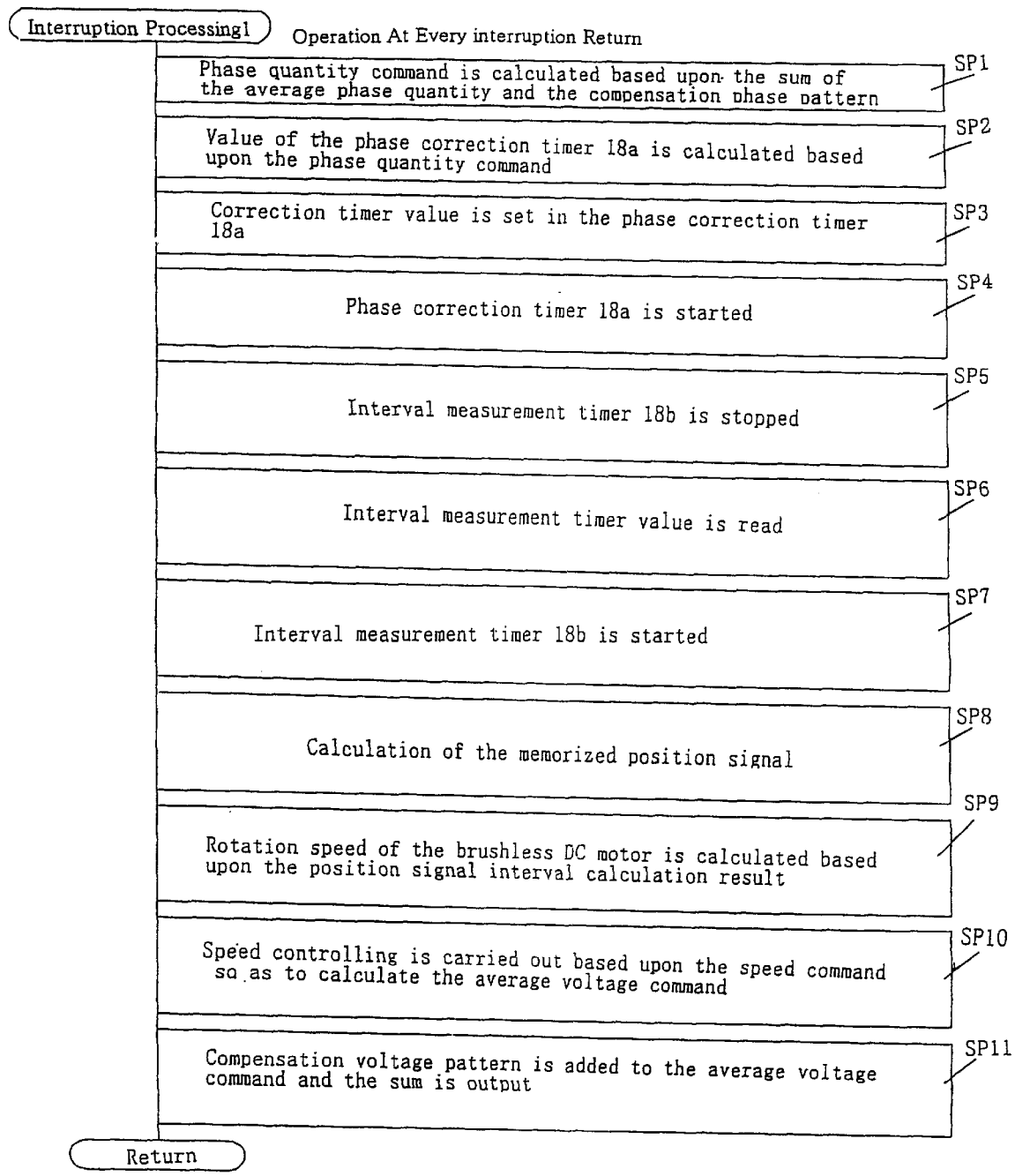
FIG. 37 is a flowchart useful in understanding an operation of the interruption operation 1 illustrated in FIG. 36.

FIG. 37 is a flowchart useful in understanding the operation of the interruption processing 1.

An external interruption requirement is accepted at standing edges and falling edges, respectively, of the magnetic pole position detection signal (corresponding to the excitement change-over signal) from the position detection section.

In step SP1, the phase amount command is calculated based upon the sum of the average phase amount (average phase correction angle) from the exterior and the compensation phase pattern selected by the compensation pattern mode selection section 19m, in step SP2, the value of the phase correction timer 18a is calculated based upon the phase amount command, in step SP3, the correction timer value is set in the phase correction timer 18a, in step SP4, the phase correction timer 18a is started. In step SP5, the interval measurement timer 18b is stopped which has started by the previous interruption processing 1, in step SP6, the interval measurement timer value is read (is memorized). The operations in steps SP5 and SP6 are operations for detecting an interval of edges of the position signal. Therefore, after the reading of the interval measurement timer value, in step SP7, the interval measurement timer 18b is immediately reset and is started again for the next interval measurement. In step SP8, calculation of the memorized position signal interval (for example, calculation of a count number per 1 degree in electrical angle) is carried out, in step SP9, the rotation speed at the present time of the brushless DC motor 13 is calculated based upon the position signal interval calculation result, in step SP10, the speed control is carried out based upon the speed command so as to calculate the average voltage command, in step SP11, the compensation voltage pattern is added to the average voltage command and the sum is output, then the operation returns to an original processing.

Figure 38:
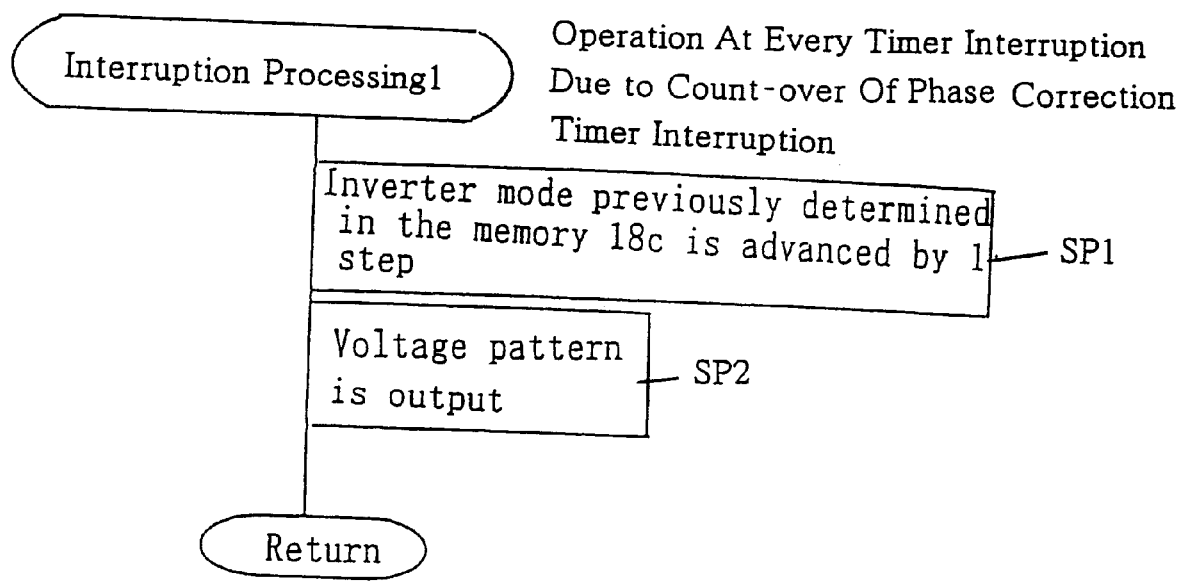
FIG. 38 is a flowchart useful in understanding an operation of the interruption operation 2 illustrated in FIG. 36.

FIG. 38 is a flowchart useful in understanding the operation of the interruption processing 2.

The interruption processing 2 is accepted at every count-over of the phase correction timer 18a which has started in the interruption processing In step SP1, the inverter mode previously determined in the memory 18c is advanced by 1 step, in step SP2, the voltage pattern corresponding to the advanced inverter mode is output, then the operation returns to an original processing.

Figure 43:
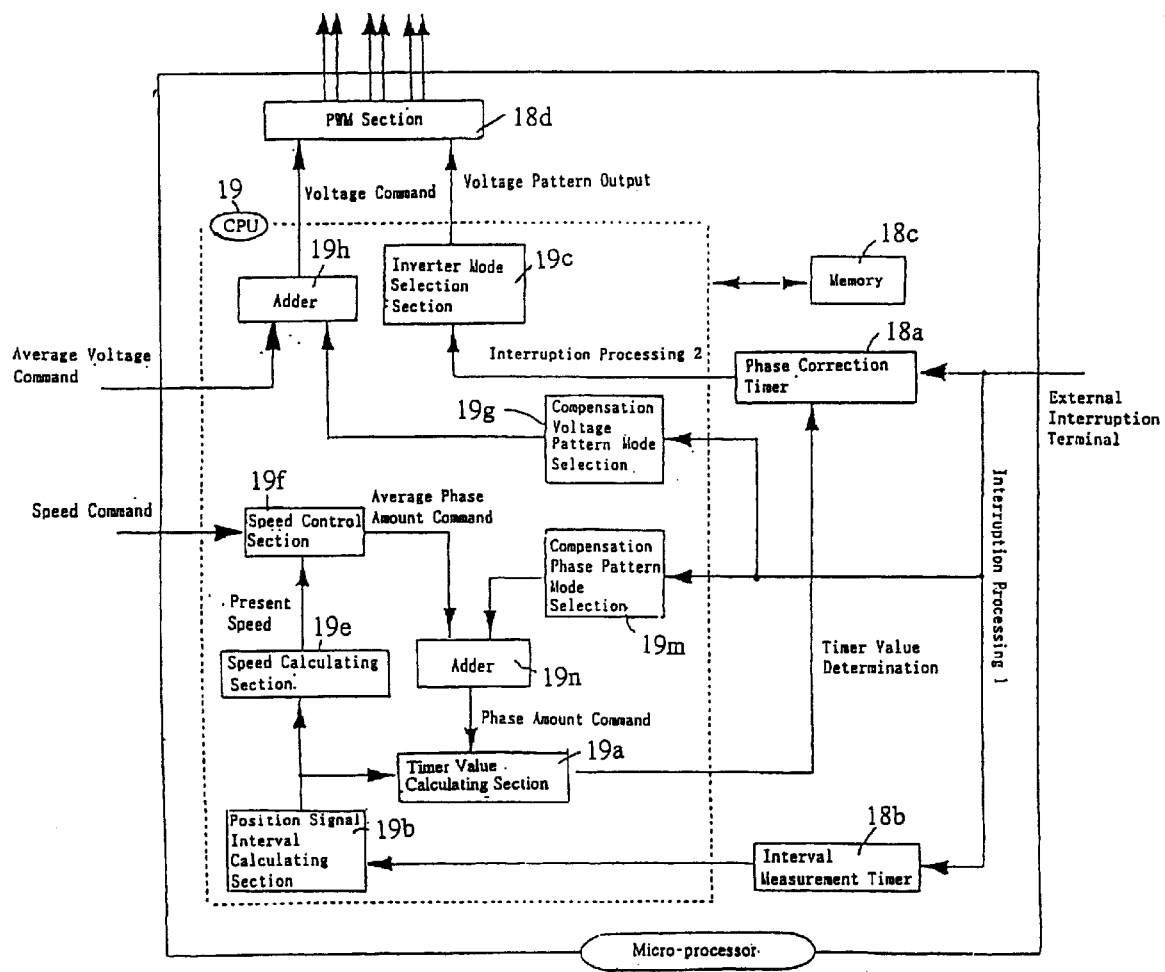
FIG. 43 is a block diagram illustrating an arrangement of a microprocessor which is a main section of another embodiment of a brushless DC motor driving device according to the present invention.

FIG. 43 in a block diagram illustrating an arrangement of a micro-processor which is a main section of a brushless DC motor driving device of another embodiment according to the present invention. A portion other than the microprocessor has a similar arrangement to that in FIG. 21, therefore description in detail is omitted. Further, this brushless DC motor driving device performs the speed control using a voltage phase.

This brushless DC motor driving device is different from the brushless DC motor in FIG. 36 in that a speed control section 19f' for outputting an average phase amount command by inputting the present speed output from the speed calculating section 19e and the speed command from the exterior is employed instead of the speed control section 19f, that the compensation phase pattern output from the compensation phase pattern mode selection section 19m and the average phase amount command are supplied to the adder 19n so as to obtain the phase amount command and the phase amount command is supplied to the timer value calculation section 19a, and that the average voltage command from the exterior and the compensation voltage pattern output from the compensation voltage pattern mode selection section 19g" are supplied to the adder 19h so as to obtain the voltage command and the voltage command is supplied to the PWM section 18d.

Figure 45:
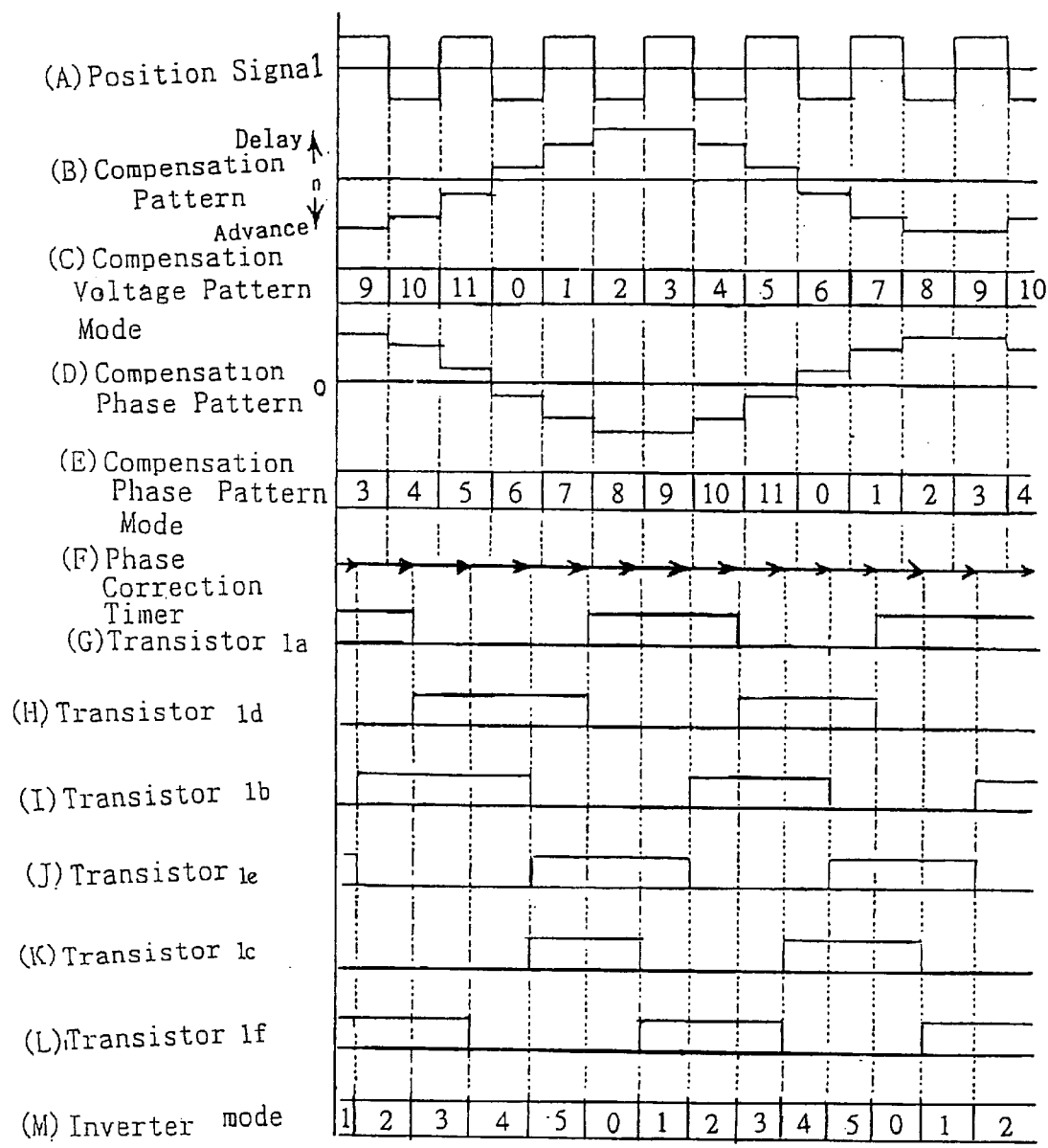
FIG. 45 are charts illustrating signal waveforms of each section of the brushless DC motor driving device illustrated in FIG. 43, and operation contents.

The operation of the brushless DC motor driving device, illustrated in FIG. 43 is described by referring to waveforms illustrated in FIG. 45.

The position signal which is reversed in level periodically, is illustrated in FIG. 45(A). The interruption processing 1 is carried out at every timing of standing and falling of the position signal, the compensation voltage pattern mode changes, as is illustrated in FIG. 45(E), so that the compensation voltage pattern illustrated in FIG. 45(D) is output. Also, the compensation phase pattern mode is changed, as is illustrated in FIG. 45(C), so that the compensation pattern illustrated in FIG. 45(B) is output.

The sum of the compensation phase pattern and the average phase amount command output from the speed control section 19f' is supplied as the phase amount command to the timer value calculating section 19a so that the timer value in the phase correction timer 18a is determined by the output from the timer value calculating section 19a. Therefore, the timer value is increased or decreased, as is illustrated in FIG. 45(F). Though this phase correction timer 18a is determined by the timer value calculating section 19a, the phase correction timer 18a is count-over when the phase correction timer 18a has performed count operation for the determined timer value {refer to the ending points of the arrows in FIG. 45(F)}. The interruption processing 2 is carried out at every count-over of the phase correction timer 18a so that the inverter mode selection section 19c advances the inverter mode by 1 step. That is, the inverter mode is sequentially selected in the order of "2""3""4" . . . "0""1""2" . . . . And, the ON-OFF condition of the switching transistors 121u1, 121u2, 121v1, 121v2, 121w1 and 121w2 is controlled corresponding to each inverter mode, as illustrated in FIGS. 45(G) to 45(L), by advancing the inverter mode by 1 step by the interruption processing 2.

Therefore, the beat phenomenon of the integration signal is greatly reduced so that the position signal (integration signal) is stabilized and the driving range of the brushless DC motor under the torque control is enlarged, as is similar as the brushless DC motor driving device illustrated in FIG. 36.

Figure 44:
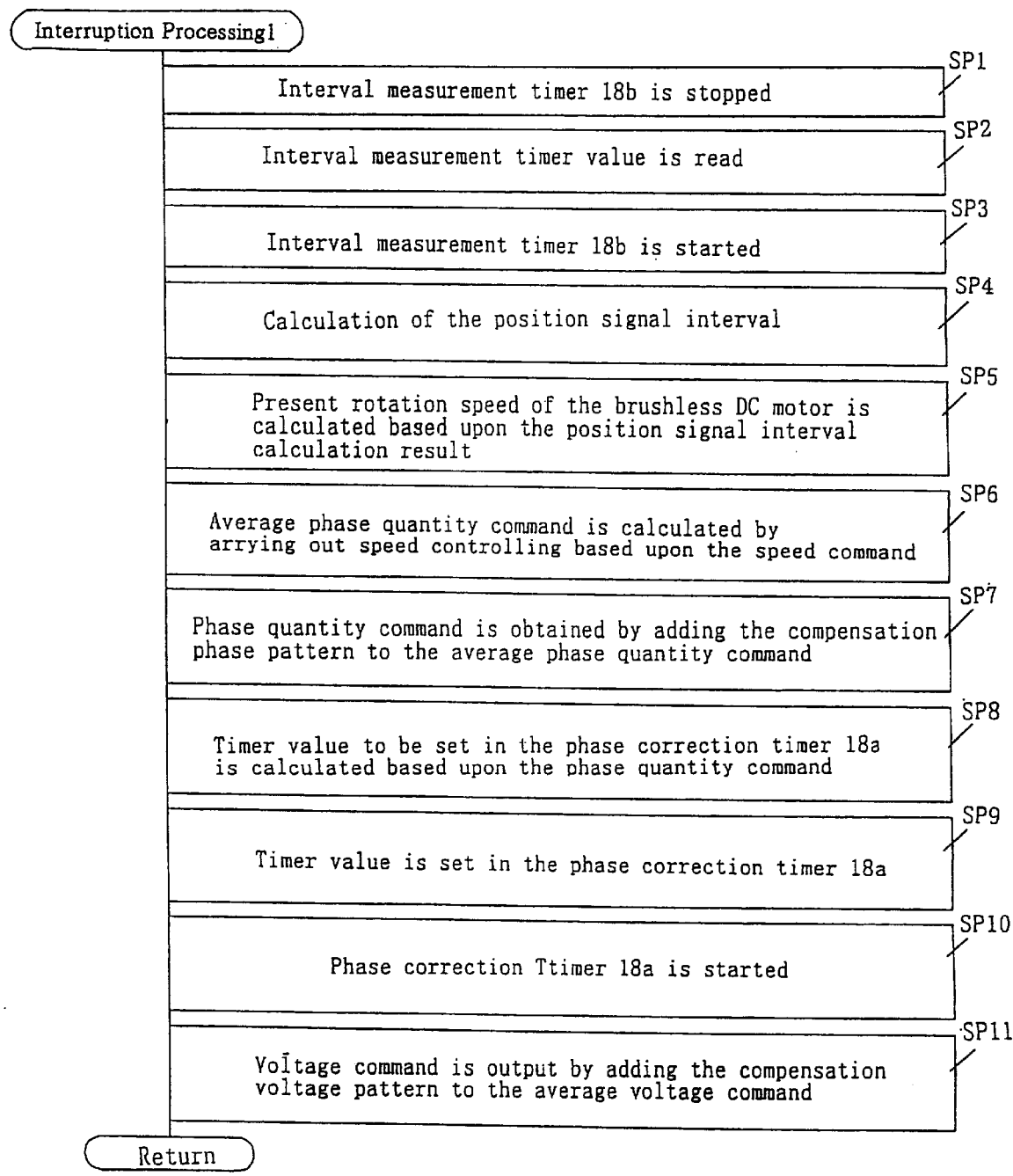
FIG. 44 is a flowchart useful in understanding an operation of the interruption operation 1 illustrated in FIG. 43.

FIG. 44 is a flowchart useful in understanding the operation of the interruption processing 1. The external interruption requirement is accepted at every standing edge and falling edge of the magnetic pole position detection signal (corresponds to the above excitement change-over signal) of the position detecting section.

In step SP1, the interval measurement timer 18b is stopped, in step SP2, interval measurement timer value is read. The operations in steps SP1 and SP2 are operations for detecting an interval of edges of the position signal. Therefore, after reading of the interval measurement timer value, in step SP3, the interval measurement timer 18b is immediately stopped and is started again for the next interval measurement. In step SP4, calculation of the memorized position signal interval (calculation of a count number per 1 degree in electric angle) is carried out, in stop SP5, the present rotation speed of the brushless DC motor is calculated based upon the position signal interval calculation result, in step SP6, the average phase amount command is calculated by carrying out the speed control based upon the speed command, in step SP7, the phase amount command is obtained by adding the compensation phase pattern to the average phase amount command, in step SP8, the timer value to be set in the phase correction timer 18a is calculated based upon the phase amount command, in step SP9, the calculated timer value is set in the phase correction timer 18a, in step SP10, the phase correction timer 18a is started, in step SP11, the voltage command is output by adding the compensation voltage pattern to the average voltage command, then the operation returns to an original processing.

The operation contents of the interruption processing illustrated in FIG. 43 is similar to the operation of the flowchart in FIG. 38, therefore description thereof is omitted.

Figure 46:
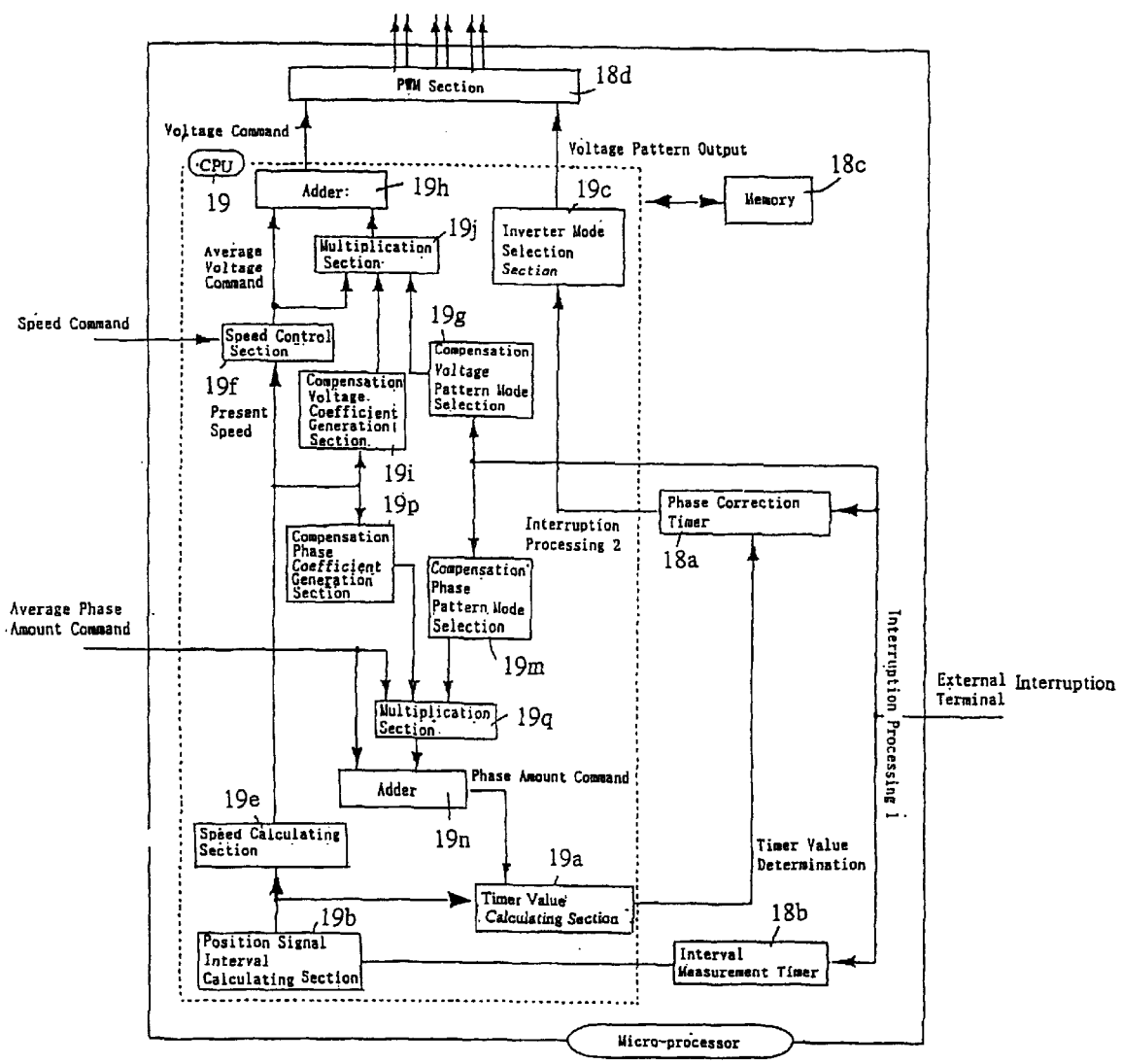
FIG. 46 is a block diagram illustrating an arrangement of a microprocessor which is a main section of a further embodiment of a brushless DC motor driving device according to the present invention.

FIG. 46 is a block diagram illustrating an arrangement of a micro-processor which is a main section of a brushless DC motor of yet another embodiment according to the present invention. The block diagram illustrates the brushless DC motor driving device in FIG. 36 in more detail. Further, the arrangement other than the micro-processor is similar to the arrangement in FIG. 21, therefore description thereof is omitted. Furthermore, this brushless DC motor driving device performs the speed control based upon the voltage amplitude.

This brushless DC motor driving device is different from the brushless DC motor driving device in FIG. 36 in that a compensation voltage coefficient generation section 19i' for outputting a previously determined compensation voltage coefficient (a value between 0 and 1) based upon the present speed from the speed calculating section 19e, and a compensation phase coefficient generating section 19p for outputting a previously determined compensation phase coefficient (a value between 0 and 1) based upon the present speed from the speed calculating section 19e are further provided. A multiplication section 19j is further provided for outputting a compensation voltage pattern by inputting the average voltage command output from the speed control section 19f, the compensation voltage coefficient output from the compensation voltage coefficient generation section 19i' and the compensation voltage pattern output from the compensation voltage pattern mode selection section 19g". A multiplication section 19q is further provided for outputting a compensation phase pattern by inputting the average phase amount command given from the exterior, the compensation phase coefficient output from the compensation phase coefficient generation section 19p and the compensation phase pattern output from the compensation phase pattern mode selection section 19m. Thus, the average voltage command output from the speed control section 19f and the compensation voltage pattern output from the multiplication section 19*j* are supplied to the adder 19*h* and the sum of the both is output as the voltage command, and the average phase amount command given from the exterior and the compensation phase pattern output from the multiplication section 19*q* are supplied to the adder 19*n* and the sum of the both is output as the phase amount command.

Figure 47:
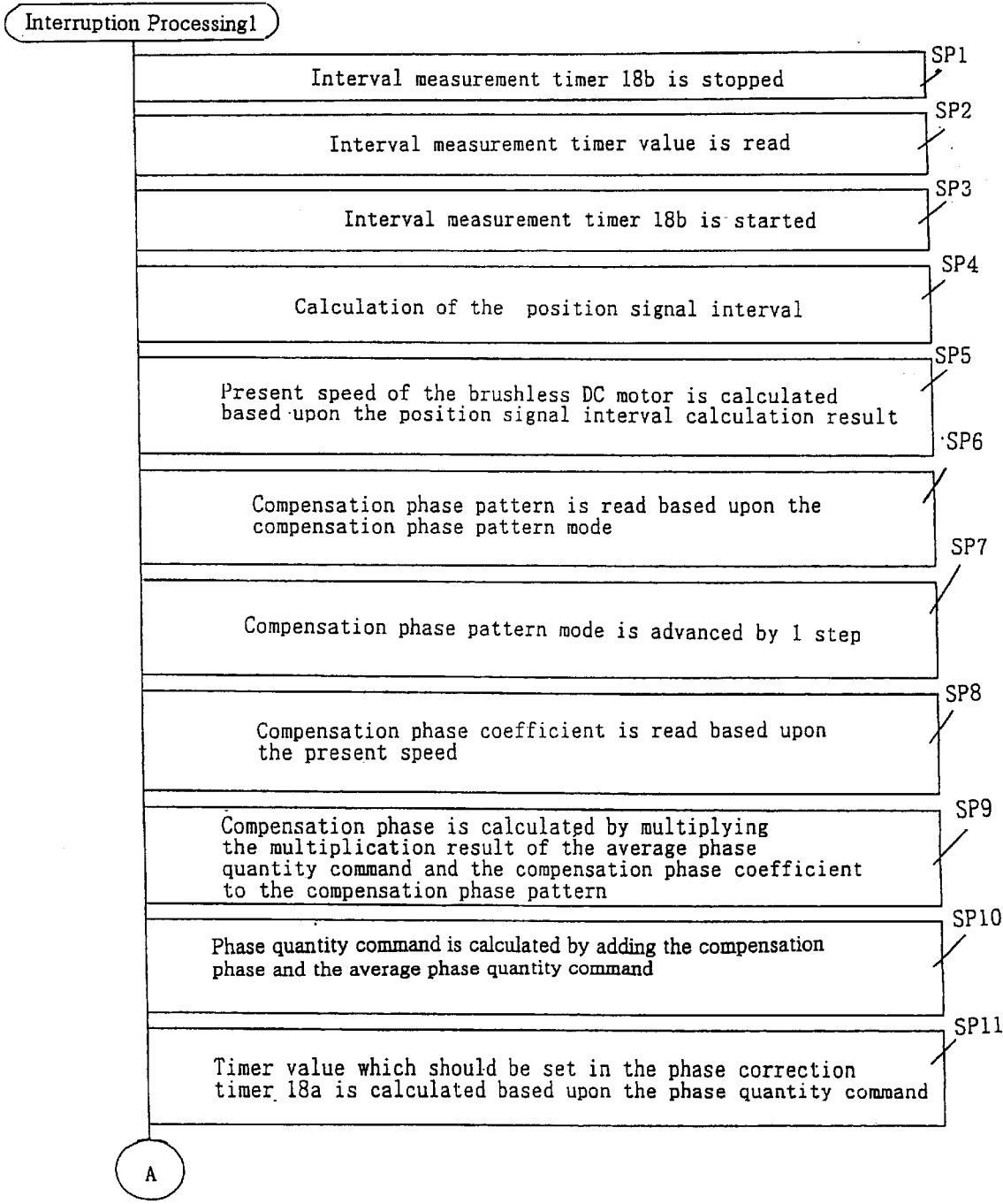
FIG. 47 is a flowchart useful in understanding an operation of a partial section of the interruption operation 1 illustrated in FIG. 46.
Figure 48:
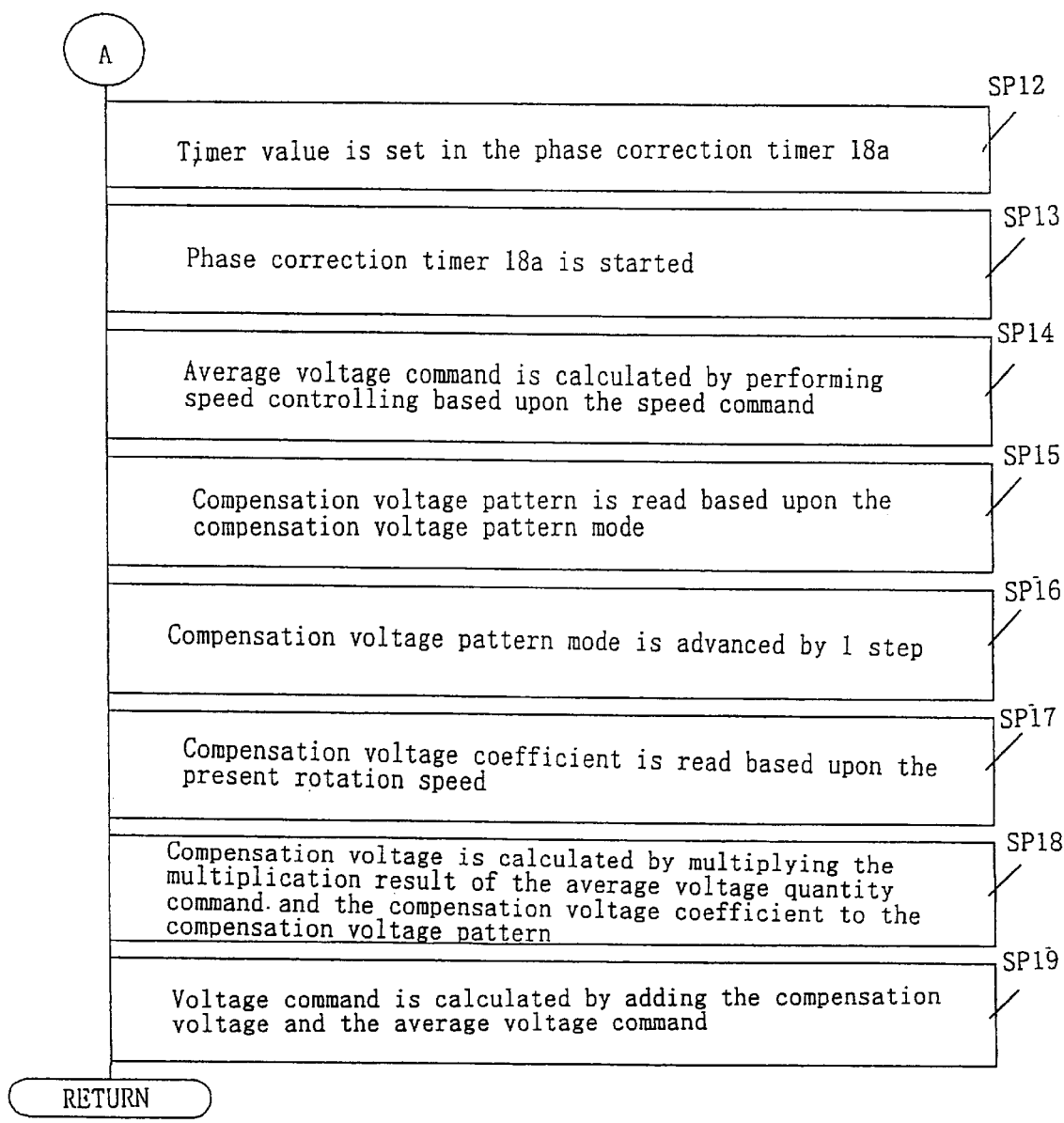
FIG. 48 is a flowchart useful in understanding an operation of a remaining section of the interruption operation 1 illustrated in FIG. 46.

FIGS. 47 and 48 are a flowchart useful in understanding an operation of the interruption processing 1 in FIG. 46. The external interruption requirement is accepted at standing edges and falling edges of the magnetic pole position detection signal (corresponds to the above excitement change-over signal) of the position detection section.

In step SP1, the interval measurement timer 18*b* is stopped, in step SP2, the interval measurement timer value is read. The operations in steps SP1 and SP2 are operations for detecting an interval of the edges of the position signal. Therefore, after the reading of the interval measurement timer value, in step SP3, the interval measurement timer 18*b* is immediately reset and is started again for the next interval measurement. In step SP4, calculation of the memorized position signal interval (for example, calculation of a count number per 1 degree in electric angle) is carried out, in step SP5, the present speed of the brushless DC motor is calculated based upon the position signal interval calculation result, in step SP6, the compensation phase pattern is read based upon the compensation phase pattern mode, in step SP7, the compensation phase pattern mode is advanced by 1 step. In step SP8, the compensation phase coefficient is read based upon the present speed, in step SP9, the compensation phase is calculated by multiplying the multiplication result of the average phase amount command and the compensation phase coefficient to the compensation phase pattern, in step SP10, the phase amount command is calculated by adding the compensation phase and the average phase amount command, in step SP11, the timer value which should be set in the phase correction timer 18*a* is calculated based upon the phase amount command, in step SP12, the timer value is set in the phase correction timer 18*a* in step SP13, the phase correction timer 18*a* is started. In step SP14, the average voltage command is calculated by performing the speed control based upon the speed command given from the exterior. In step SP15, the compensation voltage pattern is read based upon the compensation voltage pattern mode. In step SP16, the compensation voltage pattern mode is advanced by 1 step. In step SP17, the compensation voltage coefficient is read based upon the present rotation speed. In step SP18, the compensation voltage is calculated by multiplying the multiplication-result of the average voltage amount command and the compensation voltage coefficient to the compensation voltage pattern. In step SP19, the voltage command is calculated by adding the compensation voltage and the average voltage command, then the operation returns to an original processing.

The operation contents of the interruption processing 2 in FIG. 46 is similar to the operation of the flowchart in FIG. 38, therefore description thereof is omitted.

Therefore, operations and effects which are similar to those of the brushless DC motor driving device in FIG. 36 are realized when this brushless DC motor driving device is employed.

Further, in this embodiment, the compensation phase pattern mode selection section 19*m* selects the compensation phase pattern so as to suppress the beat phenomenon of the integration signal. But, it is possible that the inverter interval is divided, the level of the integration signal is judged whether it is great or small at every divided interval, and in responding to the judgment result, the inverter voltage phase is delayed when the level of the integration signal is great, or the inverter voltage phase is advanced when the level of the integration signal is small.

Figure 49:
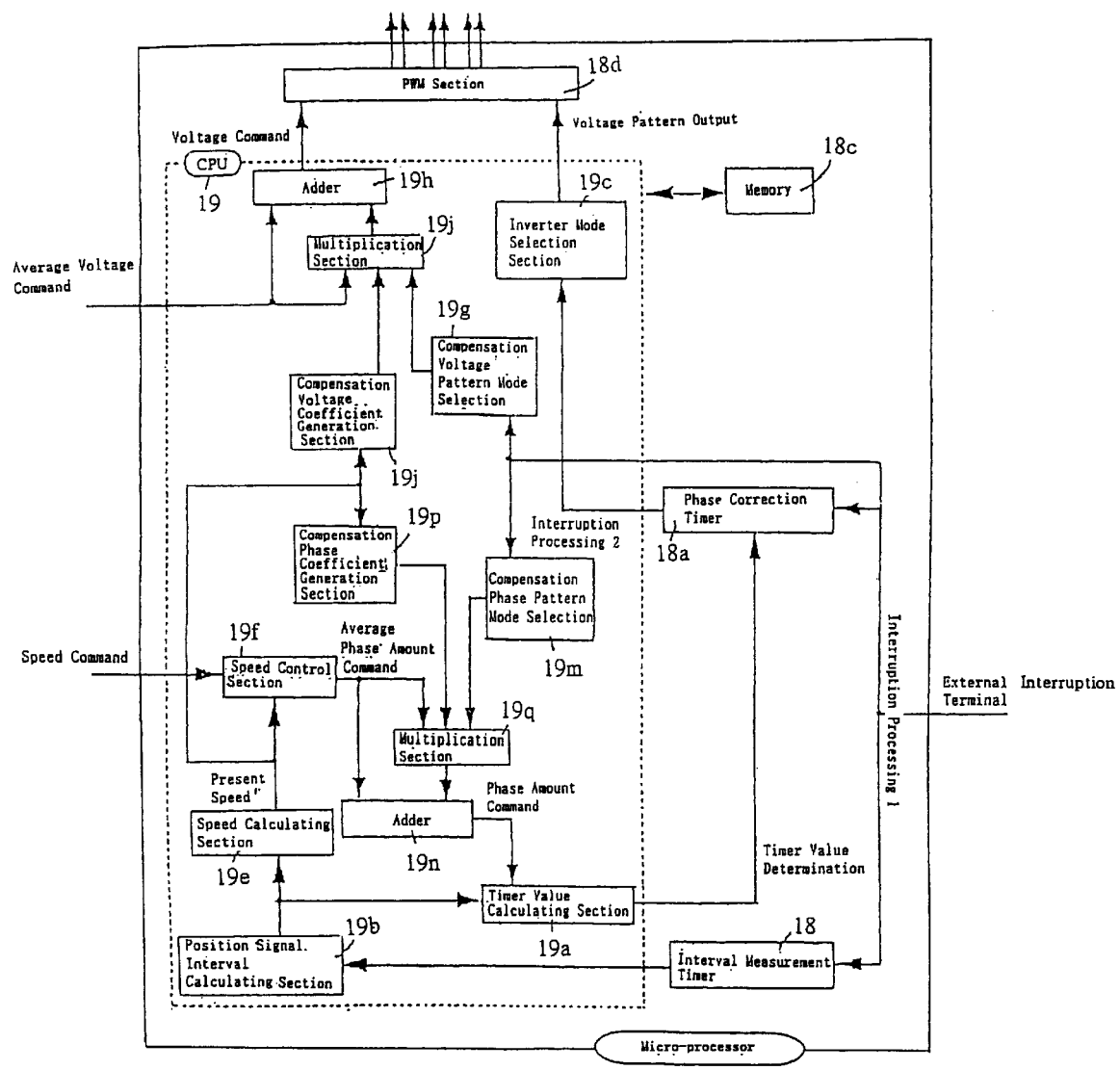
FIG. 49 is a block diagram illustrating an arrangement of a microprocessor which is a main section of yet another embodiment of a brushless DC motor driving device according to the present invention.

FIG. 49 is a block diagram illustrating an arrangement of a micro-processor which is a main section of a brushless DC motor of a yet further embodiment according to the present invention. The block diagram illustrates the brushless DC motor driving device in FIG. 43 in more detail. Further, the arrangement other than the micro-processor is similar to the arrangement in FIG. 21, therefore description thereof is omitted. Furthermore, this brushless DC motor driving device performs the speed control based upon the phase amplitude.

This brushless DC motor driving device is different from the brushless DC motor driving device in FIG. 43 in that a compensation voltage coefficient generation section 19*i*' for outputting a previously determined compensation voltage coefficient (a value between 0 and 1) based upon the present speed from the speed calculating section 19*e*, and a compensation phase coefficient generating section 19*p* for outputting a previously determined compensation phase coefficient (a value between 0 and 1) based upon the present speed from the speed calculating section 19*e* are further provided. A multiplication section 19*j* is further provided for outputting a compensation voltage pattern by inputting the average voltage command given from the exterior, the compensation voltage coefficient output from the compensation voltage coefficient generation section 19*i*' and the compensation voltage pattern output from the compensation voltage pattern mode selection section 19*g*". A multiplication section 19*q* is further provided for outputting a compensation phase pattern by inputting the average phase amount command output from the speed controlling section 19*f*, the compensation phase coefficient output from the compensation phase coefficient generation section 19*p* and the compensation phase pattern output from the compensation phase pattern mode selection section 19*m*. Hence, the average voltage command given from the exterior and the compensation voltage pattern output from the multiplication section 19*j* are supplied to the adder 19*h* and the sum of the both is output as the voltage command, and wherein the average phase amount command output from the speed control section 19*f* and the compensation phase pattern output from the multiplication section 19*q* are supplied to the adder 19*n*, and the sum of the both is output as the phase amount command.

Figure 50:
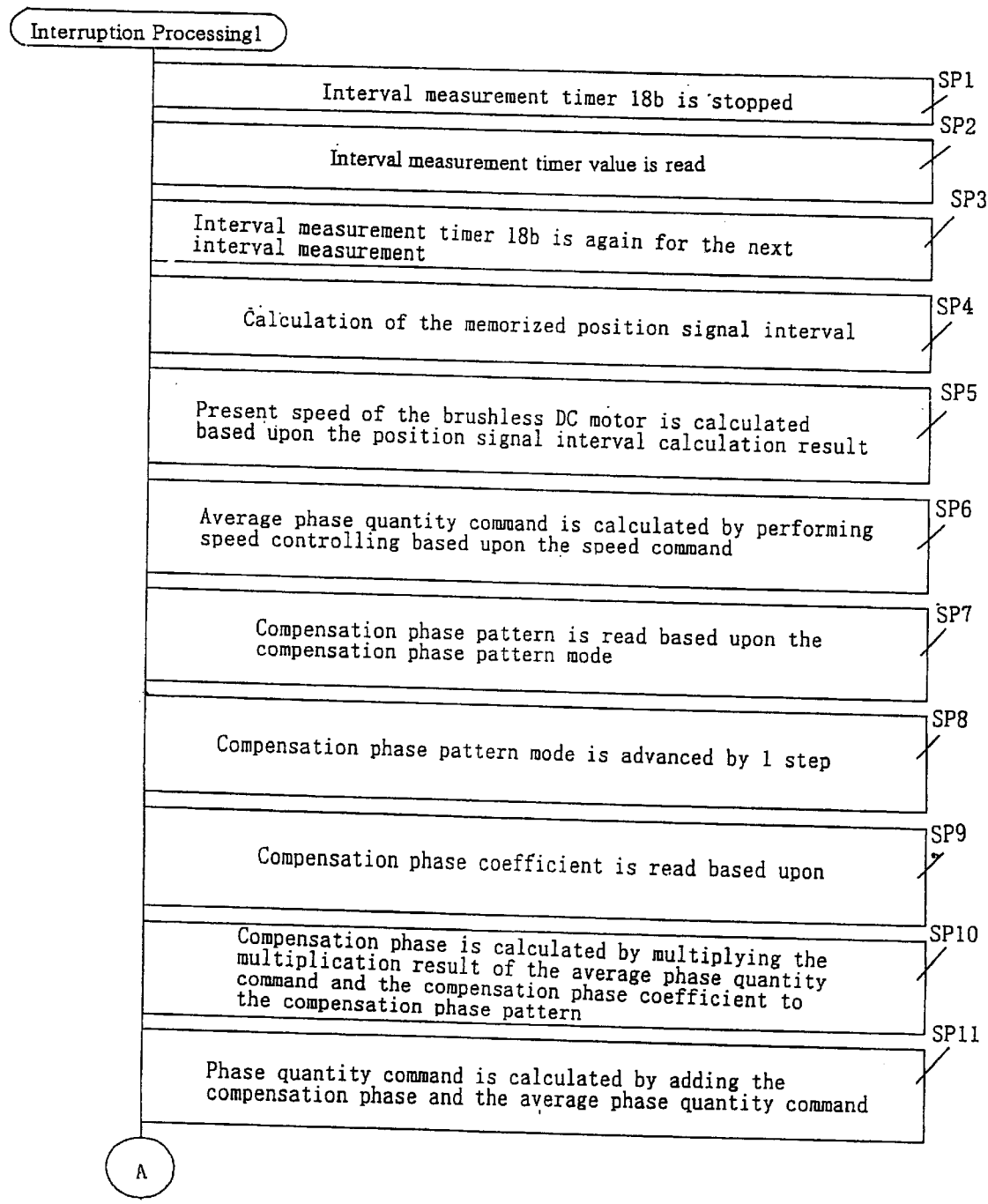
FIG. 50 is a flowchart useful in understanding an operation of a partial section of the interruption operation 1 illustrated in FIG. 49.
Figure 51:
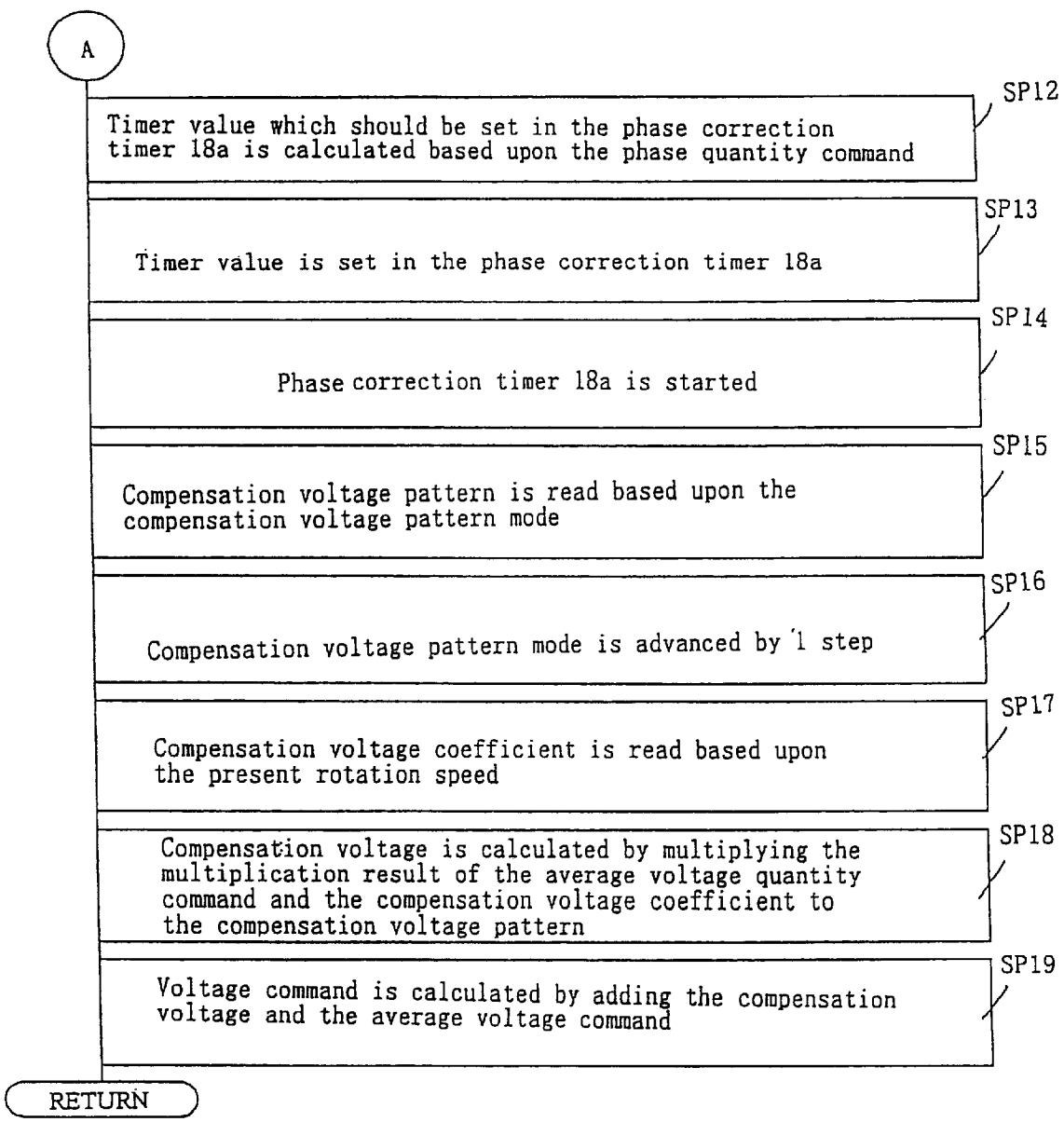
FIG. 51 is a flowchart useful in understanding an operation of a remaining section of the interruption operation 1 illustrated in FIG. 49.

FIGS. 50 and 51 are a flowchart useful in understanding an operation of the interruption processing 1 in FIG. 49. The external interruption requirement is accepted at standing edges and falling edges of the magnetic pole position detection signal (corresponds to the above excitement change-over signal) of the position detection section.

In step SP1, the interval measurement timer 18*b* is stopped, in step SP2, the interval measurement timer value is read. The operations in steps SP1 and SP2 are operations for detecting an interval of the edges of the position signal. Therefore, after the reading of the interval measurement timer value, in step SP3, the interval measurement timer 18*b* is immediately reset and is started again for the next interval measurement. In step SP4, calculation of the memorized position signal interval (for example, calculation of a count number per 1 degree in electric angle) is carried out, in step SP5, the present speed of the brushless DC motor is calculated based upon the position signal interval calculation result, in step SP6, the average phase amount command is calculated by performing the speed control based upon the speed command given from the exterior, in step SP7, the compensation phase pattern is read based upon the compensation phase pattern mode, in step SP8, the compensation phase pattern mode is advanced by 1 step. In step SP9, the compensation phase coefficient is read based upon the present speed, in step SP10, the compensation phase is calculated by multiplying the multiplication result of the average phase amount command and the compensation phase coefficient to the compensation phase pattern, in step SP11, the phase amount command is calculated by adding the compensation phase and the average phase amount command, in step SP12, the timer value which should be set in the phase correction timer 18a is calculated based upon the phase amount command, in step SP13, the timer value is set in the phase correction timer 18a, in step SP14, the phase correction timer 18a is started. In step SP15, the compensation voltage pattern is read based upon the compensation voltage pattern mode, in step SP16, the compensation voltage pattern mode is advanced by 1 step. In step SP17, the compensation voltage coefficient is read based upon the present rotation speed, in step SP18, the compensation voltage is calculated by multiplying the multiplication result of the average voltage amount command and the compensation voltage coefficient to the compensation voltage pattern, in step SP19, the voltage command is calculated by adding the compensation voltage and the average voltage command, then the operation returns to an original processing.

The operation contents of the interruption processing 2 in FIG. 49 is similar to the operation of the flowchart in FIG. 38, therefore description thereof is omitted.

Therefore, operations and effects which are similar to those of the brushless DC motor driving device in FIG. 43 are realized when this brushless DC motor driving device is employed.

INDUSTRIAL APPLICABILITY

The present invention can realize the torque control for reducing low speed vibration of a cyclic intermittent load with a maximum efficiency condition and with a practical arrangement, and is applicable to various applications in which a cyclic intermittent load is driven using a synchronous motor or brushless DC motor.

What is claimed is:

1. A synchronous motor driving method comprising the step of;
   superposing a varying amount upon an amplitude and a phase of a current waveform or voltage waveform when torque control is performed for suppressing speed change within one rotation by a synchronous motor controlled with an inverter which motor drives a load having a cyclic torque change.

2. A synchronous motor driving method as set forth in claim 1, wherein a varying amount in phase is controlled based upon a varying amount in amplitude which is controlled based upon an output of a torque control section.

3. A synchronous motor driving method as set forth in claim 1, wherein a varying amount in amplitude is controlled based upon a varying amount in phase which is controlled based upon an output of a torque control section.

4. A synchronous motor driving method as set forth in claim 1, wherein a varying amount in amplitude is controlled based upon an output of a torque control section, and a varying amount in phase is controlled based upon a detection amount which is related to efficiency.

5. A synchronous motor driving method as set forth in claim 1, wherein a varying amount in phase is controlled based upon an output, of a torque control section, and a varying amount in amplitude is controlled based upon a detection amount which is related to efficiency.

6. A synchronous motor driving method as set forth in claim 1, wherein an amount corresponding to a fundamental wave and lower harmonics is employed as the varying amount.

7. A synchronous motor driving method as set forth in claim 1, wherein an amount corresponding to a fundamental wave is employed as the varying amount.

8. A synchronous motor driving method as set forth in claim 1, wherein a third harmonic is superposed upon the varying amount in amplitude.

9. A synchronous motor driving method as set forth in claim 1, wherein a difference between a first center point voltage and a second center point voltage is integrated so as to detect a magnetic pole position of a rotor of the synchronous motor, the first center point voltage being obtained by resistances, each having one end which is connected to an output terminal of each phase of the inverter and another end which is connected to one another, and the second center point voltage being obtained by connecting one end of a stator winding of each phase of the synchronous motor to one another.

10. A compressor driving method is a method for driving a one cylinder compressor using a synchronous motor which is driven by the synchronous motor driving method according to claim 1.

11. A synchronous motor driving device comprising;
    inverter control means for controlling an inverter so as to superpose a varying amount upon an amplitude and a phase of a current waveform or voltage waveform when torque control is performed for suppressing speed change within one rotation by a synchronous motor controlled with an inverter which motor drives a load having a cyclic torque change.

12. A synchronous motor driving device as set forth in claim 11, wherein the inverter control, means is means for controlling a varying amount in phase based upon a varying amount in amplitude which is controlled based upon an output of a torque control section.

13. A synchronous motor driving device as set forth in claim 11, wherein the inverter control means is means for controlling a varying amount in amplitude based upon a varying amount in phase which is controlled based upon an output of a torque control section.

14. A synchronous motor driving device as set forth in claim 11, wherein the inverter control means is means for controlling a varying amount in amplitude based upon an output of a torque control section and for controlling a varying amount in phase based upon a detection amount corresponding to efficiency.

15. A synchronous motor driving device as set forth in claim 11, wherein the inverter control means is means for controlling a varying amount in phase based upon an output of a torque control section and for controlling a varying amount in amplitude based upon a detection amount corresponding to efficiency.

16. A synchronous motor driving device as set forth in claim 11, wherein the inverter control means employs an amount corresponding to a fundamental wave and lower harmonics as the varying amount.

17. A synchronous motor driving device as set forth in claim 11, wherein the inverter control means employs an amount corresponding to a fundamental wave a the varying amount.

18. A synchronous motor driving device as set forth in claim 11, wherein the inverter control means is means for superposing a third harmonic upon the varying amount in amplitude.

19. A synchronous motor driving device as set forth in claim 11, further comprising resistances, each having one end which is connected to an output terminal of each phase of the inverter and another end which is connected to one another so that a first center point voltage is obtained, stator windings of each phase of the synchronous motor each of which is connected at one end to one another so that a second center point voltage is obtained, integration means for integrating a difference between the first center point voltage and the second center point voltage and for obtaining an integration signal, and magnetic pole position detection means for detecting a magnetic pole position of a rotor, of the synchronous motor based upon the integration signal.

20. A compressor driving device comprising;
 a one cylinder compressor, and a synchronous motor for driving the one cylinder compressor which is driven by the synchronous motor driving device according to one claim 11.

21. A brushless DC motor driving, device comprising;
 resistances, each having one end which is connected to an output terminal of each phase of an inverter and another end which is connected to one another so that a first center point voltage is obtained,
 stator windings each corresponds to each phase of a brushless DC motor, each of which stator windings is connected at one end to one another so that a second center point voltage is obtained,
 integration means for integrating a difference between the first center point voltage and the second center point voltage and for obtaining an integration signal,
 magnetic pole position detection means for detecting a magnetic pole position of a rotor of the brushless DC motor based upon the integration signal,
 inverter control means for controlling the inverter so that a changing voltage which is advanced with respect to a phase of a load torque is superposed upon an average value voltage command in synchronism with intermittence of the load torque for applying to the brushless DC motor; and
 peak-value change suppression means for suppressing change in peak value of the integration signal.

22. A brushless DC motor driving device as set forth in claim 21, wherein the peak value change suppression means includes division means for dividing an inverter interval, judgment means for judging whether the integration signal level is great or small or every divided interval, and inverter voltage phase control means for retarding the inverter voltage phase responding to the judgment result representing that the level of the integration signal is great and for advancing the inverter voltage phase responding to the judgment result representing that the level of the integration signal is small.

23. A brushless DC motor driving device comprising;
 resistances each having one end which is connected to an output terminal of each phase of an inverter and another end which is connected to one another so that a first center point voltage is obtained,
 stator windings each corresponding to each phase of a brushless DC motor each of which stator windings is connected at one end to one another so that a second center point voltage is obtained,
 integration means for integrating a difference between the first center point voltage and the second center point voltage and for obtaining an integration signal,
 magnetic pole position detection means for detecting a magnetic pole position of a rotor of the brushless DC motor based upon the integration signal,
 inverter control means for controlling the inverter so that a changing phase which is advanced with respect to a phase of a load torque is superposed upon an average value phase command in synchronism with intermittence of the load torque for applying to the brushless DC motor, and
 peak value change suppression means for suppressing change in peak value of the integration signal.

24. A brushless DC motor driving device as set forth in claim 23, wherein the peak value change suppression means includes division means for dividing an inverter interval, judgment means for judging whether the integration signal level is great or small for every divided interval, and inverter voltage amplitude control means for increasing the inverter voltage amplitude responding to the judgment result representing that the level of the integration signal is great and for decreasing the inverter voltage amplitude responding to the judgment result representing that the level of the integration signal is small.

\* \* \* \* \*